(12) United States Patent
Lee et al.

(10) Patent No.: US 12,068,777 B2
(45) Date of Patent: Aug. 20, 2024

(54) METHOD AND APPARATUS FOR TRANSMITTING AND RECEIVING SIGNALS IN OPTICAL WIRELESS COMMUNICATION SYSTEM

(71) Applicant: LG ELECTRONICS INC., Seoul (KR)

(72) Inventors: Hojae Lee, Seoul (KR); Sangrim Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 115 days.

(21) Appl. No.: 17/918,523

(22) PCT Filed: Apr. 29, 2020

(86) PCT No.: PCT/KR2020/095080
§ 371 (c)(1),
(2) Date: Oct. 12, 2022

(87) PCT Pub. No.: WO2021/221267
PCT Pub. Date: Nov. 4, 2021

(65) Prior Publication Data
US 2023/0163843 A1      May 25, 2023

(51) Int. Cl.
*H04B 10/00* (2013.01)
*H04B 10/079* (2013.01)
(Continued)

(52) U.S. Cl.
CPC ....... *H04B 10/0795* (2013.01); *H04B 10/112* (2013.01); *H04B 10/2507* (2013.01); *H04B 10/85* (2013.01)

(58) Field of Classification Search
CPC ... H04B 10/11; H04B 10/112; H04B 10/1123; H04B 10/1125; H04B 10/1129; H04B 10/116; H04J 14/07
See application file for complete search history.

(56) References Cited

U.S. PATENT DOCUMENTS 10,727,601 B1 * 7/2020 Akselrod ........... H01Q 15/0053
2016/0359539 A1   12/2016 Ashrafi et al.
(Continued)

FOREIGN PATENT DOCUMENTS

KR    1020110090783    8/2011
WO    2019126412       6/2019

OTHER PUBLICATIONS

3rd Generation Partnership Project (3GPP), "Technical Specification Group Radio Access Network; Radio Frequency (RF) conformance testing background for radiated Base Station (BS) requirements (Release 15)," 3GPP TR 37.941 V0.1.0, section 7.3.1, 9.7.4.3, Apr. 2020, 240 pages.
(Continued)

*Primary Examiner* — Daniel G Dobson
(74) *Attorney, Agent, or Firm* — LEE, HONG, DEGERMAN, KANG & WAIMEY

(57) ABSTRACT

A method and apparatus for transmitting and receiving signals in a wireless communication system, according to an embodiment of the present invention, may comprise a feature of applying a phase pattern to a wavefront of an optical signal and a feature of transmitting the optical signal. The phase pattern may be determined on the basis of an optical phase shift characteristic of a phase mask, and the phase mask may be determined on the basis of a quantization order and a phase order.

15 Claims, 40 Drawing Sheets

(51) Int. Cl.
*H04B 10/112* (2013.01)
*H04B 10/2507* (2013.01)
*H04B 10/85* (2013.01)
*H04J 14/00* (2006.01)

(56) References Cited

U.S. PATENT DOCUMENTS

2017/0366270 A1* 12/2017 Ashrafi .................. H04J 14/04
2018/0306913 A1 10/2018 Bartels

OTHER PUBLICATIONS

PCT International Application No. PCT/KR2020/095080, Written Opinion of the International Search Report dated Jan. 22, 2021, 3 pages.
Korean Intellectual Property Office Application No. 10-2022-7033478, Office Action dated Nov. 30, 2023, 4 pages.

* cited by examiner

[FIG. 1]
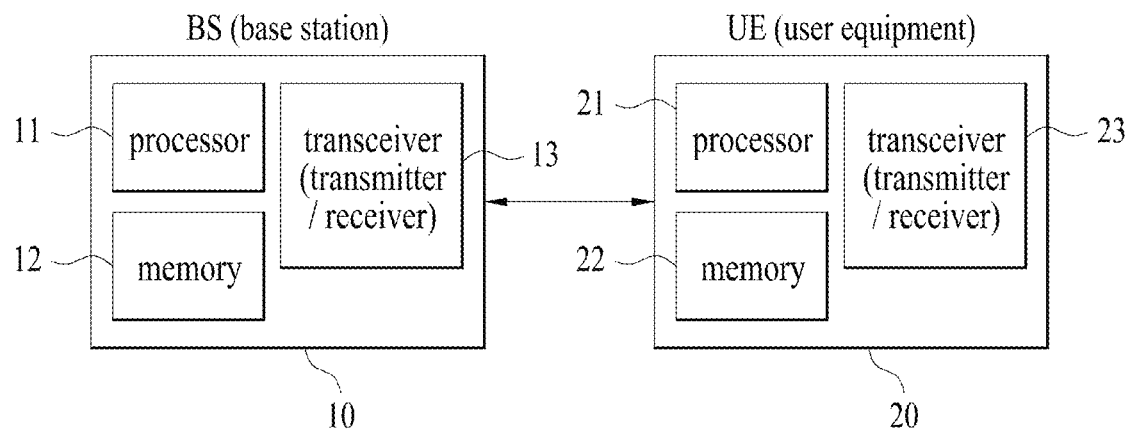
[FIG. 2]
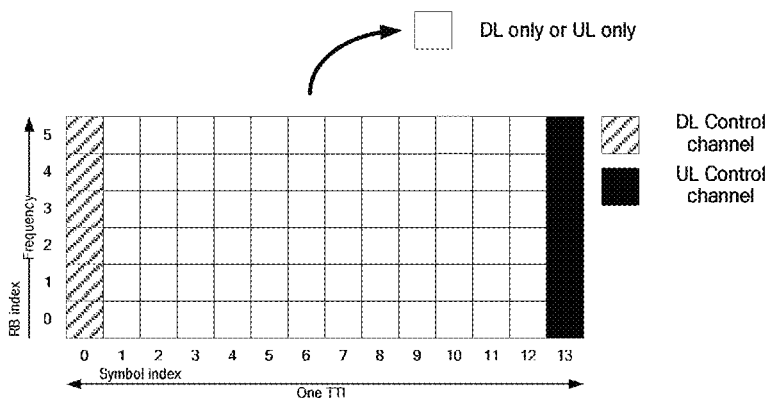

[FIG. 3]
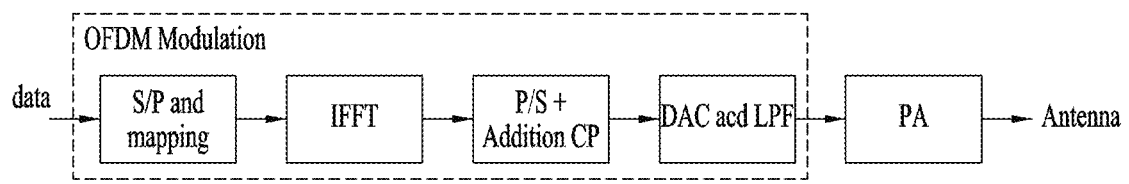

[FIG. 4]
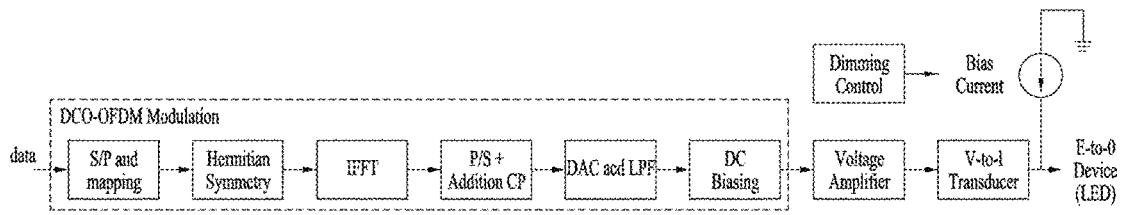
[FIG. 5]
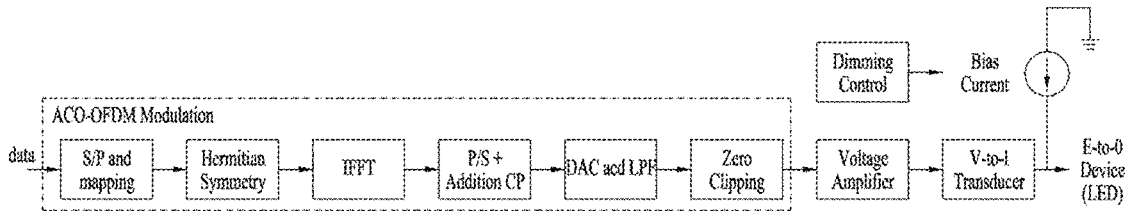
[FIG. 6]
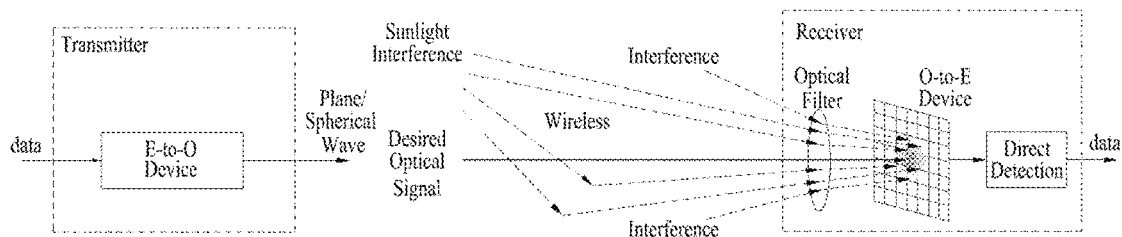

[FIG. 7]
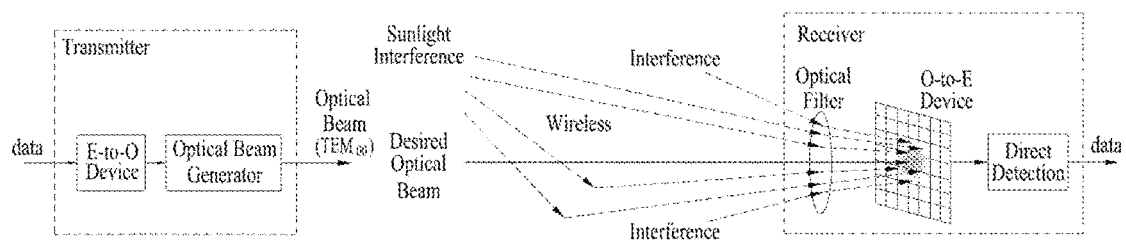

[FIG. 8]
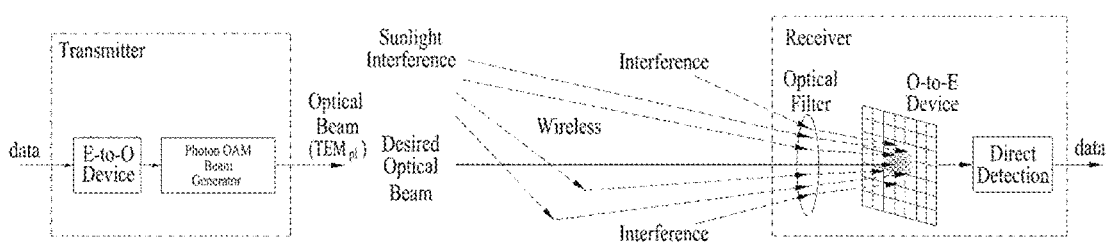
[FIG. 9]
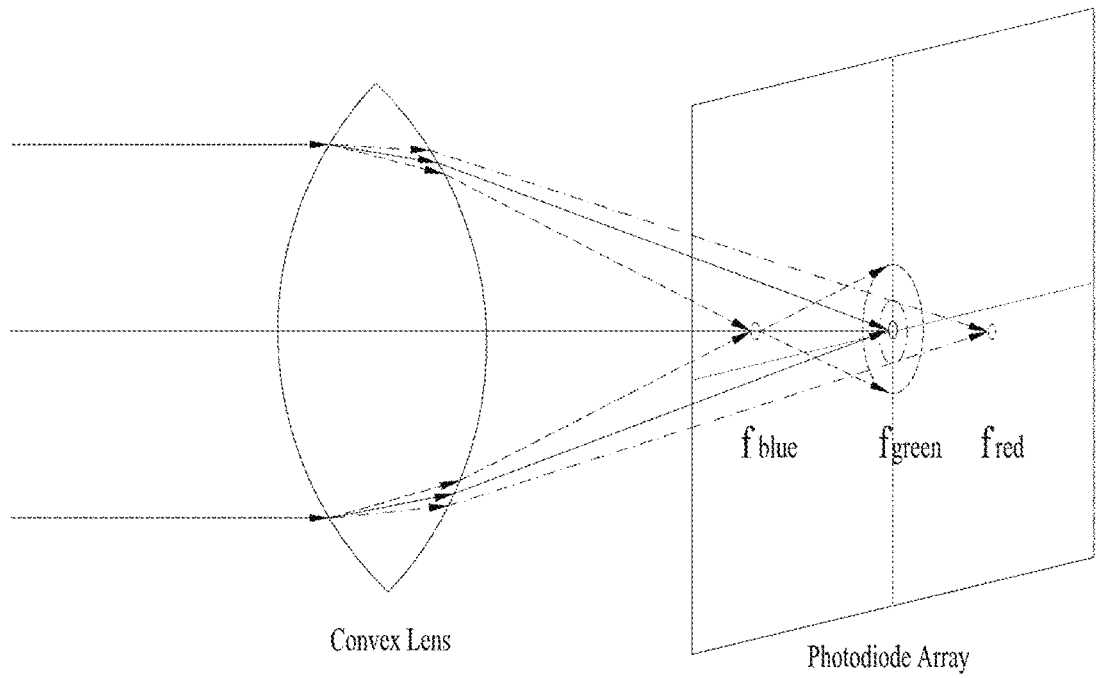

[FIG. 10]
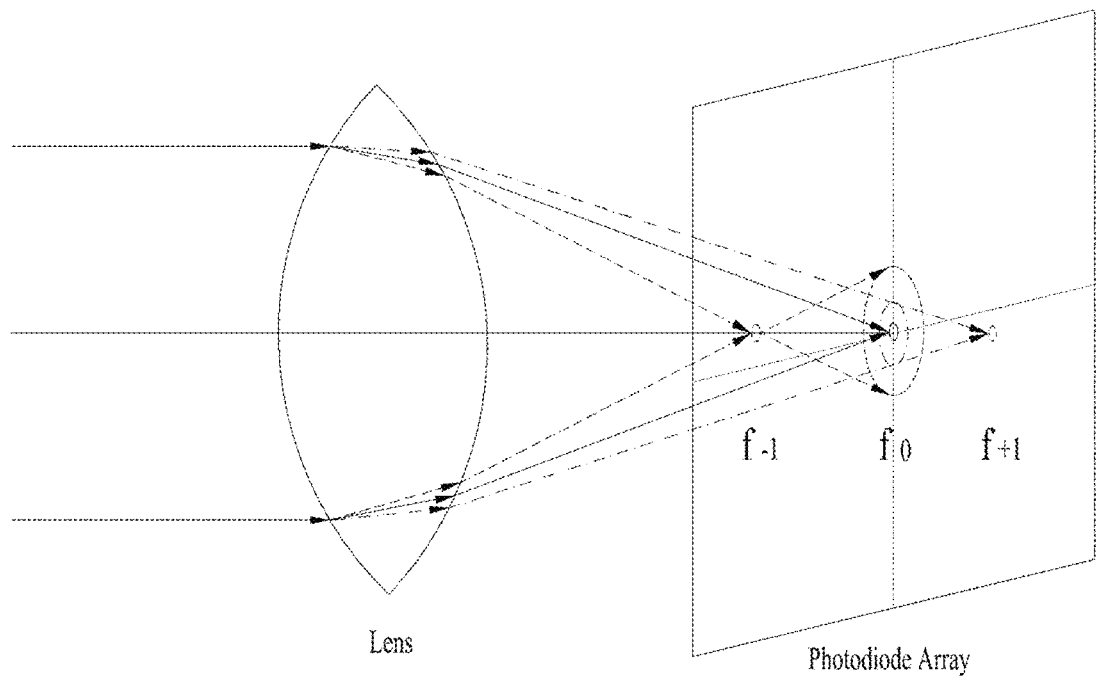
[FIG. 11]
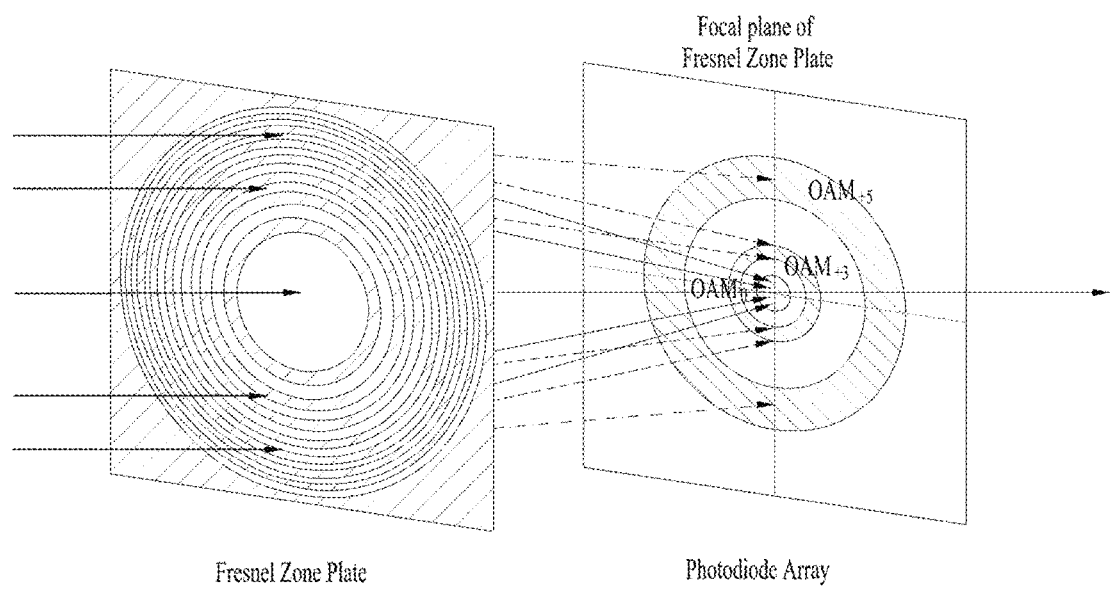

【FIG. 12】
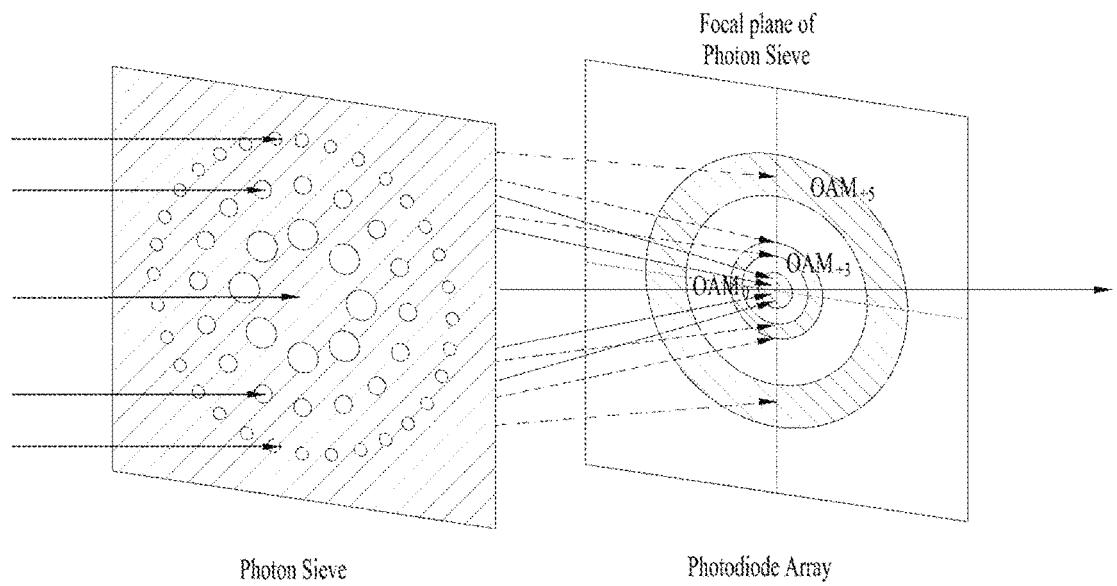
【FIG. 13】
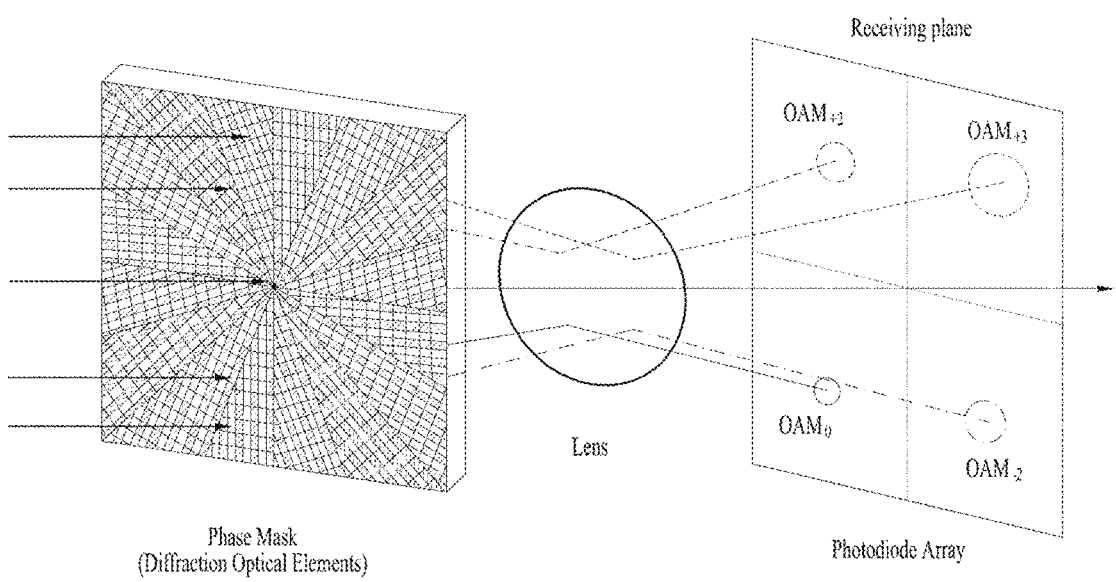

[FIG. 14]
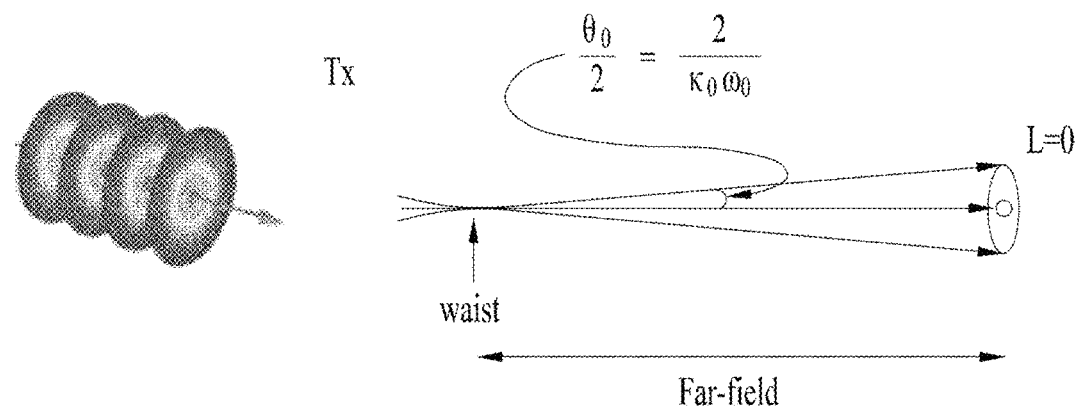
[FIG. 15]
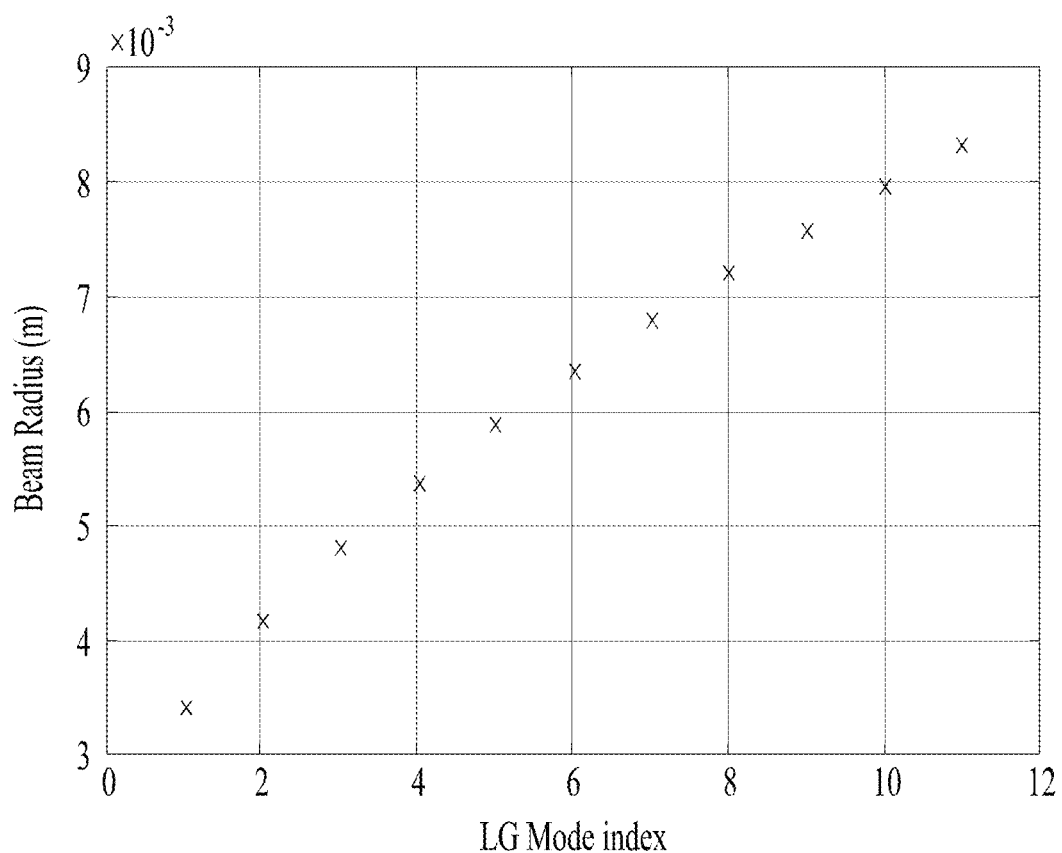

[FIG. 16]
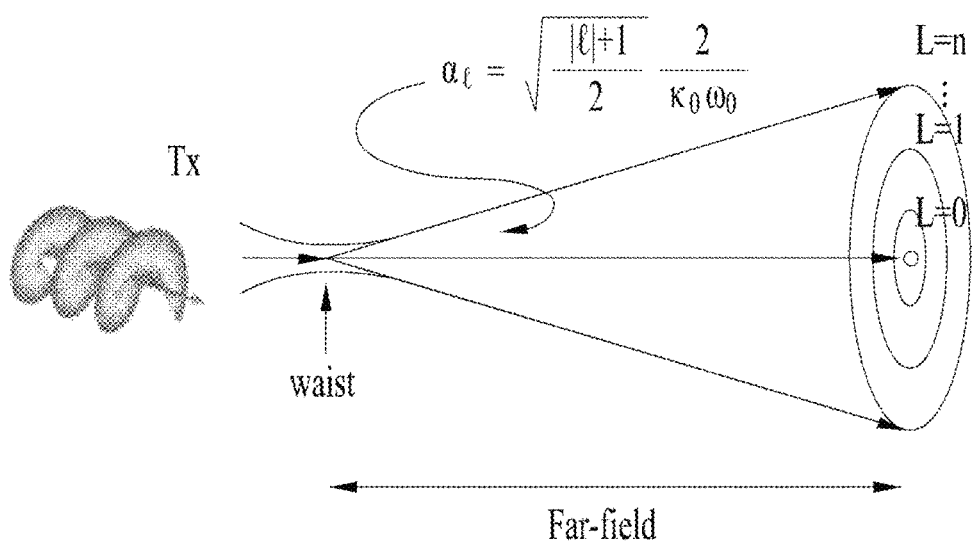
[FIG. 17]
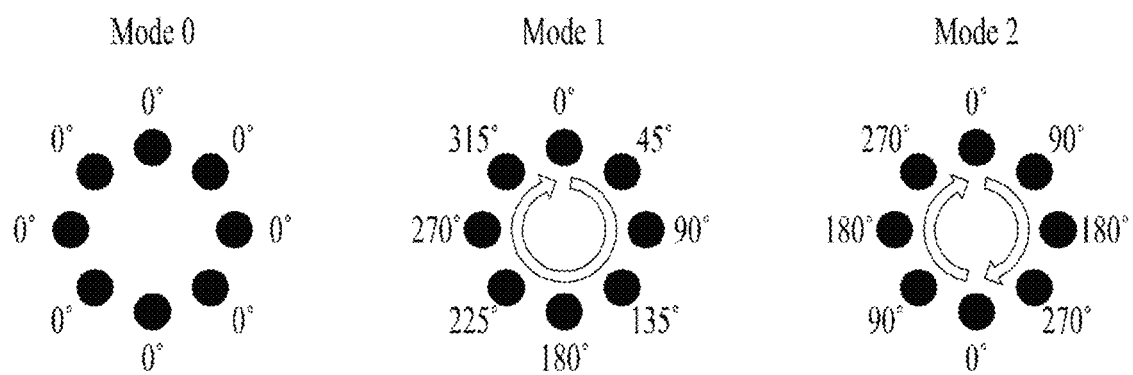

[FIG. 18]
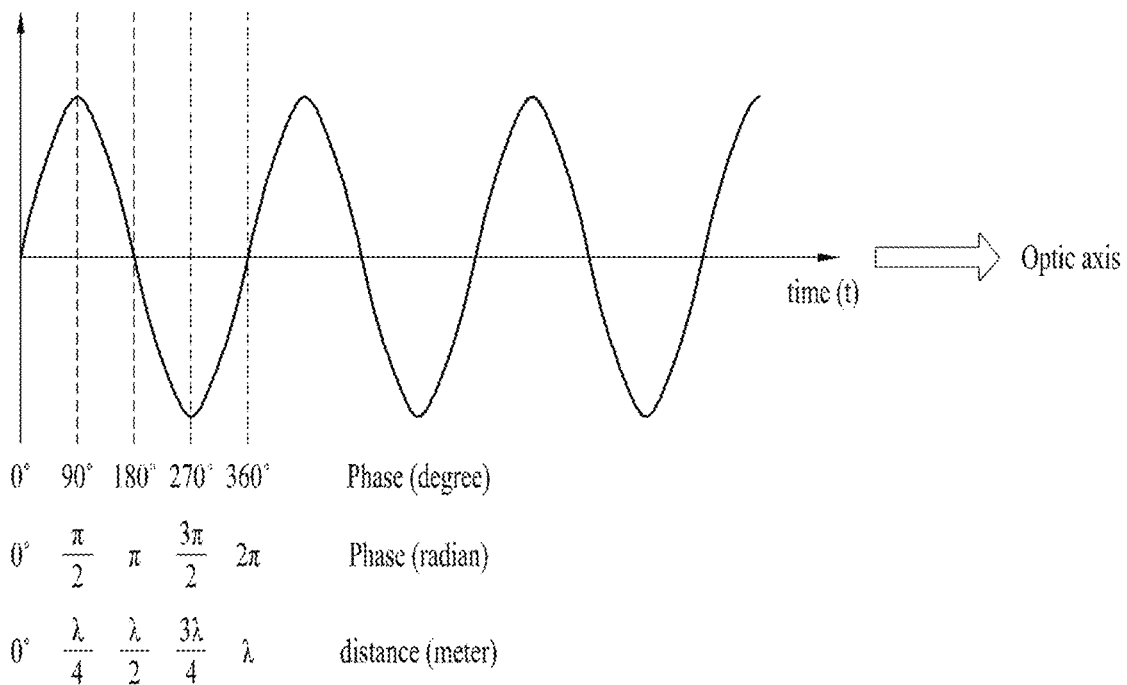
[FIG. 19]
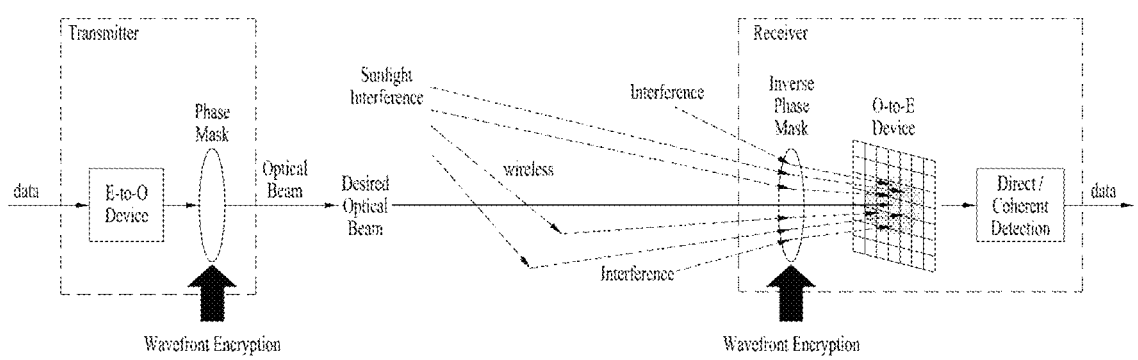

[FIG. 20]
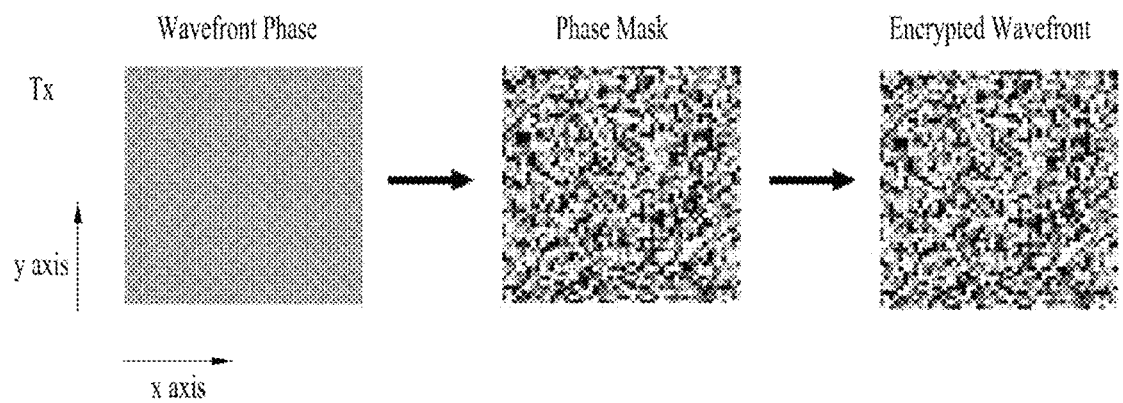
[FIG. 21]
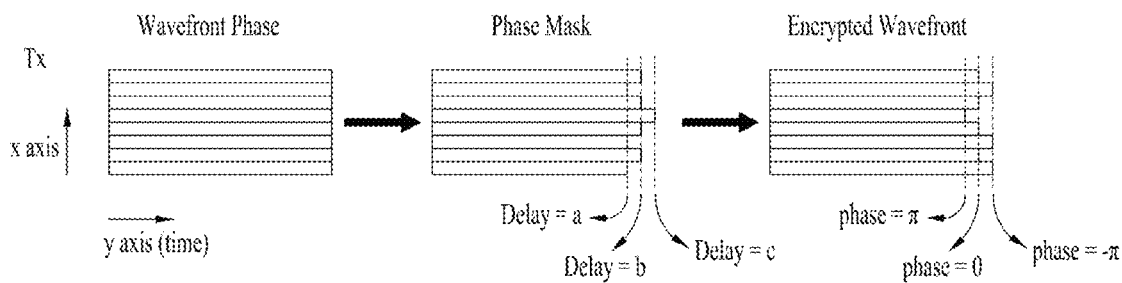

[FIG. 22]
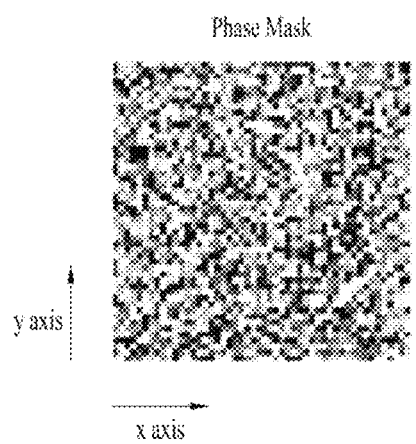

[FIG. 23]
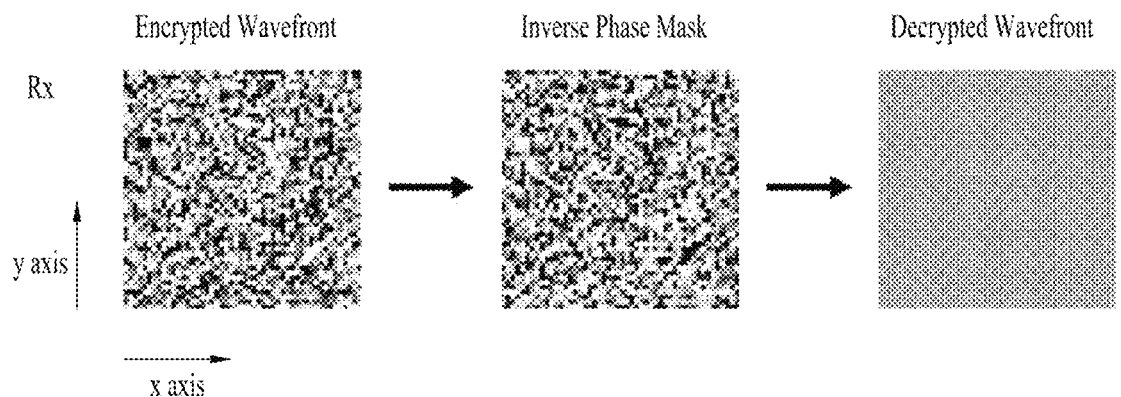
[FIG. 24]
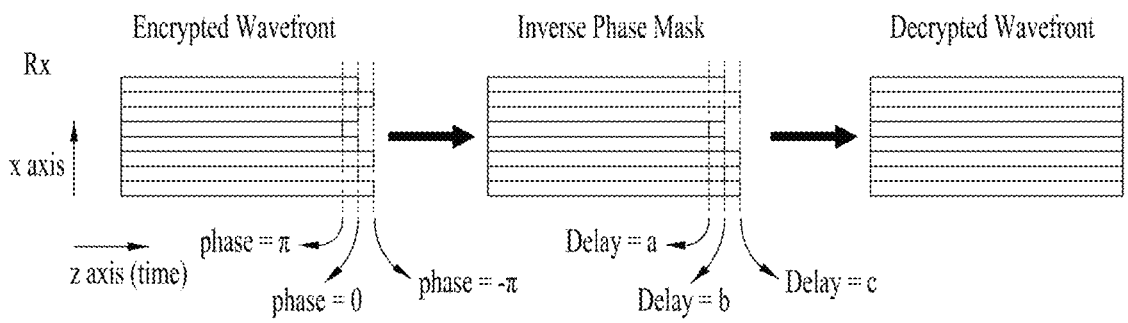

[FIG. 25]
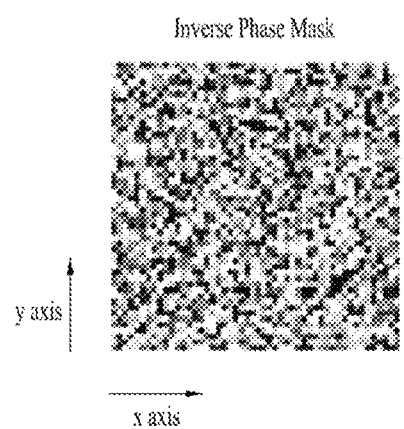

[FIG. 26]
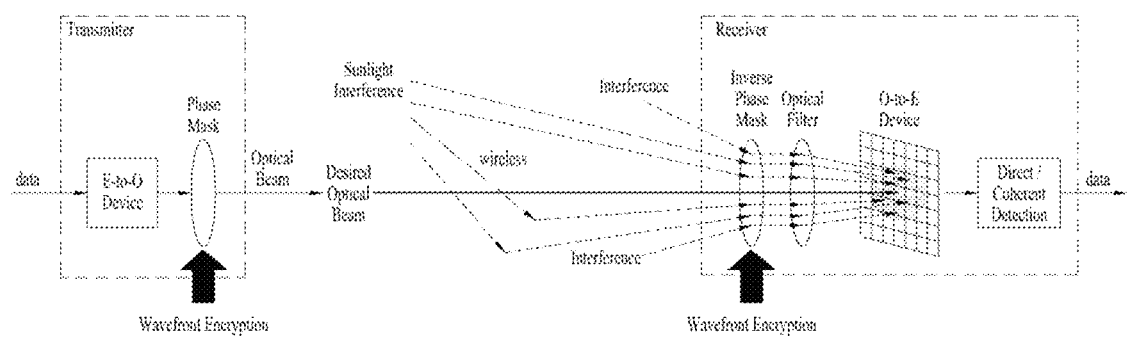
[FIG. 27]
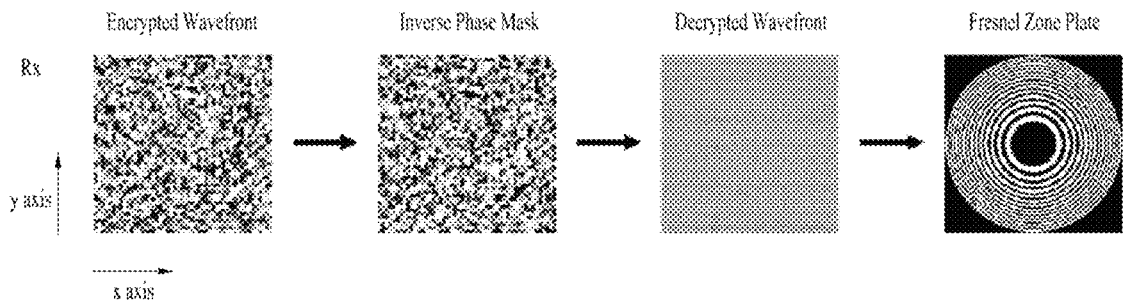
[FIG. 28]
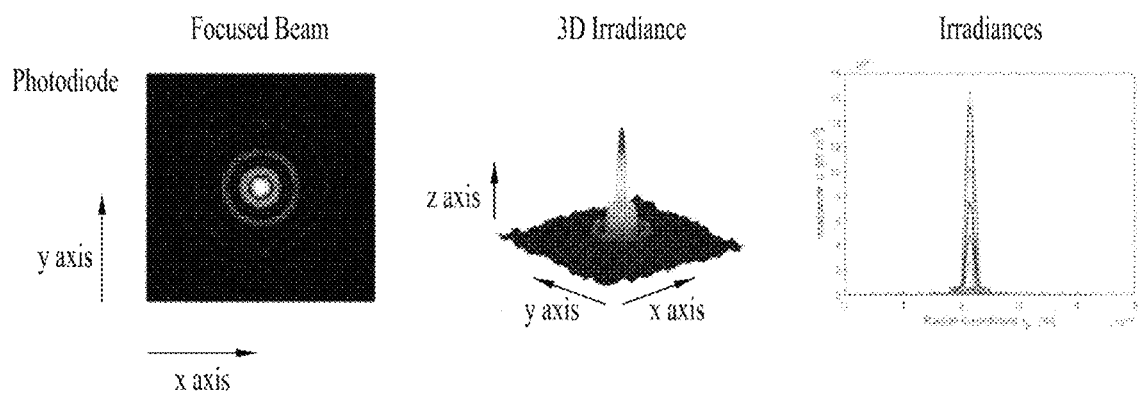

[FIG. 29]
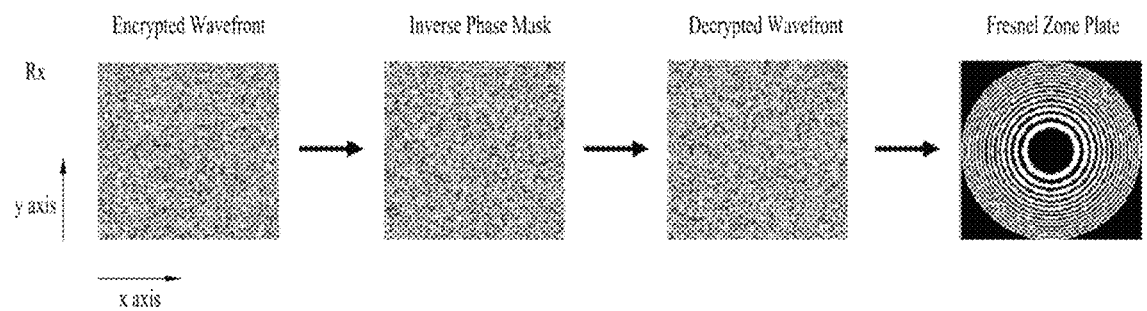
[FIG. 30]
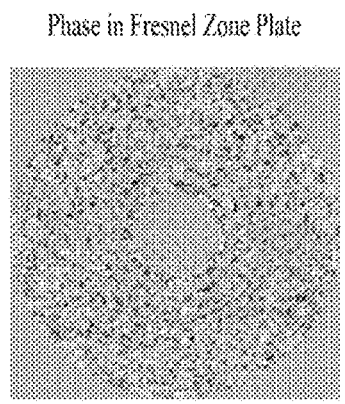
[FIG. 31]
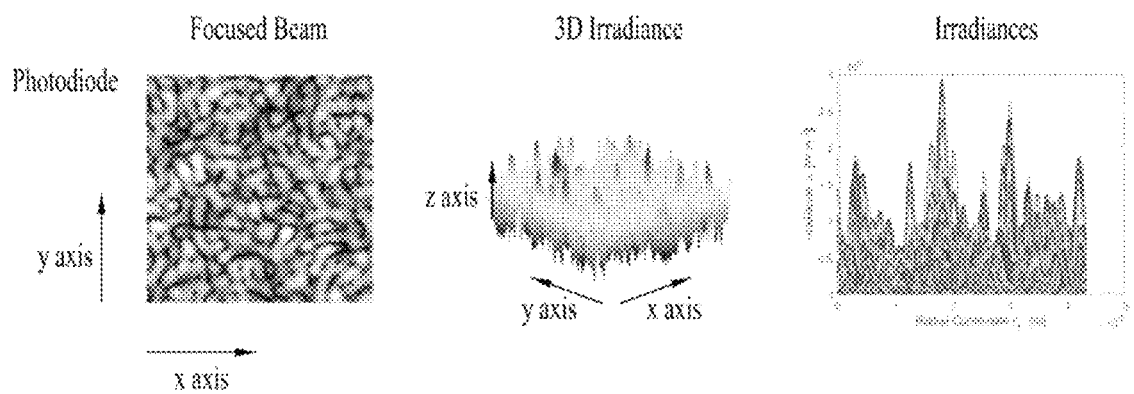

[FIG. 32]
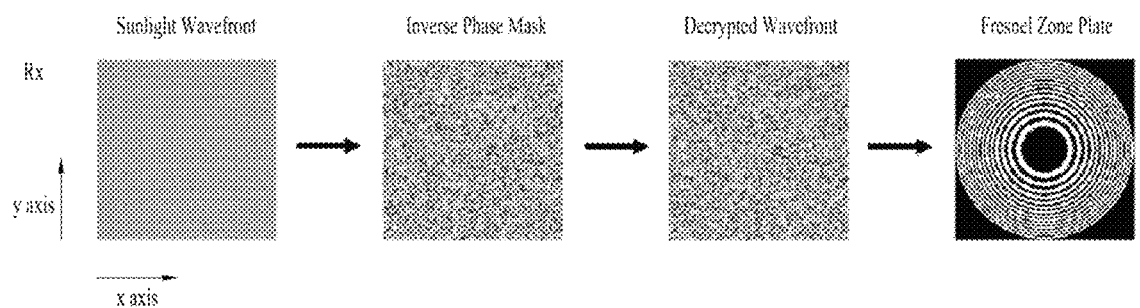
[FIG. 33]
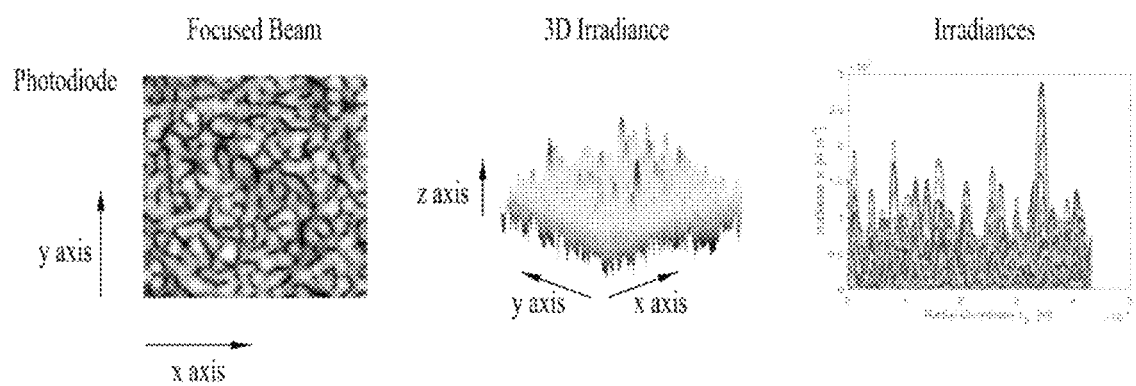
[FIG. 34]
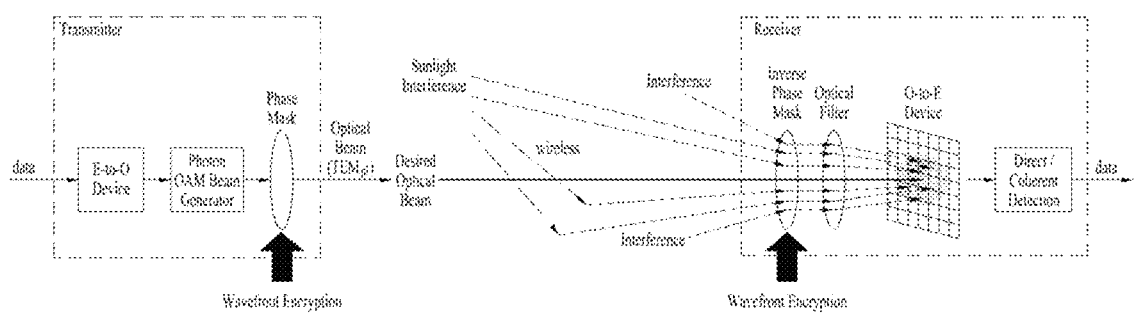

[FIG. 35]
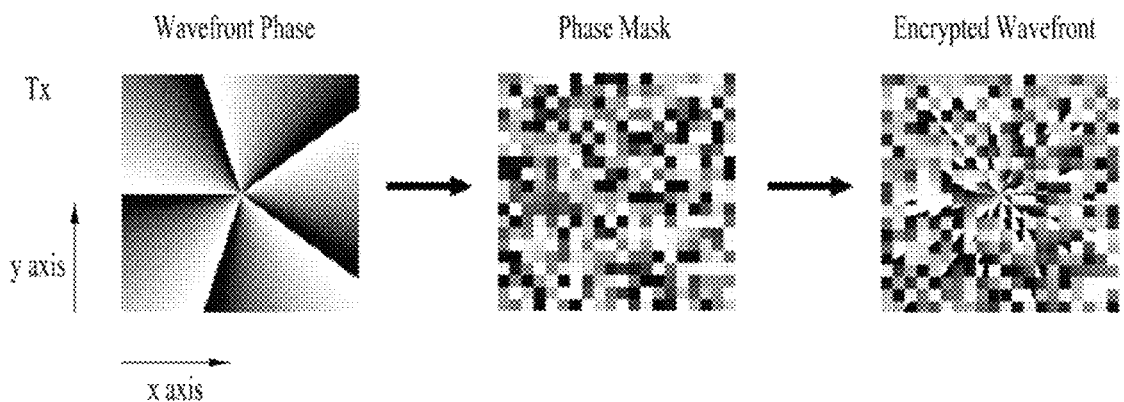
[FIG. 36]
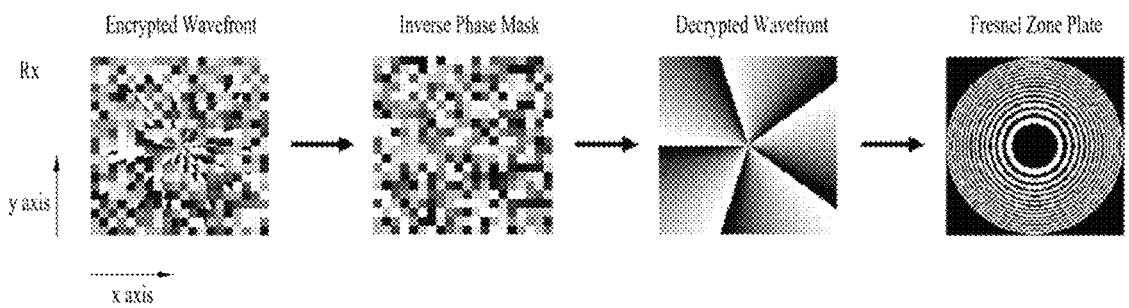
[FIG. 37]
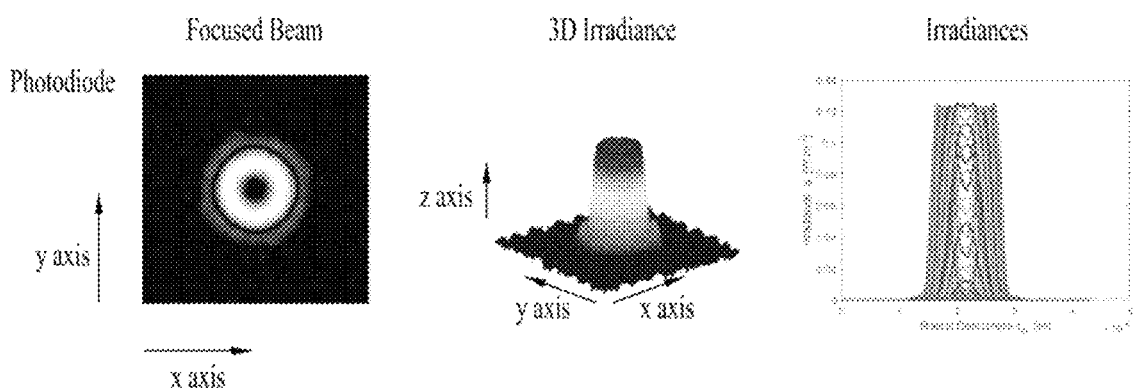

[FIG. 38]
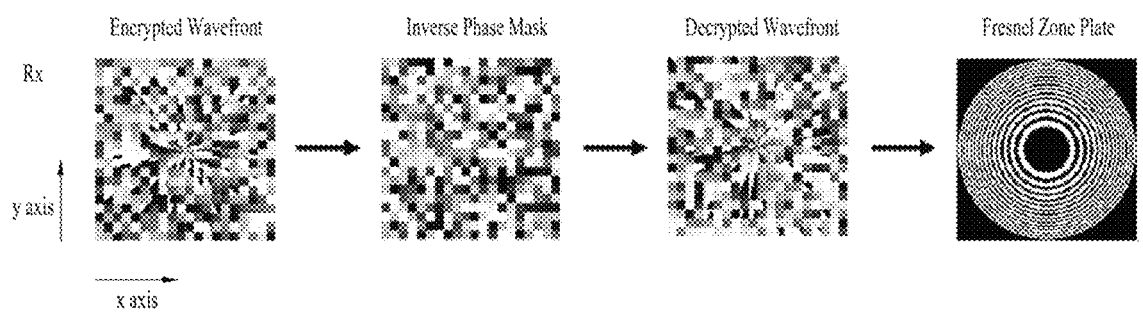
[FIG. 39]
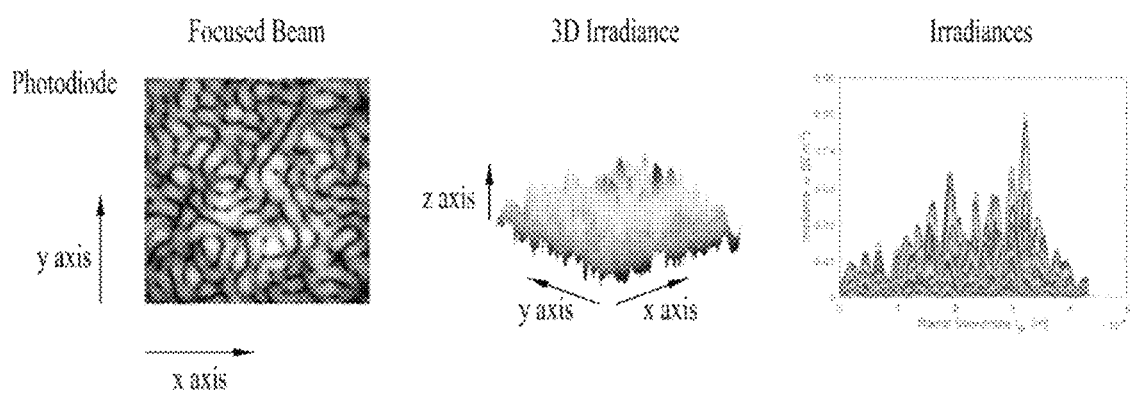

[FIG. 40]
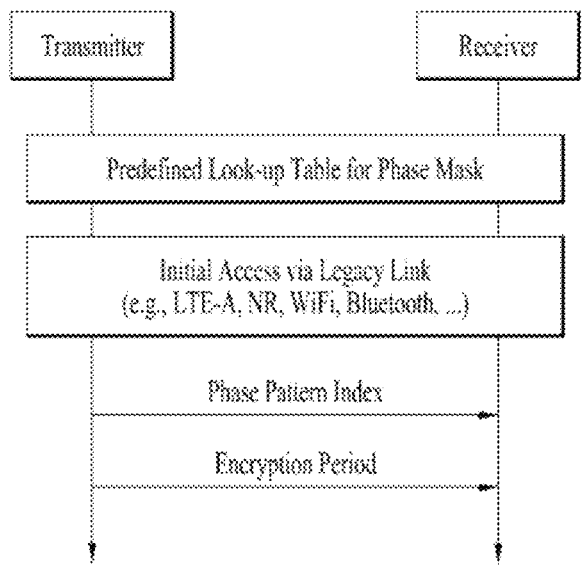
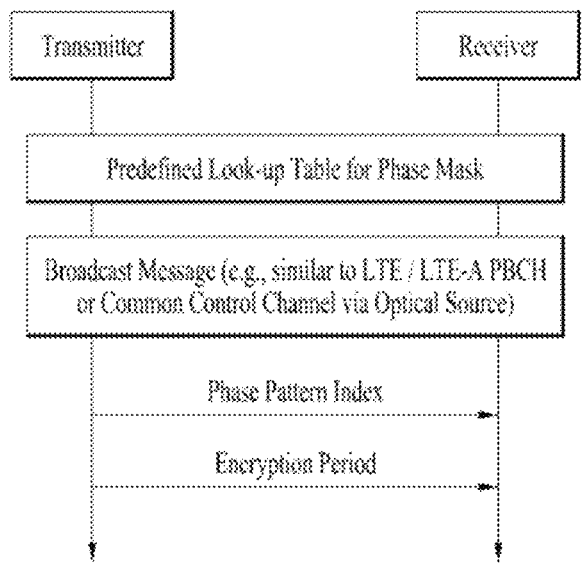

[FIG. 41]
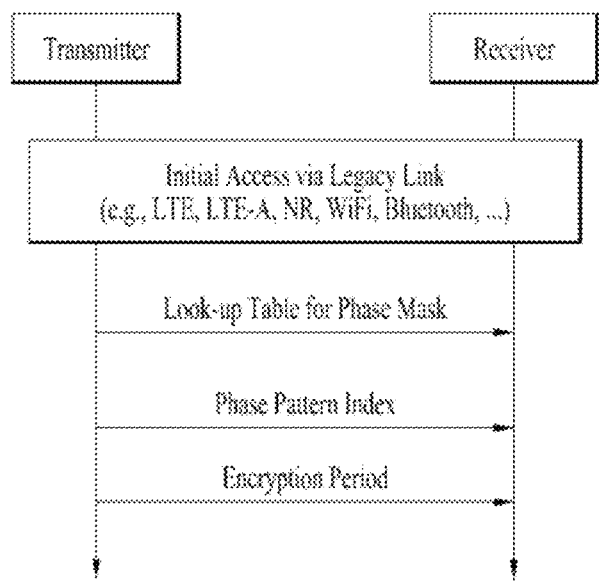
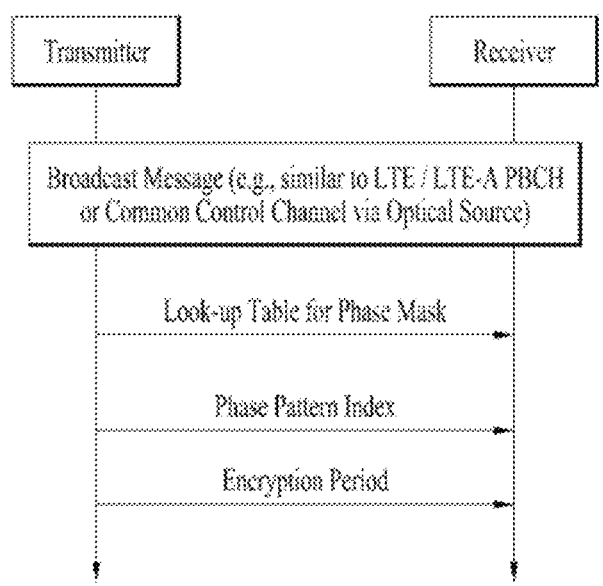

[FIG. 42]
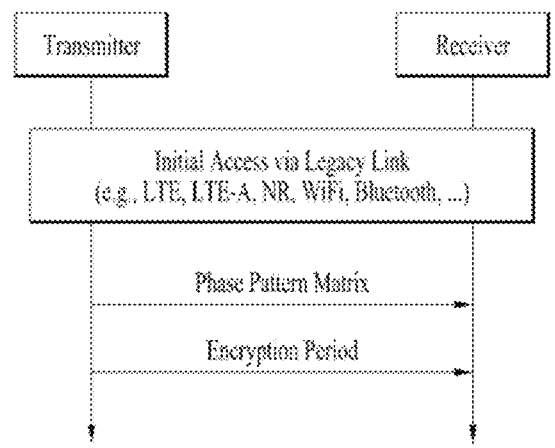
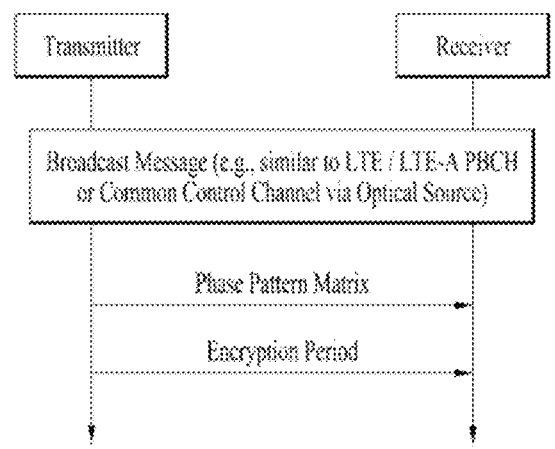

[FIG. 43]
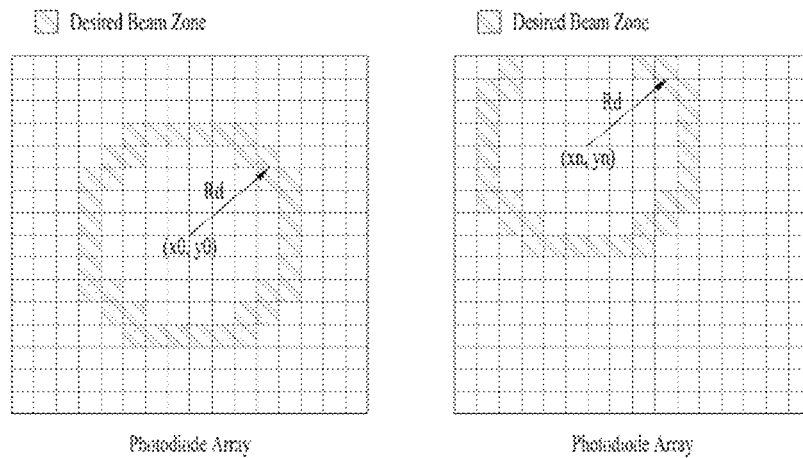
[FIG. 44]
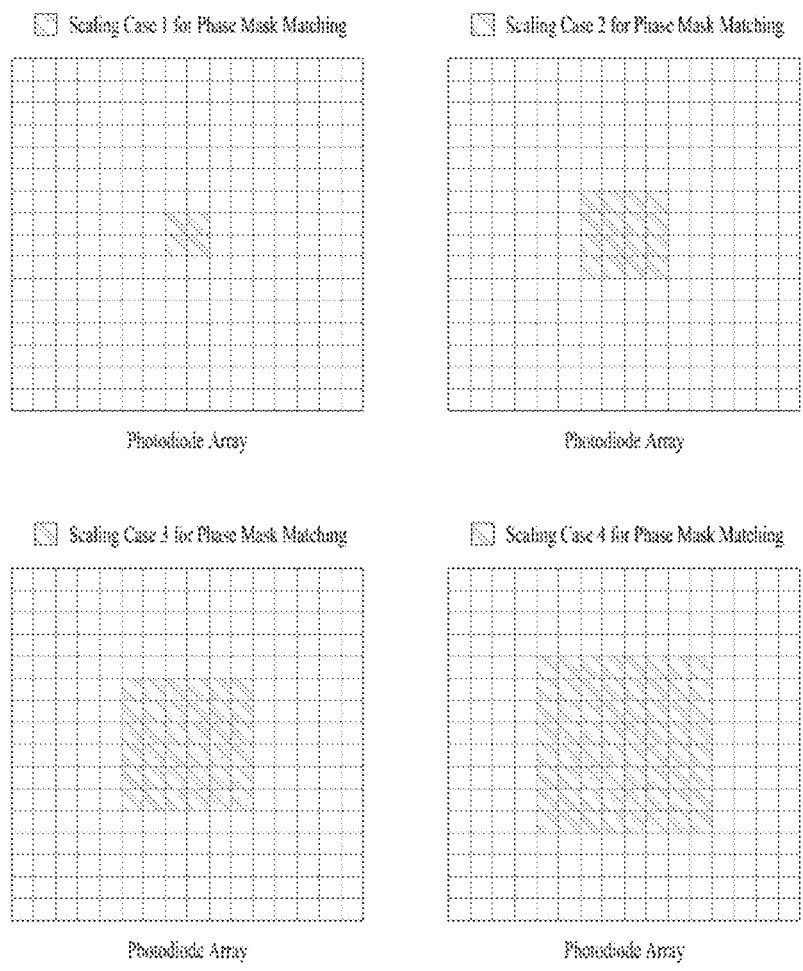

[FIG. 45]
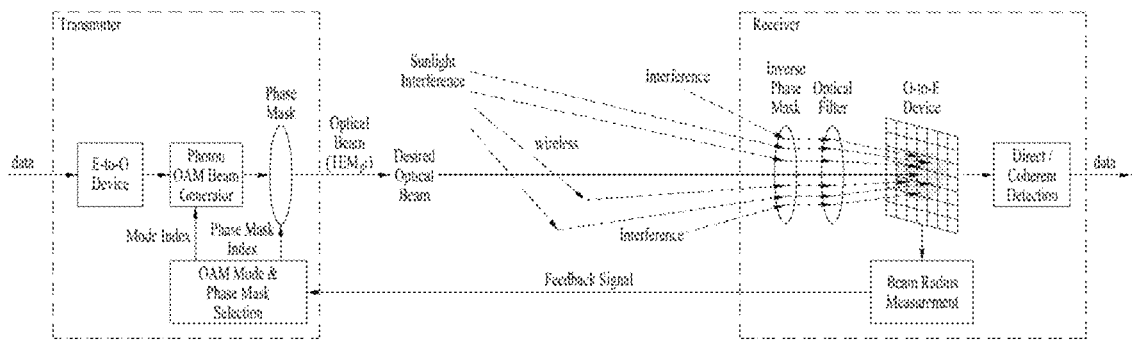
[FIG. 46]
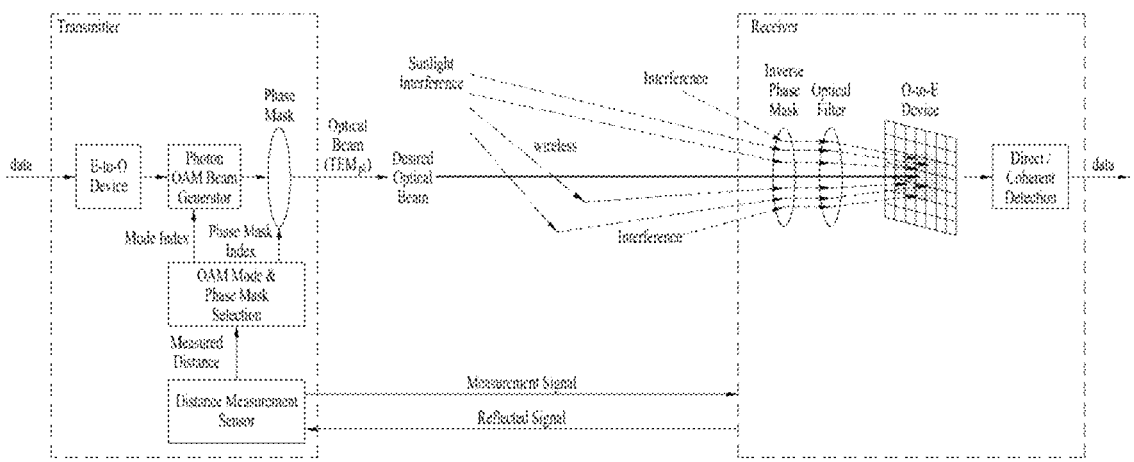
[FIG. 47]
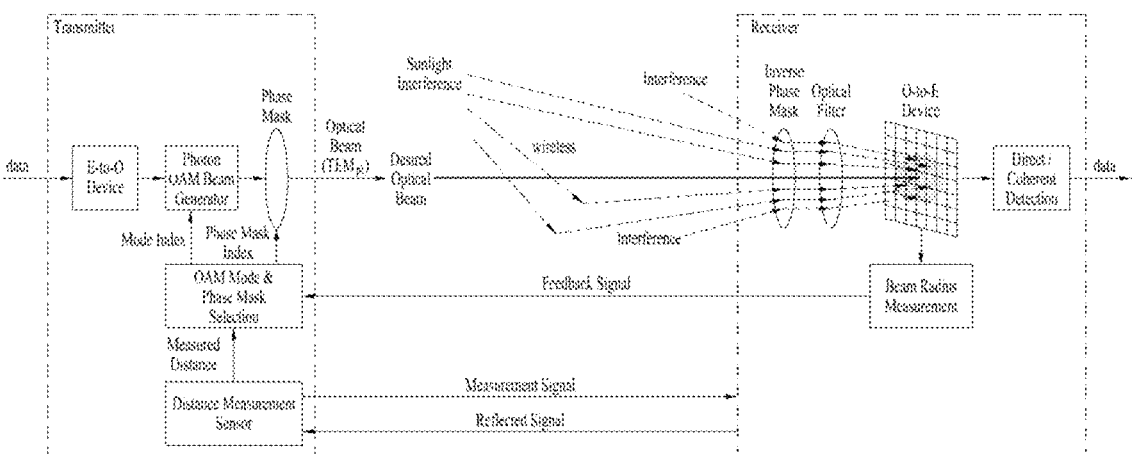

[FIG. 48]
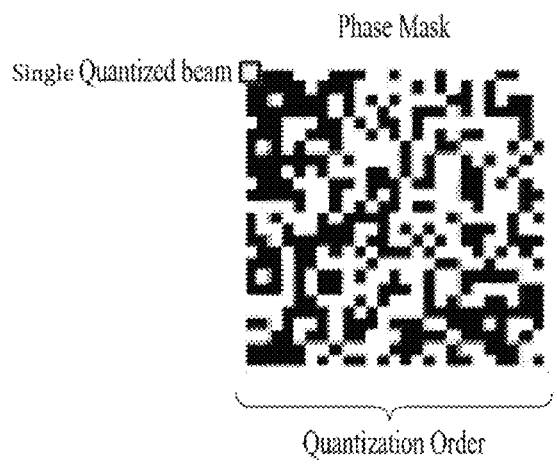
[FIG. 49]
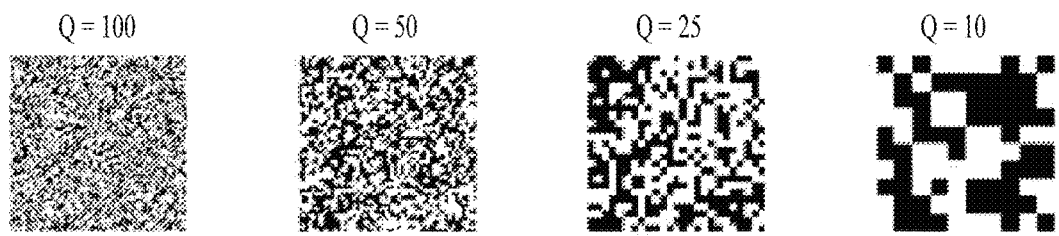
[FIG. 50]
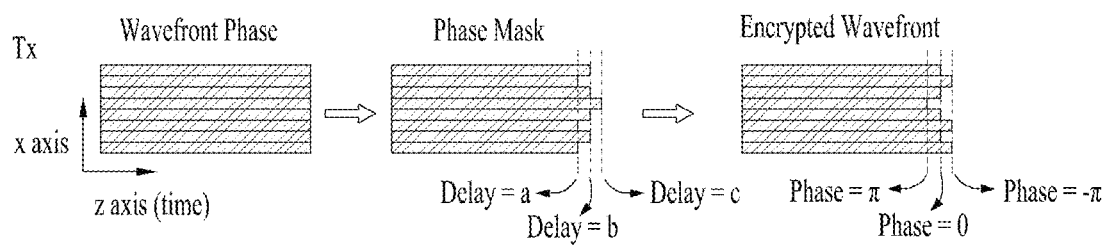

[FIG. 51]
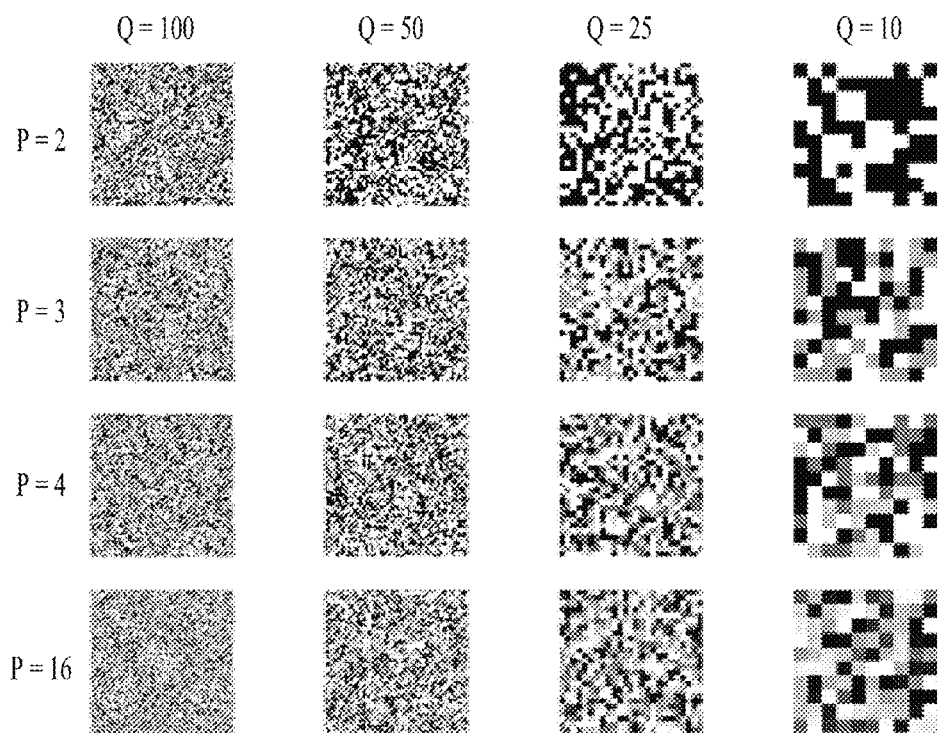

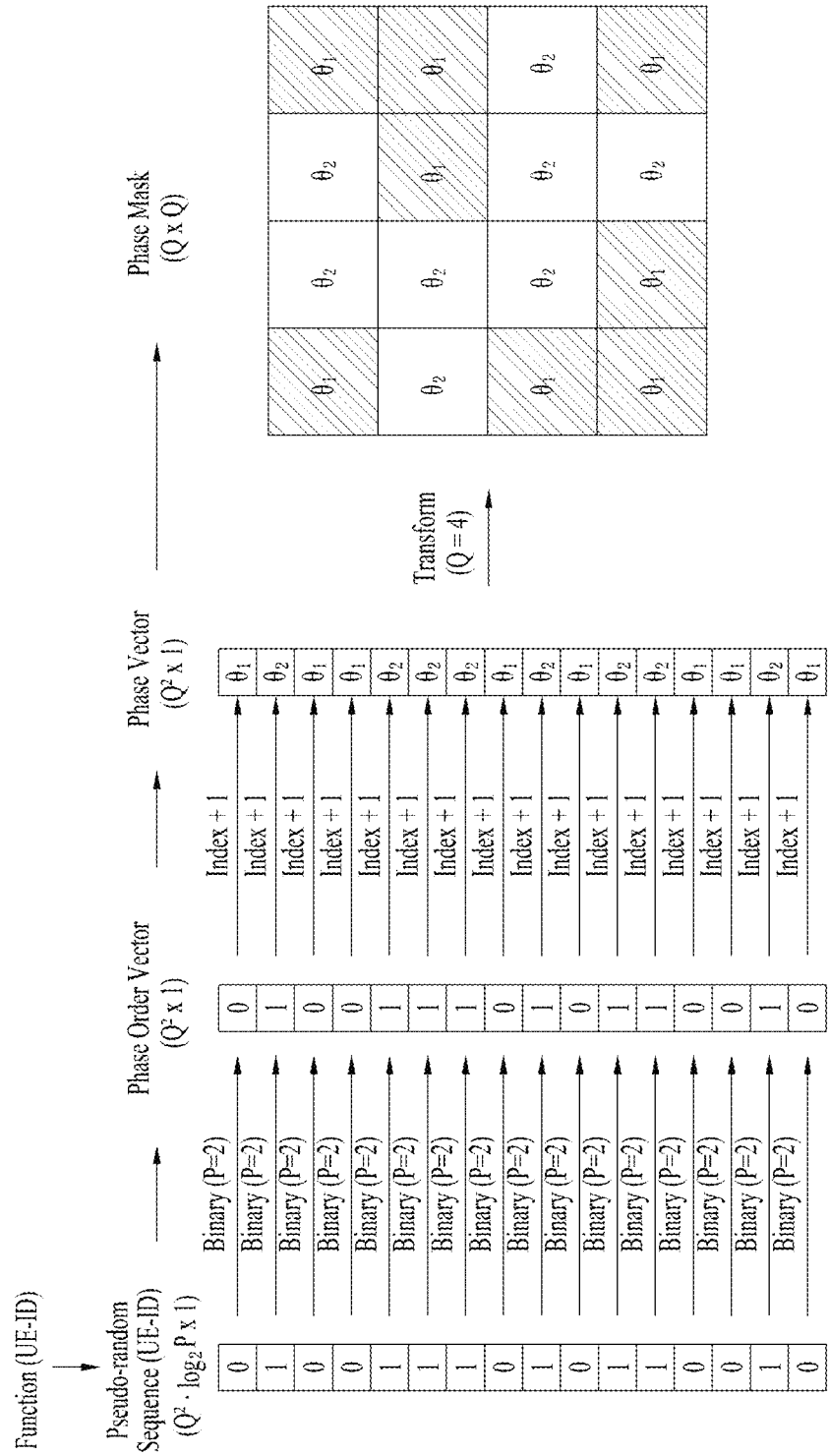
[FIG. 52]

[FIG. 53]
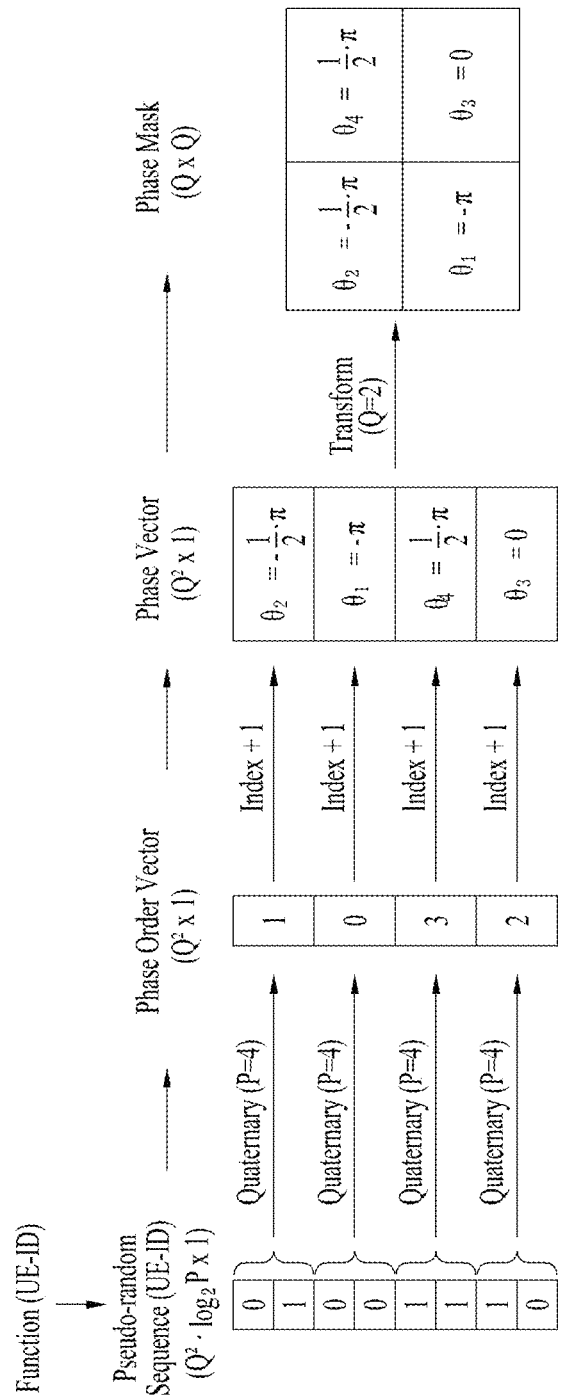

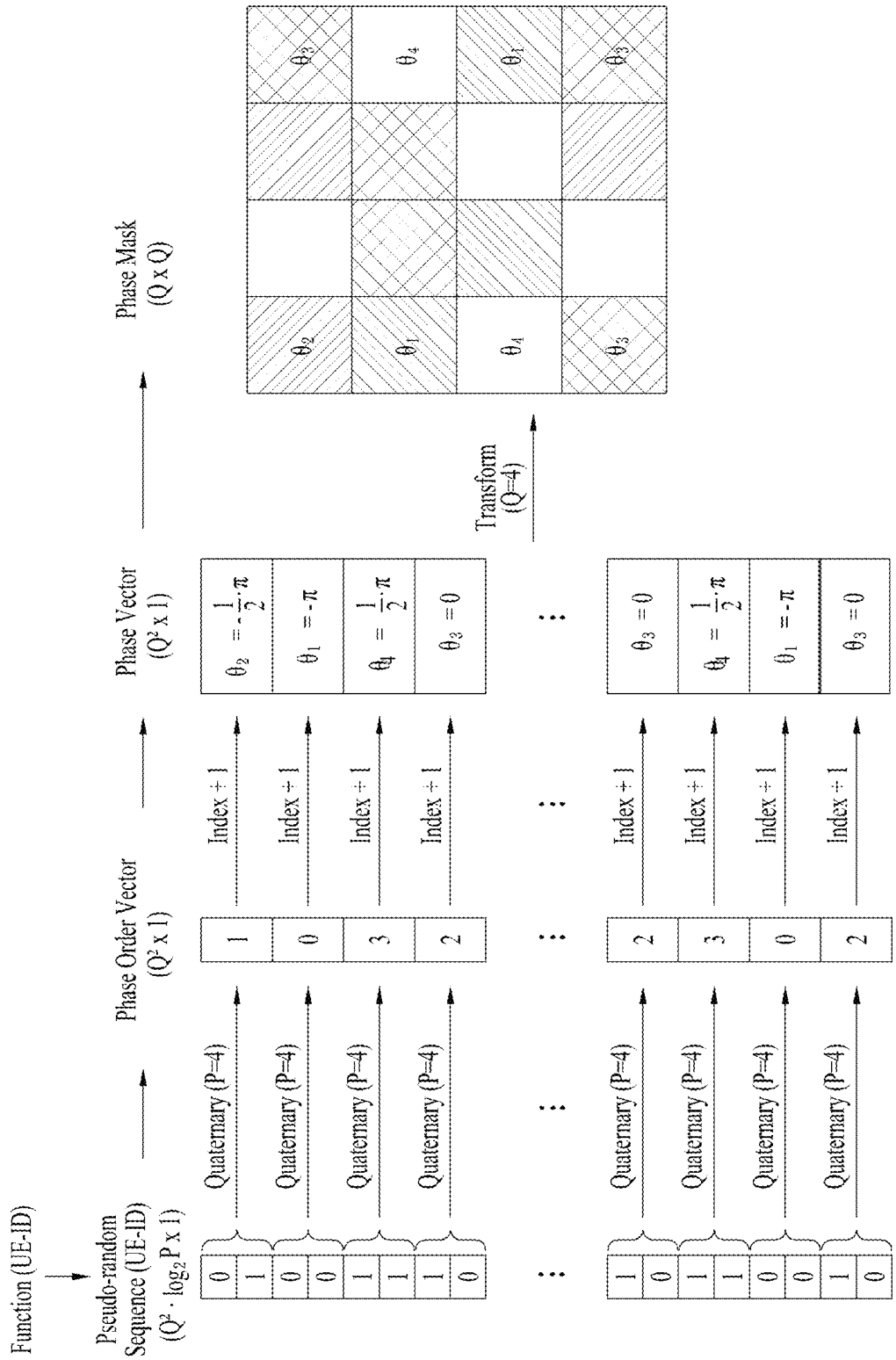
[FIG. 54]

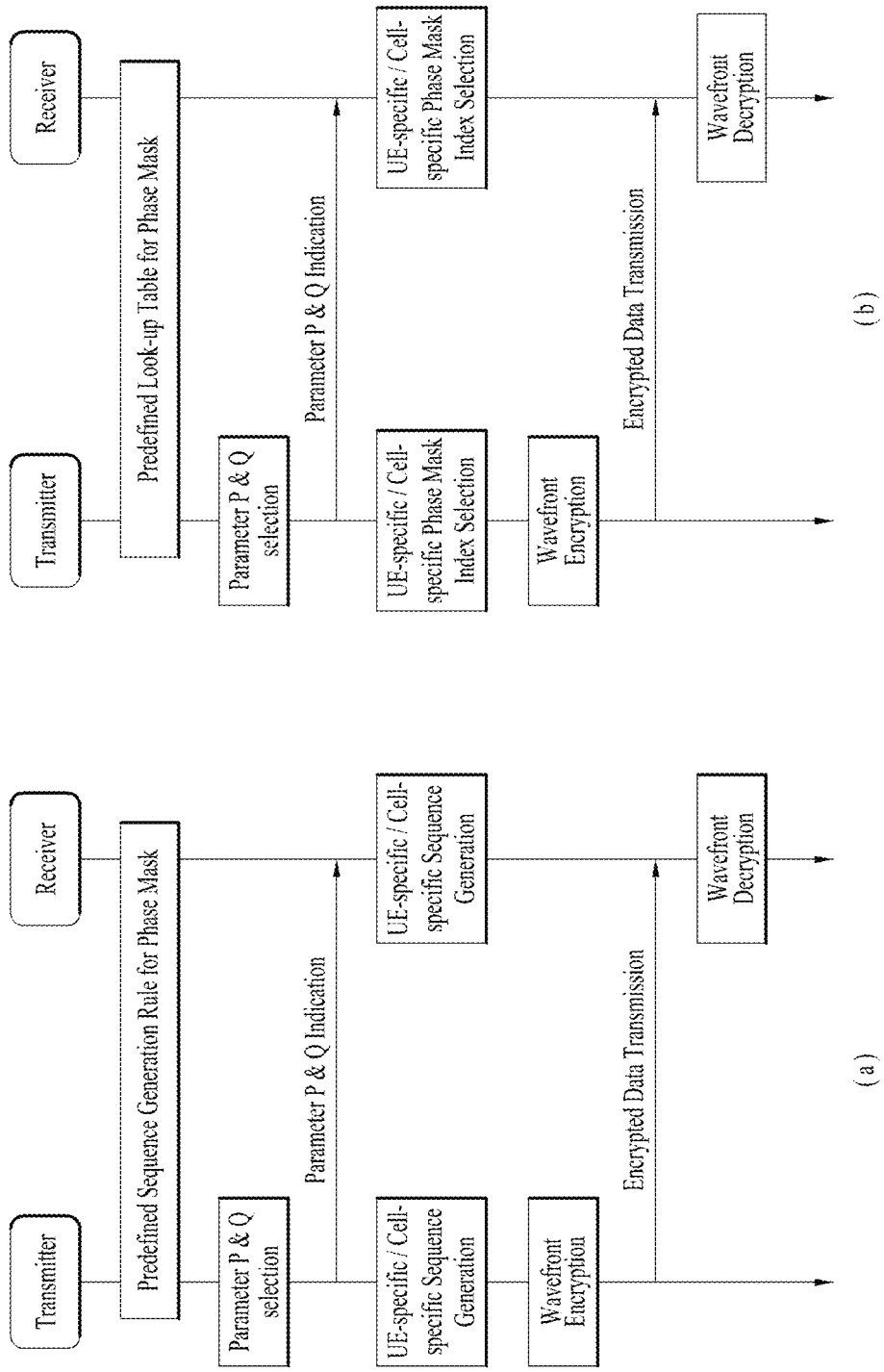
[FIG. 55]

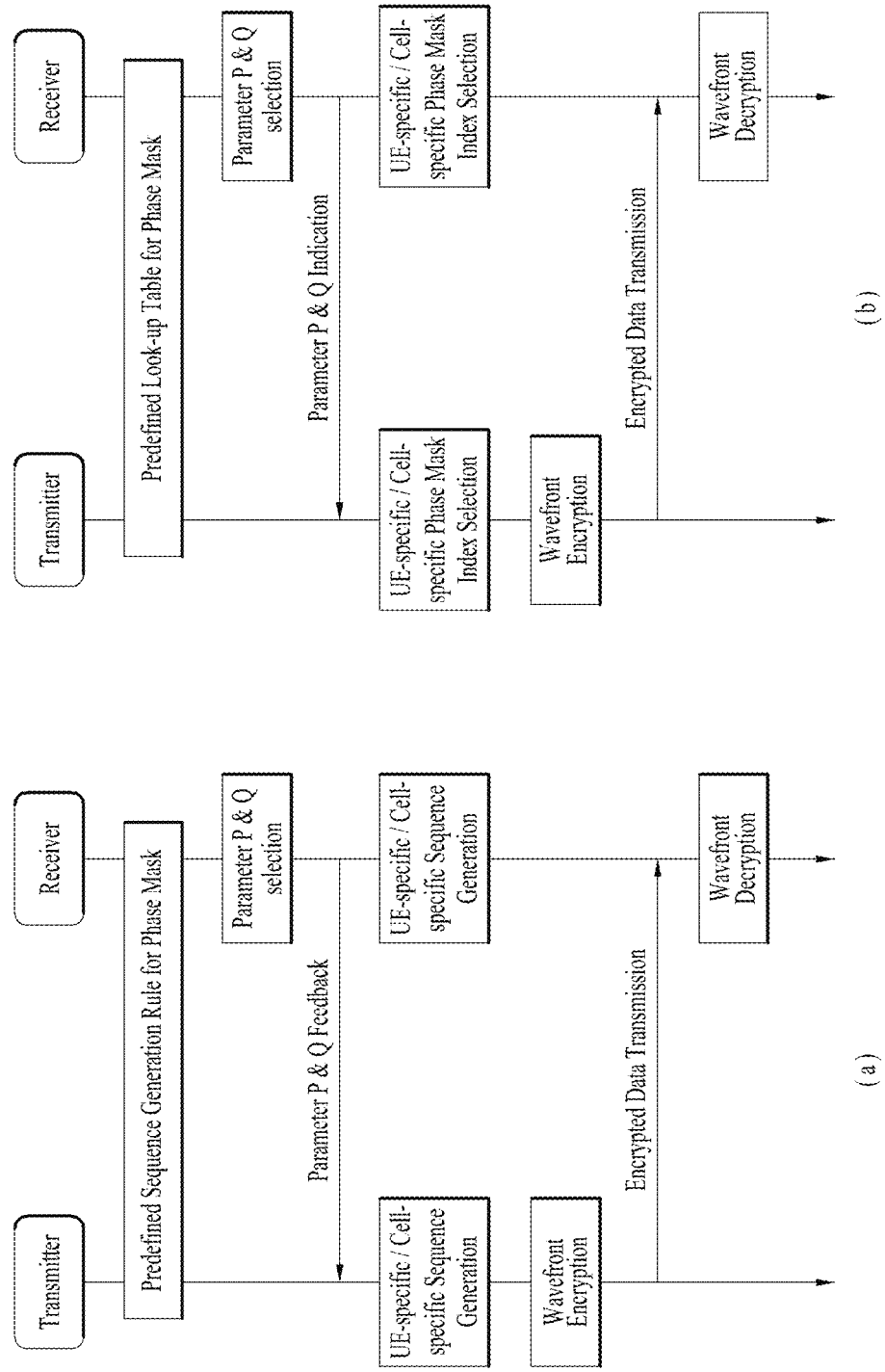
[FIG. 56]

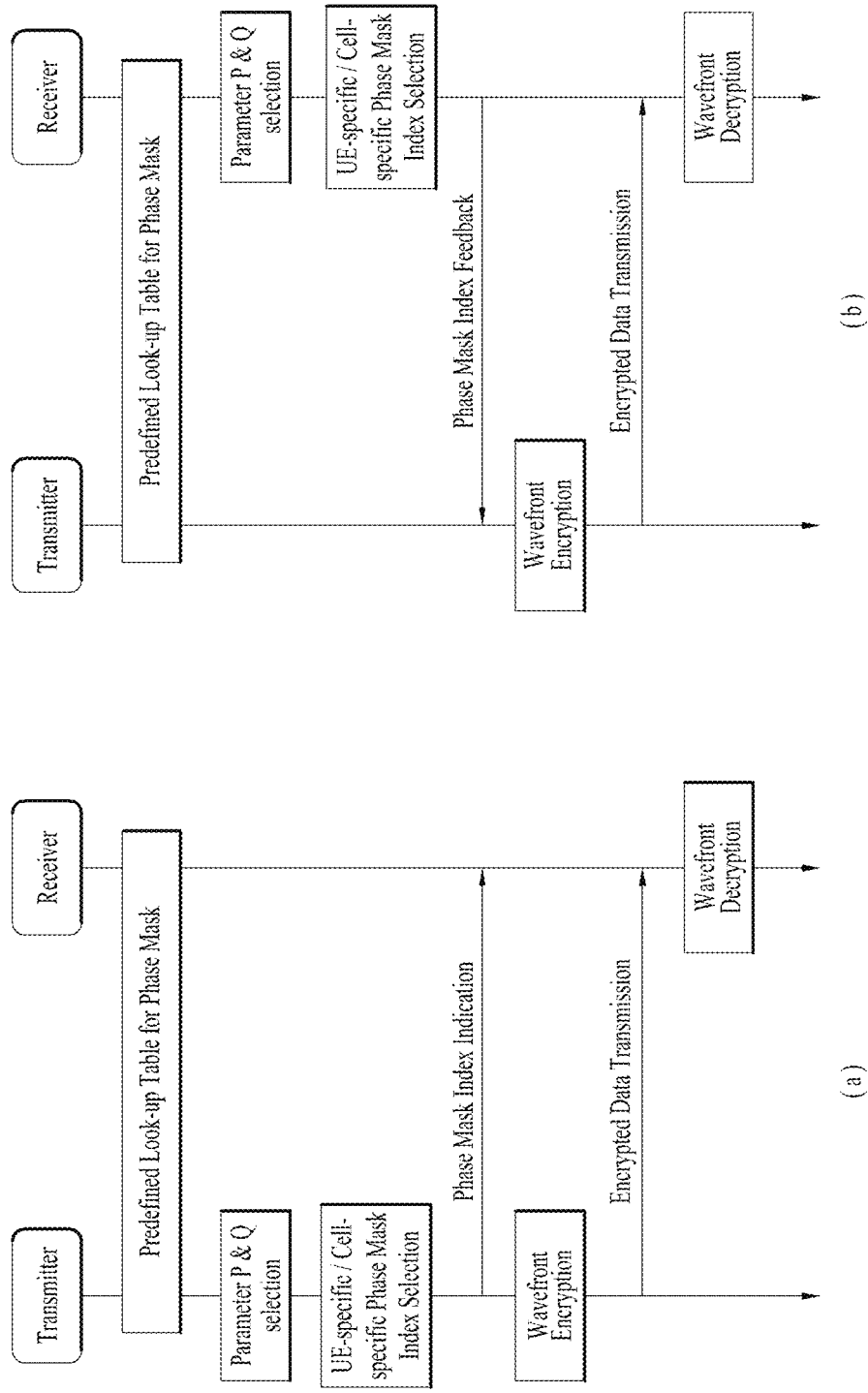
[FIG. 57]

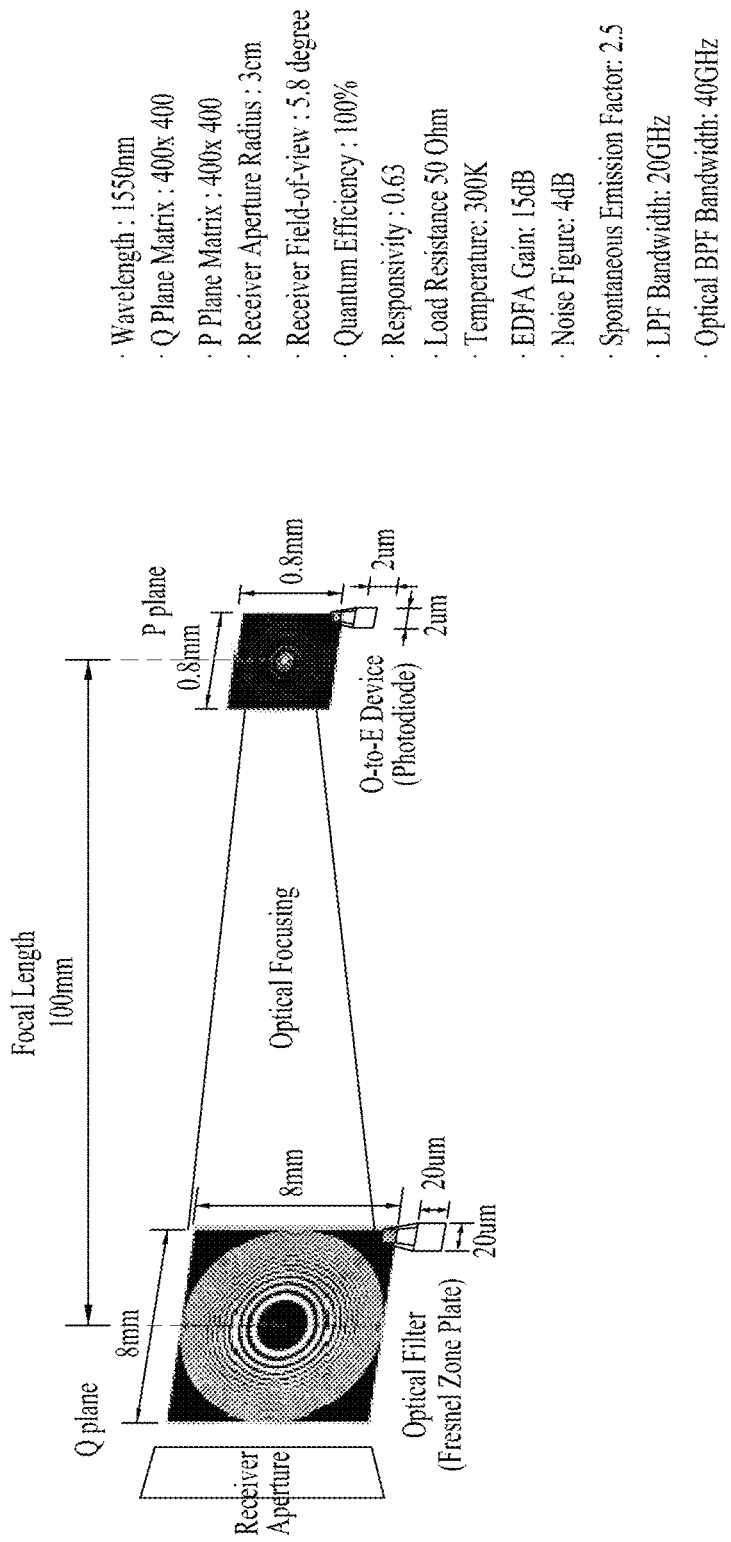

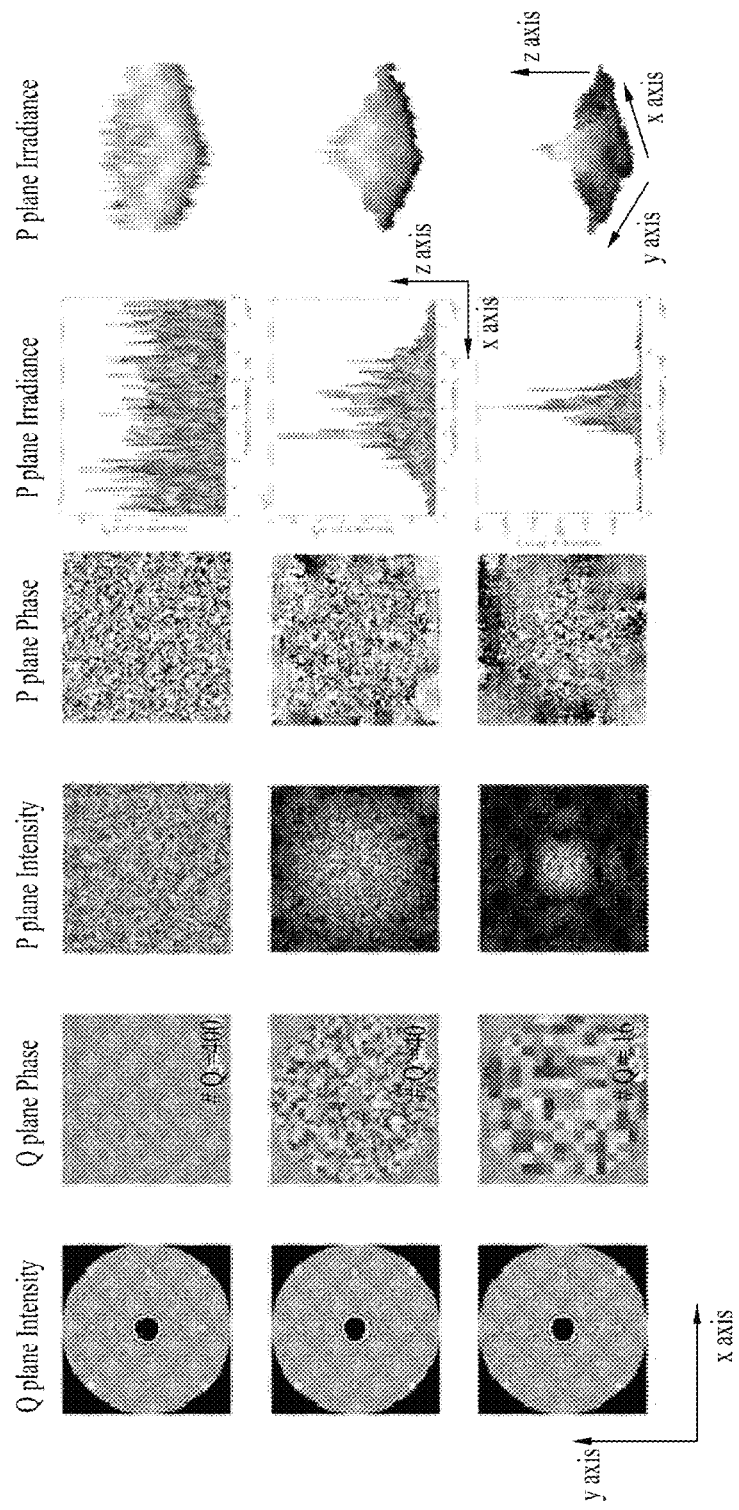
[FIG. 59]

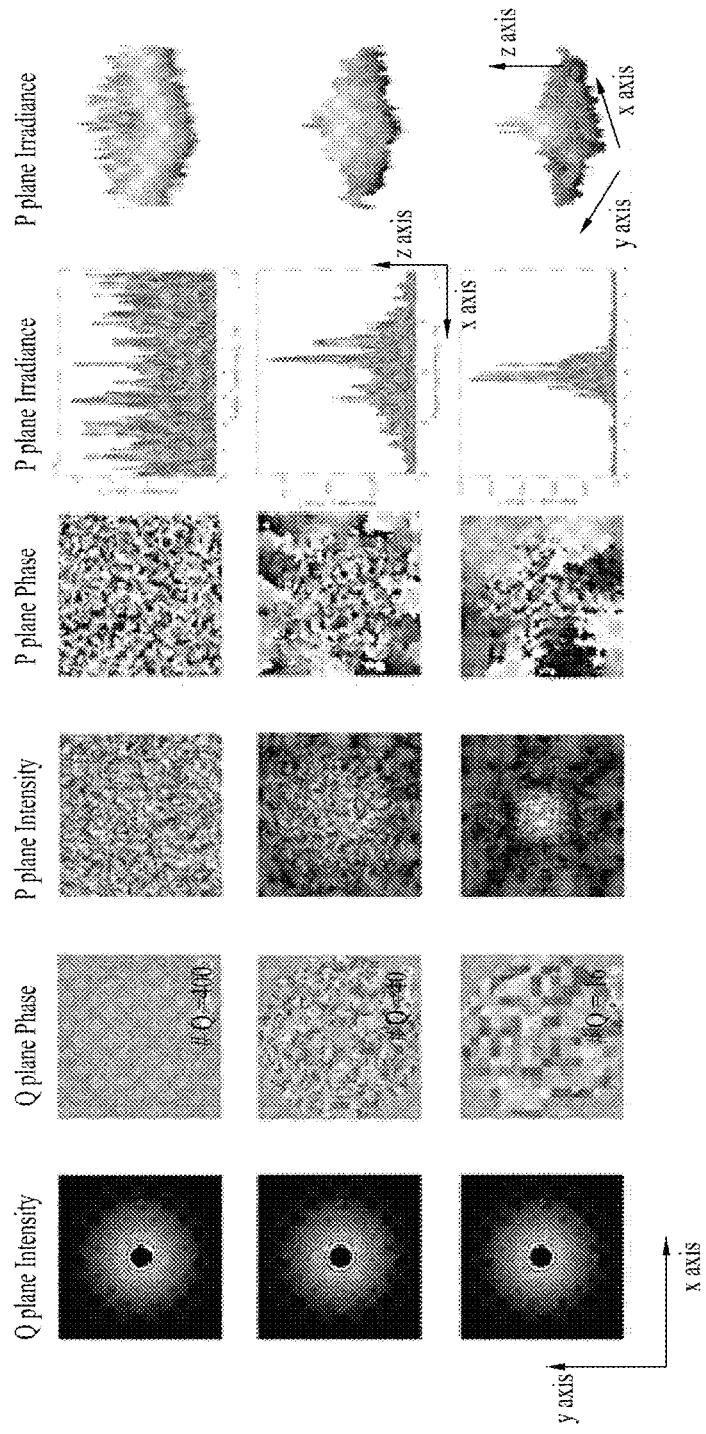
[FIG. 60]

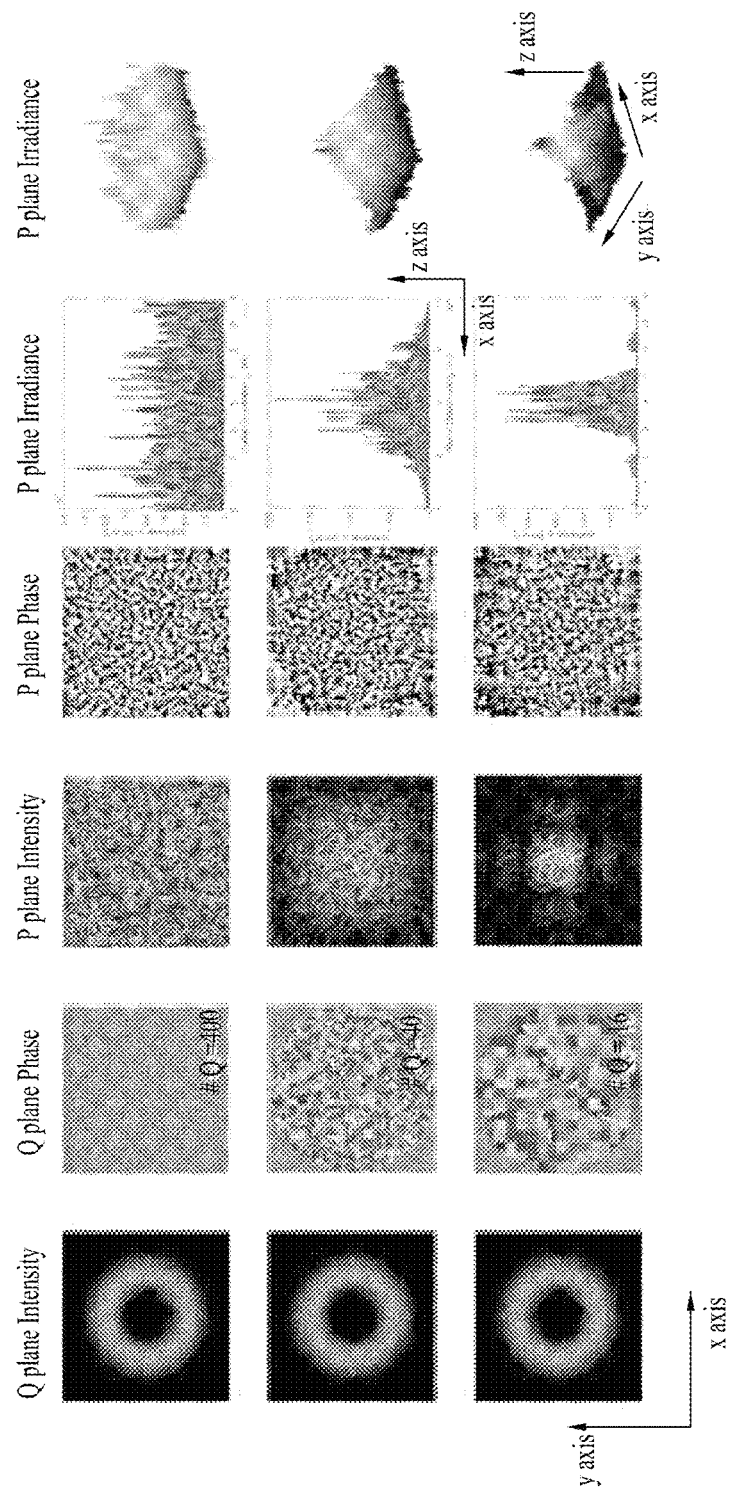
[FIG. 61]

[FIG. 62]
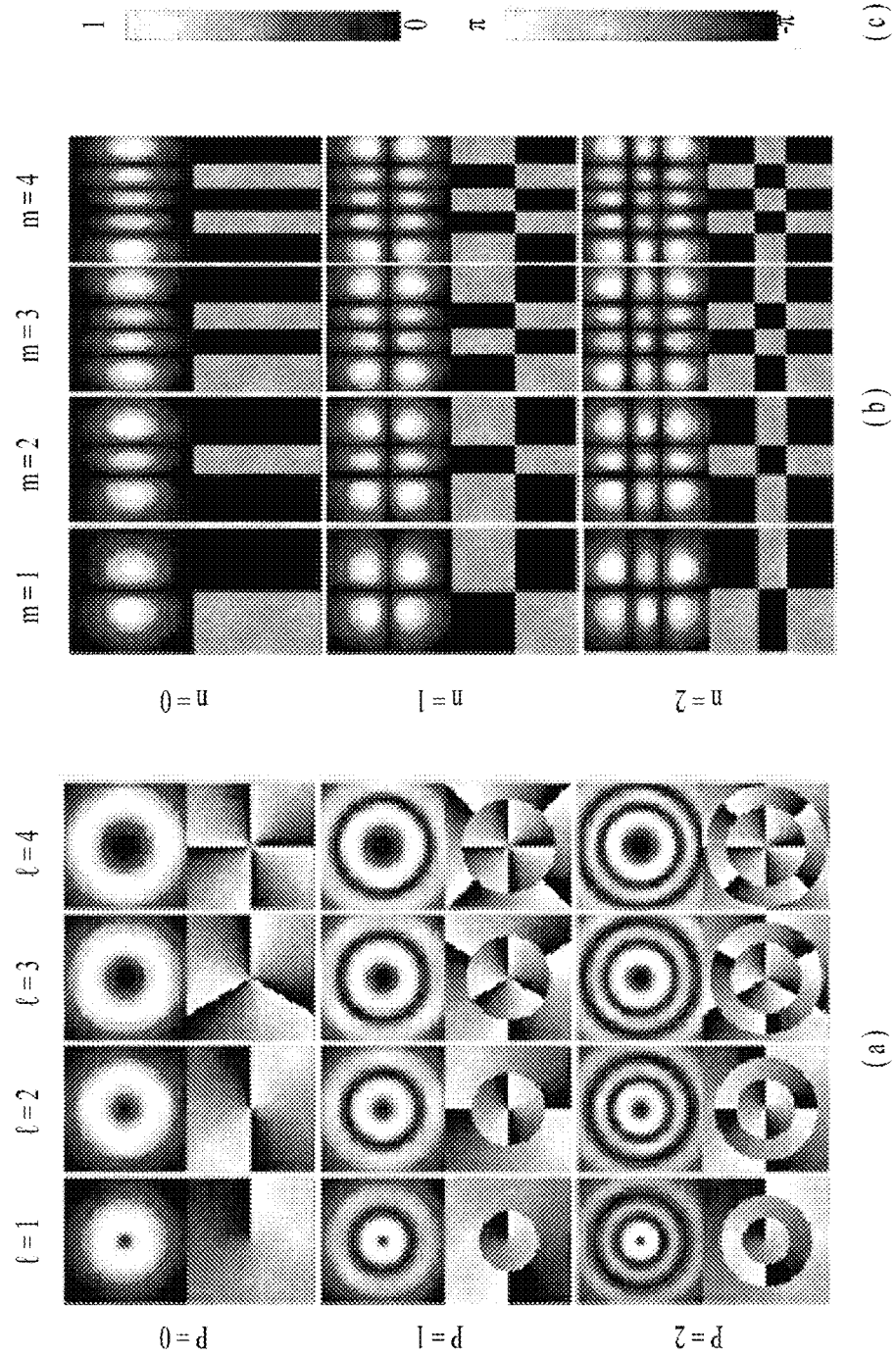

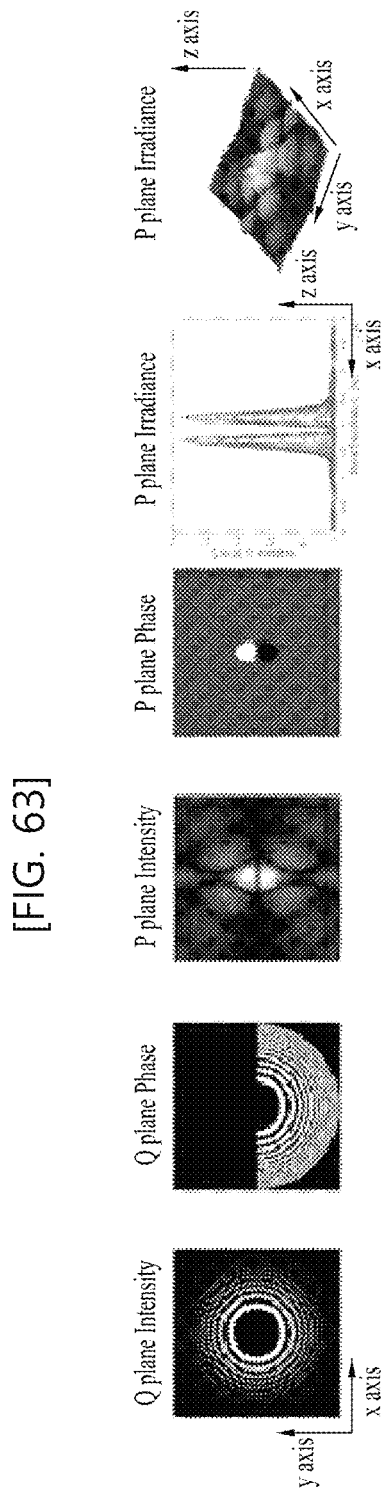
[FIG. 63]

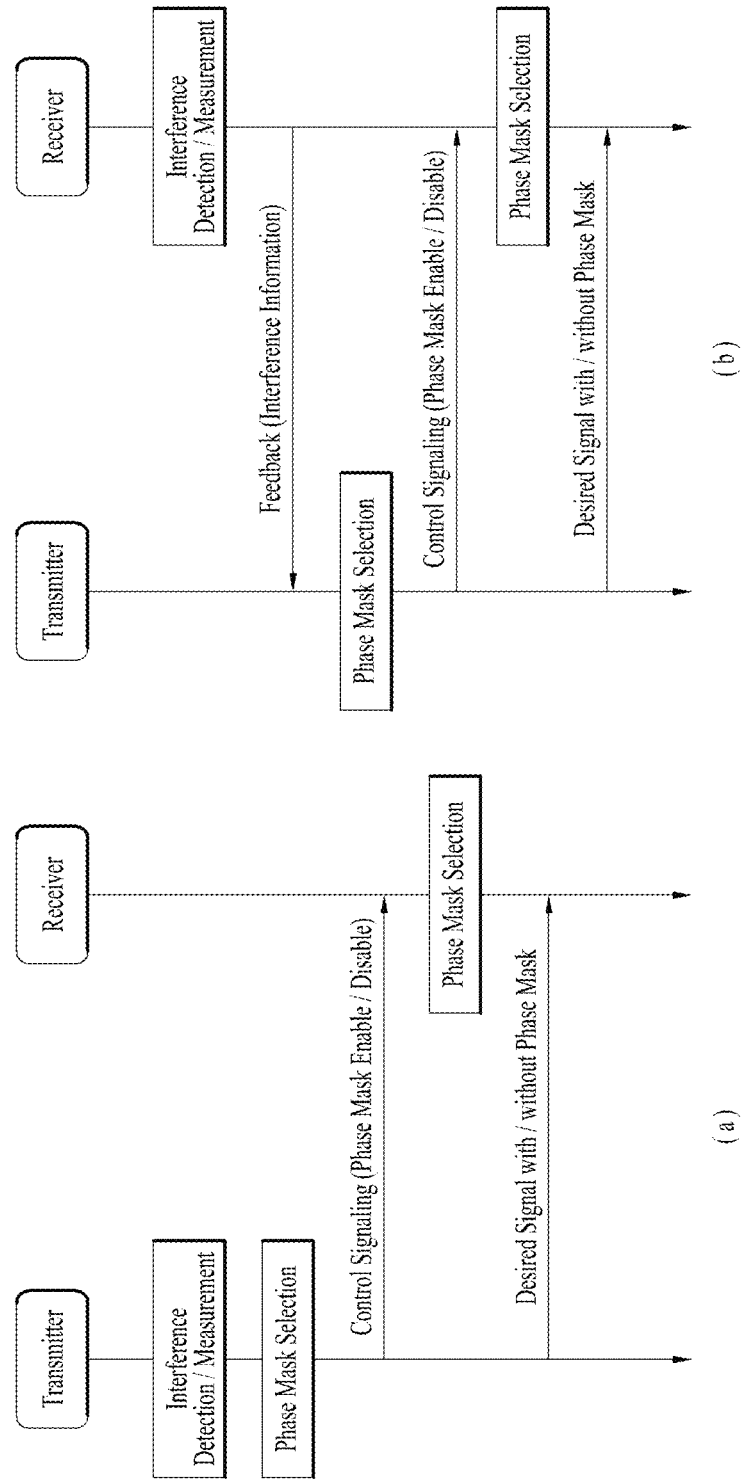
[FIG. 64]

[FIG. 65]
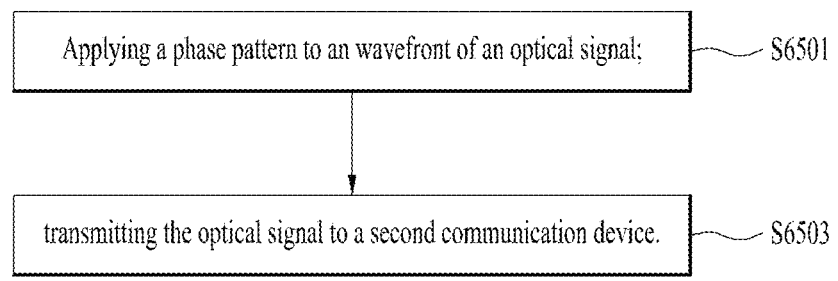

METHOD AND APPARATUS FOR TRANSMITTING AND RECEIVING SIGNALS IN OPTICAL WIRELESS COMMUNICATION SYSTEM

CROSS-REFERENCE TO RELATED APPLICATIONS

This application is the National Stage filing under 35 U.S.C. 371 of International Application No. PCT/KR2020/095080, filed on Apr. 29, 2020, the contents of which are all incorporated by reference herein in their entirety.

TECHNICAL FIELD

The present disclosure relates to a method and apparatus for transmitting and receiving signals in an optical wireless communication system. More particularly, the present disclosure relates to a method of encrypting a wavefront of an optical signal.

BACKGROUND ART

Optical wireless communication systems may be largely divided into visible light communication (VLC) systems and free-space optical (FSO) communication systems according to the frequency and purpose of photons.

VLC plays the role of lighting and communication at the same time. Information is transmitted by visible light, which may depend on the intensity of the light or the blinking of the light. To this end, visible light devices such as a light emitting diode (LED) is commonly used.

Free space optical (FSO) communication mainly plays the role of communication and is usually used in a free space environment or an environment where signal straightness is guaranteed. The FSO communication also covers ultraviolet (UV) and infrared (IR) light as well as visible light. Unlike VLC, FSO communication is not involved in lighting, so there are no restrictions on lighting. In general, not only LEDs but also devices based on the straightness of light such as light amplification by stimulated emission of radiation (LASER) are used.

On the other hand, conventional optical communication has a disadvantage in that it is difficult to guarantee decoding performance of a receiver due to the influence from an external interference light source. In particular, interference from strong sunlight may significantly reduce the receiver decoding performance. Therefore, there is a need for a method for transmitting and receiving optical wireless communication signals robust to external interference.

In addition, physical layer security in a wireless communication system can be effectively used to physically neutralize an eavesdropping attempt between the transmitter and the receiver. Accordingly, there is a need for a method for transmitting and receiving optical wireless communication capable of providing physical layer security.

DISCLOSURE

Technical Problem

An object of the present disclosure is to provide a receiving user equipment (UE) including a demodulator composed of at least one phase shifter and an optical-to-electrical (O-to-E) converter composed of at least one photodiode, and a method for efficiently receiving a signal by the receiving UE.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present disclosure provides a method and apparatus for transmitting and receiving signals in a wireless communication system.

In an aspect of the present disclosure, there is provided a method of transmitting and receiving a signal by a first communication apparatus in a wireless communication system. The method may include: applying a phase pattern to a wavefront of an optical signal; and transmitting the optical signal to a second communication device. The phase pattern may be determined based on optical phase shift characteristics of a phase mask, and the phase mask may be determined based on a quantization order and a phase order.

In another aspect of the present disclosure, there is provided a first communication apparatus configured to transmit and receive a signal in a wireless communication system. The first communication apparatus may include: at least one transceiver; at least one processor; and at least one memory operably connected to the at least one processor and configured to store instructions that, when executed, cause the at least one processor to perform operations. The operations may include: applying a phase pattern to a wavefront of an optical signal; and transmitting the optical signal to a second communication device. The phase pattern may be determined based on optical phase shift characteristics of a phase mask, and the phase mask may be determined based on a quantization order and a phase order.

In another aspect of the present disclosure, there is provided a method of transmitting and receiving a signal by a second communication device in a wireless communication system. The method may include: receiving an optical signal where a phase pattern is applied to a wavefront thereof; and decoding the optical signal. The phase pattern may be determined based on optical phase shift characteristics of a phase mask, and the phase mask may be determined based on a quantization order and a phase order.

In another aspect of the present disclosure, there is provided a second communication device configured to transmit and receive a signal in a wireless communication system. The second communication device may include: at least one transceiver; at least one processor; and at least one memory operably connected to the at least one processor and configured to store instructions that, when executed, cause the at least one processor to perform operations. The operations may include: receiving an optical signal where a phase pattern is applied to a wavefront thereof; and decoding the optical signal. The phase pattern may be determined based on optical phase shift characteristics of a phase mask, and the phase mask may be determined based on a quantization order and a phase order.

In another aspect of the present disclosure, there is provided an apparatus for a first communication device. The apparatus may include: at least one processor; and at least one computer memory operably connected to the at least one processor and configured to, when executed, cause the at least one processor to perform operations. The operations may include: applying a phase pattern to a wavefront of an optical signal; and transmitting the optical signal to a second communication device. The phase pattern may be determined based on optical phase shift characteristics of a phase mask, and the phase mask may be determined based on a quantization order and a phase order.

In a further aspect of the present disclosure, there is provided a computer-readable storage medium including at least one computer program that, when executed, causes at least one processor to perform operations. The operations may include: applying a phase pattern to a wavefront of an optical signal; and transmitting the optical signal to a second communication device. The phase pattern may be determined based on optical phase shift characteristics of a phase mask, and the phase mask may be determined based on a quantization order and a phase order.

In the methods and apparatuses, the quantization order and the phase order may be (i) selected by the first communication device or (ii) selected by the second communication device and received by the first communication device.

In the methods and apparatuses, the phase mask may be determined based on (i) an identifier (ID) of the first communication device or (ii) an ID of the second communication device.

In the methods and apparatuses, the phase mask may be used when interference to the optical signal is greater than or equal to a threshold. The interference may be (i) measured by the first communication device or (ii) measured by the second communication device and received from the second communication device.

In the methods and apparatuses, information on whether the phase mask is used may be (i) transmitted according to a communication method other than optical wireless communication or (ii) broadcast through the optical wireless communication.

In the methods and apparatuses, each of the communication devices may include an autonomous driving vehicle configured to communicate at least with a terminal, a network, and another autonomous driving vehicle other than the communication device.

It will be understood by those skilled in the art that the above-described aspects of the present disclosure are merely part of various embodiments of the present disclosure, and various modifications and alternatives could be developed from the following technical features of the present disclosure.

Advantageous Effects

As is apparent from the above description, a method for transmitting and receiving a signal in an optical wireless communication system according to the embodiments of the present disclosure can perform physical layer encryption through wavefront encryption. In addition, reception interference can be minimized through the wavefront encryption.

The above-described aspects of the present disclosure are merely some of the preferred embodiments of the present disclosure, and various embodiments reflecting the technical features of the present disclosure may be derived and understood by those skilled in the art based on the following detailed description of the disclosure.

DESCRIPTION OF DRAWINGS

The accompanying drawings, which are included to provide a further understanding of the disclosure, illustrate embodiments of the disclosure and together with the description serve to explain the principle of the disclosure.

FIG. 1 is a diagram illustrating an exemplary system for implementing the present disclosure.

FIG. 2 is a diagram illustrating an exemplary subframe structure in which a data channel and a control channel are multiplexed in time division multiplexing (TDM).

FIG. 3 is a diagram illustrating the OFDM modulation structure at the transmitting side of the conventional RF communication system.

FIGS. 4 to 5 are diagrams illustrating the structure of a multi-carrier modulation transmitter of a visible light communication system.

FIGS. 6 to 8 are diagrams illustrating examples of an optical wireless communication system.

FIGS. 9 to 13 are diagram illustrating an optical filter applicable to an optical wireless communication system and a method for acquiring a desired beam using the optical filter.

FIGS. 14 to 16 are diagrams illustrating examples of beam dispersion based on characteristics of optical resources used by the optical wireless system.

FIGS. 17 and 18 are diagrams illustrating differences in beam radius and phase characteristics according to an OAM mode of an OAM beam in the optical wireless communication system.

FIG. 19 is a diagram illustrating a structure of a transceiver of a physical layer security system based on a wavefront encryption scheme.

FIGS. 20 to 22 are diagrams illustrating a change in phase characteristics of an optical beam at a transmitter.

FIGS. 23 to 25 are diagrams illustrating a change in phase characteristics of an optical beam at a receiver.

FIG. 26 is a diagram illustrating a structure of a transceiver of an interference mitigation system based on a wavefront encryption scheme.

FIG. 27 is a diagram illustrating a change in phase characteristics of an optical beam at a receiver.

FIG. 28 is a diagram illustrating irradiance characteristics of a beam focused through an optical focusing filter based on phase characteristics.

FIG. 29 is a diagram illustrating the change in phase characteristics of an optical beam at a receiver.

FIGS. 30 and 31 are diagrams illustrating phases of signals affected by ambient interference.

FIGS. 32 and 33 are diagrams illustrating a change in phase characteristics at a receiver affected by interference from the sun.

FIG. 34 is a diagram illustrating a structure of a transceiver of an interference mitigation system based on wavefront encryption for use in a system including an orbital angular momentum (OAM) transceiver device.

FIG. 35 is a diagram illustrating a change in phase characteristics of an OAM-based optical beam at a transmitter.

FIG. 36 is a diagram illustrating a change in phase characteristics of an OAM-based optical beam at a receiver.

FIG. 37 is a diagram illustrating irradiance characteristics of a beam focused through an optical focusing filter based on phase characteristics.

FIGS. 38 and 39 are diagrams illustrating phases of signals affected by ambient interference.

FIGS. 40 to 42 are diagrams illustrating a phase mask information appointment under control of the transmitter.

FIGS. 43 to 47 are diagrams illustrating a phase mask information appointment based on measurement and feedback of the receiver.

FIGS. 48 and 49 are diagrams for explaining a quantization order.

FIGS. 50 and 51 are diagrams for explaining a phase order.

FIGS. 52 to 54 are diagrams for explaining phase mask generation.

FIGS. 55 to 57 are diagrams for explaining rules for indicating a quantization order and a phase order.

FIGS. 58 to 63 are diagrams for explaining interference dispersion performance depending on quantization orders.

FIG. 64 is a diagram for explaining phase mask selection based on interference recognition.

FIG. 65 illustrates a flowchart according to an embodiment of the present disclosure.

BEST MODE

Reference will now be made in detail to the preferred embodiments of the present disclosure, examples of which are illustrated in the accompanying drawings. In the following detailed description of the disclosure includes details to help the full understanding of the present disclosure. Yet, it is apparent to those skilled in the art that the present disclosure can be implemented without these details. For instance, although the following descriptions are made in detail on the assumption that a mobile communication system includes the 3GPP LTE and LTE-A and 5G systems, the following descriptions are applicable to other random mobile communication systems by excluding unique features of the 3GPP LTE and LTE-A systems.

Occasionally, to prevent the present disclosure from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. In addition, assume that a base station (BS) is a common name of such a random node of a network stage communicating with a terminal as a Node B (NB), an eNode B (eNB), an access point (AP) and the like.

In a mobile communication system, a UE can receive information from a BS in downlink and transmit information in uplink. The UE can transmit or receive various data and control information and use various physical channels depending types and uses of its transmitted or received information.

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE.

Moreover, in the following description, specific terminologies are provided to help the understanding of the present disclosure. And, the use of the specific terminology can be modified into another form within the scope of the technical idea of the present disclosure.

FIG. 1 is a diagram illustrating a system for implementing the present disclosure.

Referring to FIG. 1, a wireless communication system includes a BS 10 and one or more UEs 20. On downlink (DL), a transmitter may be a part of the BS 10 and a receiver may be a part of the UE 20. On uplink (UL), the BS 10 may include a processor 11, a memory 12, and a radio frequency (RF) unit 13 (transmitter and receiver). The processor 11 may be configured to implement the proposed procedures and/or methods disclosed in the present application. The memory 12 is coupled to the processor 11 to store a variety of information for operating the processor 11. The RF unit 13 is coupled to the processor 11 to transmit and/or receive radio signals. The UE 20 may include a processor 21, a memory 22, and an RF unit 23 (transmitter and receiver). The processor 21 may be configured to implement the proposed procedures and/or methods disclosed in the present application. The memory 22 is coupled to the processor 21 to store a variety of information for operating the processor 21. The RF unit 23 is coupled to the processor 21 to transmit and/or receive radio signals. The BS 10 and/or the UE 20 may include a single antenna and multiple antennas. If at least one of the BS 10 or the UE 20 includes multiple antennas, the wireless communication system may be called a multiple input multiple output (MIMO) system.

In the present specification, although the processor 21 of the UE and the processor 11 of the BS perform an operation of processing signals and data, except for a function of receiving or transmitting signals and a function of storing signals, the processors 11 and 21 will not be especially mentioned for convenience of description. Even though the processors 11 and 21 are not particularly mentioned, it may be said that the processors 11 and 21 perform operations of processing data except for a function of receiving or transmitting signals.

The present disclosure proposes various new frame structure for a 5th generation (5G) communication system. In the next generation 5G system, communication scenarios are classified into Enhanced Mobile Broadband (eMBB), Ultra-reliability and low-latency communication (URLLC), Massive Machine-Type Communications (mMTC), etc. Here, eMBB is the next generation mobile communication scenario having such properties as High Spectrum Efficiency, High User Experienced Data Rate, High Peak Data Rate and the like, URLLC is the next generation mobile communication scenario having such properties as Ultra Reliable, Ultra Low Latency, Ultra High Availability and the like (e.g., V2X, Emergency Service, Remote Control), and mMTC is the next generation mobile communication scenario having such properties as Low Cost, Low Energy, Short Packet, Massive Connectivity and the like (e.g., IoT).

FIG. 2 is a diagram illustrating an exemplary subframe structure in which a data channel and a control channel are multiplexed in time division multiplexing (TDM). In 5G NR, a frame structure in which a control channel and a data channel are multiplexed according to TDM like FIG. 2 may be considered in order to minimize latency.

In FIG. 2, the hatched area represents a transmission region of a DL control channel carrying DCI (e.g., PDCCH), and the last symbol represents a transmission region of a UL control channel carrying UCI (e.g., PUCCH). Here, the DCI is control information transmitted from a gNB to a UE and may include information on a cell configuration the UE should know, DL-specific information such as DL scheduling, UL-specific information such as a UL grant, etc. The UCI is control information transmitted from the UE to the gNB and may include a HARQ ACK/NACK report on DL data, a CSI report on a DL channel state, a scheduling request (SR), etc.

In FIG. 2, blank areas are available for flexible configuration of DL or UL periods to achieve DL/UL flexibility. For example, a blank area may be used as a data channel for DL data transmission (e.g., a physical downlink shared channel (PDSCH)) or a data channel for UL data transmission (e.g., a physical uplink shared channel (PUSCH)). This structure is characterized in that since a DL transmission and a UL transmission may be performed sequentially in one subframe, an eNB may transmit DL data in the subframe to a UE and receive an HARQ ACK/NACK signal for the DL data in the subframe from the UE. That is, the time required to retransmit data when a data transmission error occurs may be reduced, thereby minimizing the latency of final data transmission.

In the self-contained subframe structure, a time gap is necessary in order that the gNB and UE switch to a reception mode from a transmission mode, and vice versa. For the switching between the transmission mode and the reception mode, some OFDM symbols at the time of DL-to-UL switching may be configured as a guard period (GP) in the self-contained subframe structure.

In the case of an optical wireless communication system, there are generally single carrier modulation (SCM) methods based on-off keying (OOK) that represents signals based on flickering of visible light. In OOK modulation, digital signals 1 and 0 can be expressed according to ON and OFF states of the light source. OOK modulation can be modified by a modulation scheme such as pulse position modulation (PPM) which modulates an input signal into a clock-based pulse position.

Regarding the visible light communication system, research on multi-carrier modulation (MCM) schemes have been conducted. Compared to the single carrier modulation scheme, the MCM scheme is robust to multipath, and enables operation of a single tap equalizer. It is also robust to DC wandering and flickering interference. The MCM-based waveform for VLC must satisfy the conditions that i) it has only one dimension (real-value) signal and ii) it has unipolar characteristics.

FIG. 3 is a diagram illustrating the OFDM modulation structure at the transmitting side of the RF communication system. Referring to FIG. 3, an analog signal obtained through OFDM modulation is amplified through an RF power amplifier (PA). In this case, the maximum amplified magnitude of the signal may be limited by the performance limit of the PA.

On the other hand, the structure of a multi-carrier modulation transmitter of the visible light communication system as shown in FIGS. 4 to 5. More specifically, FIG. 4 shows the structure of a DCO-OFDM modulation transmitter of the VLC communication system, and FIG. 5 shows the structure of an ACO-OFDM modulation transmitter of the VLC communication system. In FIGS. 4 and 5, when an electrical-to-optical (E-to-O) device designed to use a band (e.g., an infrared band) other than visible light such as laser light emitted from LEDs is used in the edge device, the above-described situation may correspond to the range of free space optical communication.

FIG. 6 is a diagram illustrating a basic structure of an optical wireless communication system. In the basic structure of FIG. 6, the transmitter may transmit radio light, and the receiver may decode the radio light.

Referring to FIG. 6, the transmitter converts data to be transmitted (e.g., electrical signal) into a photon (optical) source by an electrical-to-optical (E-to-O) device and transmits the photon source to the receiver in a wireless environment. The photon source may be referred to as radio light.

Here, the radio light may be interpreted as a wave corresponding to a set of photons and classified into a plane wave and a spherical wave according to the shape of a wavefront. The plane wave refers to a wave with a straight or planar wavefront. For example, the plane wave may be artificially generated by resonance as in a laser beam. The spherical wave refers to a wave in which the wavefront forms a concentric spherical surface around a wave source when the wave source is a point in space. When the spherical wave propagates away, wavefronts are almost parallel to each other, so that the spherical wave may be regarded as the plane wave from the viewpoint of the receiver.

When the receiver receives a desired optical signal including data in a wireless environment, the receiver may receive i) interference from other sources and ii) solar interference from the sun along with the desired optical signal. The receiver may decode the desired optical signal into the data based on i) an optical filter for determining the radio light used for the desired optical signal, ii) an O-to-E device that converts the receiver radio light into an electrical signal, and iii) direct detection for analyzing the signal.

On the other hand, according to an example or implementation of the present disclosure shown in FIG. 7, the transmitter may transmit to the receiver in a wireless environment by i) converting data to be transmitted (e.g., electrical signal) into a photon source with an E-to-O device and ii) generating an optical beam with an optical beam generator.

In optics, radio light may be represented as a beam. In an example or implementation of the present disclosure, a case in which an optical beam is configured based on a transverse electromagnetic field/wave (TEM) mode corresponding to a resonant mode among transverse modes of electromagnetic radiation will be described.

The TEM mode may be divided into TEM1m by indices 1 and m according to beam formation. In general, the basic form of the TEM mode is a Gaussian beam, which is represented by TEM00. TEM00 refers to an optical beam in which a wave amplitude distribution on a cross-section perpendicular to an optical axis is expressed by a Gaussian function.

When the receiver receives a desired optical beam including data in a wireless environment, the receiver may receive i) interference from other sources and ii) solar interference from the sun along with the desired optical signal. The receiver may decode the desired optical beam into the data based on i) an optical filter for determining the radio light used for the desired optical beam, ii) an O-to-E device that converts the receiver radio light into an electrical signal, and iii) direct detection for interpreting the signal.

Next, initial access based on legacy links and initial access based on broadcast messages will be described.

1.1. Initial Access Based on Legacy Link

A transmitting UE and receiving UE may share initial information for optical wireless communication through legacy links (e.g., LTE, LTE-A, NR, WiFi, Bluetooth, etc.). The initial information for optical wireless communication may include the following.

i) Band for transmission and reception: This may mean a frequency band or light wavelength range for transmission and reception of data and control information.

ii) Polarization for transmission and reception: This may mean a polarization direction for transmission and reception of data and control information. For example, it may be agreed between the transmitting UE and receiving UE that data and control information is exchanged based on only vertical polarization for interference control.

iii) OAM mode for transmission and reception: This may mean an OAM mode index for transmission and reception of data and control information.

iv) Baseband modulation for transmission and reception: This may mean a baseband modulation method for transmission and reception of data and control information. For example, for data modulation and demodulation, i) an on/off keying (OOK) method may be used for single carrier modulation, or ii) an orthogonal frequency-division multiplexing (OFDM) method may be used as for multi-carrier modulation, which may be agreed between the transmitting UE and receiving UE.

1.2. Initial Access Based on Broadcast Message

A transmitting UE and receiving UE may share initial information based on broadcast messages. For example, the transmitting UE and receiving UE may broadcast a predetermined broadcast message on an optical or radio resource as in broadcast over a physical broadcast channel (PBCH) or common control channel of LTE/LTE-A in order to share the initial information for optical wireless communication. The initial information for optical wireless communication may be as follows.

i) Band for transmission and reception: This may mean a frequency band or light wavelength range for transmission and reception of data and control information.

ii) Polarization for transmission and reception: This may mean a polarization direction for transmission and reception of data and control information. For example, it may be agreed between the transmitting UE and receiving UE that data and control information is exchanged based on only vertical polarization for interference control.

iii) OAM mode for transmission and reception: This may mean an OAM mode index for transmission and reception of data and control information.

iv) Baseband modulation for transmission and reception: This may mean a baseband modulation method for transmission and reception of data and control information. For example, for data modulation and demodulation, i) an OOK method may be used for single carrier modulation, or ii) an OFDM method may be used as for multi-carrier modulation, which may be agreed between the transmitting UE and receiving UE.

2.1. Next, "Optical Wireless Broadband Communication Transmitter and Receiver Based on Photon OAM" Will be Described in Detail.

In an example or implementation of the present disclosure shown in FIG. 8, proposed is a system including: i) a transmitting UE transmitting a signal based on a photon OAM beam generator; and ii) a receiving UE using an optical filter for distinguishing a desired OAM beam from optical interference. According to the proposed system, it is possible to minimize interference from sunlight or other sources having the same band and same polarization as those of a desired optical beam.

If radio light is interpreted as an electromagnetic wave, the TEM mode may be classified depending on to the shape of a beam. The basic form of the TEM mode is generally a Gaussian beam, which is represented by TEM00. Hermite-Gaussian (HG) modes with rectangular transverse mode patterns are represented by TEMmn. LG modes with cylindrical transverse mode patterns are represented by TEMp1. In an example or implementation of the present disclosure, the LG modes (TEMp1) may be represented by photon OAM.

2.2. Transmitting UE

A transmitting UE may convert an electric source including data to be transmitted into an optical source with an E-to-O device. The converted optical source may be converted into a photon OAM beam by a photon OAM beam generator as follows.

i) The transmitting UE may convert the optical source into a Gaussian beam (TEM00) by passing the optical source through a resonator and then convert the Gaussian beam into the photon OAM beam (TEMp1) with a spiral phase plate.

ii) The transmitting UE may convert the optical source to a Gaussian beam (TEM00) by passing the optical source through a resonator, and convert the Gaussian beam into the photon OAM beam (TEMp1) by reflecting the Gaussian beam on a phase hologram with a spiral phase pattern.

iii) The transmitting UE may convert the optical source to a Gaussian beam (TEM00) by passing the optical source through a resonator and convert the Gaussian beam into the photon OAM beam (TEMp1) by reflecting the Gaussian beam on a phase hologram with a fork diffraction pattern.

iv) The transmitting UE may convert the optical source to a Hermite-Gaussian beam (TEMmn) by passing the optical source through a resonator and convert the Hermite-Gaussian beam into the photon OAM beam (TEMp1) by passing the Hermite-Gaussian beam through a cylindrical lens HG-LG mode converter (e.g., pi/2 mode converter).

In addition to methods i) to iv) described above, various methods capable of generating a photon OAM beam may be applied to examples or implementations of the present disclosure.

2.3. Receiving UE 2.3.1. Optical Filter

An optical filter provided in a receiving UE may include a general optical filter or a polarizing filter. The general optical filter is an optical element for receiving a band corresponding to a desired optical beam. The optical filter may include a filter that transmits with a constant transmittance regardless of wavelengths, a correction filter that controls light intensity in a specific wavelength range, and a light contrast filter. The optical filter may be classified into an infrared range filter, a visible range filter, an ultraviolet range filter, a vacuum ultraviolet range filter, and so on depending on frequency ranges. Filters in each range may have different materials and structures.

Alternatively, the optical filter may be a polarized light filter (polarization filter). The polarization filter is a filter based on polarization, i.e., a filter for passing only light vibrating in a specific direction in order to receive polarized light corresponding to a desired optical beam. In general, polarization mainly occurs when obliquely projection light is reflected from a uniform surface. Therefore, if the polarization filter is used to block light reflected from the surface of a glass window or object, a clear and sharp image may be obtained. For example, a camera has a polarization filter capable of adjusting and rotating a polarization direction. If an autofocus camera uses the polarization filter, the autofocus camera may not recognize light and thus lose a focus because only wavelengths vibrating in one direction remain. A solution to this phenomenon is a circular polarization filter.

2.3.2. Lens

A lens is a device for focusing a received optical source to a focal point based on the effect of refraction.

2.3.2.1. Focal Point Control Based on Wavelength

Referring to FIG. 9, an optical source passing through a convex lens or a Fresnel lens has different focal points depending on wavelengths. Based on this characteristic, the receiving UE may control the intensity concentration of the optical source received on a photodiode array. The photodiode array according to an example or implementation of the present disclosure refers to an array in which a plurality of light receiving elements performing O-to-E conversion are distributed in a specific area.

For example, when the focal point of green light is denoted by fgreen in FIG. 9, the focal points of blue light and red light are fblue and fred, respectively. It may be seen that the blue light, green light, and red light have different focal points. Based on this characteristic, the receiving UE may control the intensity of green light to be concentrated at the center of the photodiode array, the intensity of red light to spread over a larger area, and the intensity of blue light to spread over a further larger area.

Based on the above control, the receiving UE may receive a green light signal at the focal point of the green light more efficiently. The receiving UE may control focal points depending on wavelengths by i) controlling the thickness of the convex lens or Fresnel lens or ii) controlling the distance between the convex lens and the photodiode array.

2.3.2.2. Focal Point Control Based on OAM Mode

Referring to FIG. 10, an OAM optical source passing through a lens with an arbitrary refraction angle (e.g., Fresnel lens) has different focal points depending on mode indexes. Based on this characteristic, the receiving UE may control the intensity concentration of OAM modes received on the photodiode array.

For example, it may be seen from FIG. 10 that OAM mode +1, OAM mode 0, and OAM mode −1 have different focal points. In OAM mode 0, the receiving UE may control the intensity to be concentrated at the center of the photodiode array. In OAM mode −1, the receiving UE may control the intensity to spread over a larger area. In OAM mode +1, the receiving UE may control the intensity to spread over a further larger area.

When the focal point of OAM mode 0 is $f_0$, the focal point of mode index m, $f_m$ may be approximated as follows: $f_m = f_0 (1 + C \cdot m)$, where constant C is an OAM dispersion coefficient.

The receiving UE may control the focal points of OAM modes by i) controlling the thickness of the lens or Fresnel lens or ii) controlling the distance between an arbitrary lens and the photodiode array.

2.3.3. Fresnel Zone Plate

A Fresnel zone plate is a device for focusing a received optical source to a focal point based on the effect of diffraction. Specifically, the zone plate or Fresnel zone plate is a device for focusing materials with light or wave characteristics. Unlike lenses or curved mirrors, the zone plate may use diffraction instead of reflection and refraction. The zone plate consists of a set of radially symmetric rings that alternate between opaque and transparent areas, which is known as a Fresnel zone. Light hitting the zone plate is diffracted around an opaque area. The areas may be spaced apart so that diffracted light structurally interferes at a desired focal point to produce an image.

It may be seen from FIG. 11 that an optical source passing through the Fresnel zone plate have different wave characteristics or have different intensity distributions in a focal plane depending on OAM mode indexes. Based on these characteristics, the receiving UE may control the intensity distribution of the optical source received on the photodiode.

Referring to FIG. 11, when the optical source passing through the Fresnel zone plate is i) natural light such as sunlight or ii) plane wave light such as linearly polarized light or circularly polarized light, the intensity thereof may be concentrated at the center of the focal plane of the Fresnel zone plate.

When the optical source passing through the Fresnel zone plate is a plane wave light beam and a Gaussian beam, the intensity of the optical source may be distributed with a Gaussian distribution with respect to the center of the photodiode, which is located at the focal plane of the Fresnel zone plate.

When the optical source passing through the Fresnel zone plate is an LG beam corresponding to helical wave light, the intensity may be distributed in the form of a ring with respect to the center of the photodiode located at the focal plane of the Fresnel zone plate while maintaining the characteristics of an OAM state.

For example, in FIG. 11, OAM mode 0, OAM mode +3, and OAM mode +5 have different intensity distributions. In OAM mode 0, the receiving UE may control the intensity to be concentrated at the center of the photodiode with the Gaussian distribution. In OAM mode +3, the receiving UE may control the intensity to spread over a larger area in the form of a ring. In OAM mode +5, the receiving UE may control the intensity to spread over a further larger area in the form of a ring. In this case, for general plane wave light such as i) natural light such as sunlight and ii) linearly polarized or circularly polarized light, the intensity thereof may be concentrated in a very small area at the center of the photodiode. This area is smaller than the area in OAM mode 0 where the intensity is distributed at the center of the photodiode with the Gaussian distribution.

The receiving UE may control the intensity distribution of the optical source received on the photodiode by i) controlling a pattern according to the ring configuration of the Fresnel zone plate or ii) controlling the distance between the Fresnel zone plate and the photodiode.

2.3.4. Photon Sieve

A photon sieve is a device for focusing a received optical source to a focal point based on diffraction and interference effects. The photon sieve may include a flat sheet filled with pinholes arranged in a pattern similar to the ring of the Fresnel zone plate described above. The photon sieve may provide a much sharper focal point than the zone plate. The photon sieve is manufactured to include pinholes with various sizes and patterns and the characteristics of the focal point operation may vary depending on applications, so that the photon sieve may be used in various ways.

The receiving UE may control the intensity distribution of the optical source received on the photodiode based on i) wave characteristics of the optical source passing through the photon sieve or ii) the characteristic that the intensity distribution at the focal plane varies according to the OAM mode index.

When the optical source passing through the photon sieve is i) natural light such as sunlight or ii) plane wave light such as linearly or circularly polarized light, the intensity of the optical source may be concentrated at the center of the photodiode array located at the focal plane of the photon sieve.

When the optical source passing through the photon sieve is a plane wave light beam and a Gaussian beam, the intensity of the optical source is distributed with a Gaussian distribution with respect to the center of the photodiode array located at the focal plane of the photon sieve.

When the optical source passing through the photon sieve is an LG beam corresponding to helical wave light, the intensity may be distributed in the form of a ring with respect to the center of the photodiode array located at the focal plane of the photon sieve while maintaining the characteristics of an OAM state.

For example, in FIG. 12, OAM mode 0, OAM mode +3, and OAM mode +5 have different intensity distributions. In OAM mode 0, the receiving UE may control the intensity to be concentrated at the center of the photodiode with the Gaussian distribution. In OAM mode +3, the receiving UE may control the intensity to spread over a larger area in the form of a ring. In OAM mode +5, the receiving UE may control the intensity to spread over a further larger area in the form of a ring. In this case, for general plane wave light such as i) natural light such as sunlight, and ii) linearly polarized or circularly polarized light, the intensity thereof may be concentrated in a very small area at the center of the photodiode. This area is smaller than the area in OAM mode 0 where the intensity is distributed at the center of the photodiode with the Gaussian distribution.

The receiving UE may control the intensity distribution of the optical source received on the photodiode array by i) controlling a pattern according to the pinhole configuration of the photon sieve or ii) controlling the distance between the photon sieve and the photodiode array.

2.3.5. Phase Mask

A phase mask is a device for controlling a propagation direction according to the characteristics of a received optical source based on the effect of diffraction. The phase mask may include optical elements.

The receiving UE may control the position of the intensity distribution of the optical source received on the photodiode array based on i) the wave characteristics of the optical source passing through the phase mask (or pattern mask) or ii) the characteristic that the propagation direction of a beam changes depending on the OAM mode index.

For example, it may be seen from FIG. 13 that OAM mode 0, OAM mode +2, OAM mode −2, and OAM mode +3 have different intensity distribution positions. In this case, since general plane wave light such as i) natural light such as sunlight and ii) linearly or circularly polarized light has the same phase characteristics as a plane wave of OAM mode 0, the intensity thereof may be distributed in the third quadrant of a receiving plane in which the intensity distribution of OAM mode 0 is located. On the other hand, a lens serves to focus the optical source passing through the phase mask on the receiving plane.

The receiving UE may control the position of the intensity distribution of the optical source received on the photodiode array by i) controlling the phase elements constituting the phase mask or ii) controlling the distance between the phase mask and the photodiode array, the distance between the phase mask and the lens, and/or the distance between the lens and the photodiode array.

According to an example or implementation of the present disclosure, two or more of the above-described optical filters (e.g., lens, Fresnel zone plate, photon sieve, and phase mask) may be combined and applied to obtain each characteristic multiply. For example, the receiving UE may i) receive a specific wavelength with the general optical filter to control its received wavelength, ii) receive desired polarized light with the polarization filter, and iii) distinguish plane wave and spiral wave modes based on the characteristics of wave light with the photon sieve.

3.1. Divergence Angle of Gaussian Beam

FIG. 22 is a diagram for explaining the dispersion angle of a Gaussian beam in a far field. The dispersion angle of the Gaussian beam may be defined as shown in [Equation 1] below. In Equation 1, $k_o$ is a wave vector with a value of 2pi/lambda, and wo is a minimum beam waist, which may vary depending on beam formation.

$$\frac{\theta_o}{2} = \frac{2}{k_o w_y} = \frac{\lambda}{\pi w} \quad \text{[Equation 1]}$$

It is assumed that M2 is set to 1 (M2=1) when the transmitting UE forms a beam by optimally designing an M2 factor. Referring to FIG. 22, i) when waist=658 um and wavelength=700 nm, angle=338.6 urad (i.e., 0.0194 degrees). In addition, ii) when waist=375 um and wavelength=400 nm, angle=338.6 urad (i.e., 0.0194 degree). In this case, the radius of the beam is 3.4 mm at a distance of 10 m (distance=10 m).

3.2. Divergence Angle of LG Beam

FIGS. 23 and 24 are diagrams for explaining the divergence angle of an LG beam in a far field. The divergence angle of the LG beam is defined based on [Equation 2] to [Equation 4] below. Specifically, [Equation 2] shows a case where wo is fixed, and [Equation 4] shows a case where $r_{ms}(0)$ is fixed. Here, $k_o$ is a wave vector with a value of 2pi/lambda, and $w_o$ is a minimum beam waist, which may vary depending on beam formation. The relationship between ko and wo may be defined as shown in [Equation 5]

$$\alpha_\ell = \sqrt{\frac{|\ell|+1}{2}} \frac{2}{k_0 w_0} \quad \text{[Equation 2]}$$

$$\alpha_t = \frac{|\ell|+1}{k_0 r_{rms}(0)} \quad \text{[Equation 3]}$$

$$r_{rms}(0) = \sqrt{\frac{|\ell|+1}{2}} w_0 \quad \text{[Equation 4]}$$

It is assumed that M2 is set to 1 (M2=1) when the transmitting UE forms a beam by optimally designing an M2 factor. Referring to FIG. 23, the radius of the beam may appear as shown in FIG. 23 at a distance of 10 m (distance=10 m) according to Ill. Referring to FIG. 24, in the case of an OAM beam, the beam radius may vary depending on OAM order 1. Also, the beam size (e.g., beam radius) at the receiving UE may vary depending on the distance between the transmitting UE and receiving UE.

On the other hand, phase characteristics of the received wavefront may vary depending the OAM Order 1. For example, as shown in FIG. 17, a phase difference for an E-field may occur in accordance with OAM orders (or Modes). In this case, the term "phase" may indicate a change over time when viewed from the propagation direction of the light source in a situation where the E-field is represented by sine waves. Specifically, when the Y-axis of FIG. 18 indicates the vibration direction of the E-field, vibration of the E-field can be expressed as shown in FIG. 18. In FIG. 18, the graph depicting the E-field vibration over time may indicate the movement direction of light (i.e., the optical axis), and may represent the phase change over time. The change in phase may be determined by a wavelength (2) corresponding to one cycle, and the time (t) is a unit for a time during which the light travels, and the time (t=λ/c) (where c=2.99792458*$10^8$ m/s, luminous flux) during which the light travels by the distance corresponding to one cycle. Therefore, for attributes indicating that phase characteristics of the received wavefront vary depending on the OAM Order 1, the receiver must perform coherent combining while performing phase compensation. In addition, reception (Rx) decoding performance can be increased by changing the design of the receiver.

All of the above-described data transmission methods may have difficulty in guaranteeing decoding performance of the receiver due to the influence from an external interference light source. In particular, interference from strong sunlight may significantly reduce the decoding performance of the receiver. Therefore, there is a need for a method for transmitting and receiving optical wireless communication robust to external interference.

In addition, physical layer security in a wireless communication system can be effectively used to physically neutralize an eavesdropping attempt by a person who tries to eavesdrop between the transmitter and the receiver. Accordingly, there is a need for a method for transmitting and receiving optical wireless communication capable of providing physical layer security.

The present disclosure provides a method for performing wavefront encryption based on a phase mask in optical wireless communication.

3.1. Physical Layer Security System Based on Wavefront Encryption

In the system according to the present disclosure, according to a predefined agreement between a transmitter and a receiver, the transmitter may perform wavefront encryption through a phase mask, and the receiver may perform wavefront decryption through an inverse phase mask of the phase mask applied at the transmitter.

The transceiver structure of the physical layer security system based on wavefront encryption is as shown in FIG. 19. In FIG. 19, the transmitter may convert data for optical wireless communication into an optical resource, and the converted optical resource (e.g., an optical beam) passes through the phase mask so that a phase pattern of the phase mask can be applied to the wavefront. For example, in the transmitter, the phase characteristics of the optical beam can be converted as shown in FIG. 20.

In FIG. 20, it is assumed that the gray color denotes "Phase=0", the black color denotes "Phase=n", and the white color denotes "Phase=−π". Assuming that the phase of a wavefront of an optical beam having passed through the electrical-to-optical (E-to-O) device of the transmitter is an in-phase plane wave (e.g., Gaussian beam), the phase of the wavefront can be depicted in the (x, y) two-dimensional plane as shown in the left view of FIG. 20. When the optical beam passes through a phase mask (see the middle view of FIG. 20) having a specific pattern, a desired optical beam may have the shape of an encrypted wavefront as shown in the right view of FIG. 20. That is, the wavefront plane is depicted as a wavefront composed of a specific pattern in the in-phase plane waves. For example, it is assumed that, when the z axis is referred to as a time axis (i.e., the traveling direction of the optical beam, or the optical axis) as shown in FIG. 21, the optical beam having the shape of a plane wave has passed through the phase mask by which a phase is changed based on a delay. Then, as shown in FIG. 21, the phase of the encrypted wavefront is changed according to delay characteristics of the phase mask so that the wavefront can be formed.

In FIG. 21, when the phase of a portion of the beam having passed through the medium having a specific length corresponding to "Delay=b" is zero '0', the phase of a portion of the beam (e.g., the beam corresponding to "Delay=a") having passed through the shorter medium can be shifted by "−π", and the phase of a portion of the beam having passed through the longer medium (e.g., the beam corresponding to "Delay=c") can be shifted by "π". Since the above-described concepts are applied to both the X-axis and the Y-axis, the optical beam can be encrypted according to the phase pattern when viewed from the (x, y) two-dimensional (2D) plane of the wavefront.

Referring to FIG. 22, a phase mask may be formed through at least one phase shifter (e.g., a phase shifter array), and each portion of a single phase shifter may also be formed to perform functions of different phase shifters. In the latter case indicating that the respective portions of the phase shifter are configured to perform the functions of different phase shifters, when an optical beam is irradiated to a hologram using the optical element designed to use a hologram pattern, the phase of the reflected optical beam can be deformed.

On the other hand, the receiver receives the encrypted optical beam and allows the received beam to penetrate the inverse phase mask for compensating for the phase pattern used for encryption at the transmitter, thereby converting the encrypted wavefront into the original planar wave. For example, in the receiver, the phase characteristics of the optical beam can be converted, as shown in FIG. 23.

In FIG. 23, it is assumed that the gray color denotes "Phase=0", the black color denotes "Phase=n", and the white color denotes "Phase=−π". The phase of the encrypted wavefront received in the receiver can be depicted in the (x, y) two-dimensional plane as shown in the left view of FIG. 23. When the encrypted optical beam passes through an inverse phase mask (see the middle view of FIG. 23) corresponding to a phase mask of a specific pattern used in the transmitter, the encrypted optical beam may have the shape of a decrypted wavefront as shown in the right view of FIG. 23. That is, the wavefront plane is depicted as a plane wave having an in-phase in a wavefront composed of a specific pattern. For example, it is assumed that, when the z axis is referred to as a time axis (i.e., the traveling direction of the optical beam, or the optical axis) as shown in FIG. 24, the encrypted optical beam having the shape of an encrypted wavefront to which the phase of a specific pattern is applied has passed through the inverse phase mask by which the phase is changed based on a delay. Then, as shown in FIG. 21, the phase of the decrypted wavefront is changed according to delay characteristics of the inverse phase mask so that the wavefront having the shape of plane waves can be formed.

In FIG. 24, when the phase of a portion of the beam having passed through the medium having a specific length corresponding to "Delay=b" is zero '0', the phase of a portion of the beam (e.g., the beam corresponding to "Delay=a") having passed through the shorter medium can be shifted by "−π", and the phase of a portion of the beam having passed through the longer medium (e.g., the beam corresponding to "Delay=c") can be shifted by "π". As a result, the phase of each point of the deformed encrypted wavefront is compensated to zero '0' at the transmitter, so that the phase of the decrypted wavefront can reach the in-phase state and indicates the shape of a plane wave. Since the above-described concepts are applied to both the X-axis and the Y-axis, the encrypted optical beam can be encrypted according to the inverse phase pattern when viewed from the (x, y) two-dimensional (2D) plane of the wavefront.

Referring to FIG. 25, in the above-described concept, the inverse phase mask may form at least one phase mask (i.e., the structure of a phase shifter array), and a single phase shifter may be formed to perform a function of another phase shifter that is partially different in shape (i.e., an optical element designed to use a hologram pattern, so that, when the optical beam is irradiated to the hologram, the phase of the reflected optical beam may be deformed).

Through the above-described method, a physical layer security function can be performed in the optical wireless communication system. For example, when the eavesdropper attempts to perform decryption by stealing or branching a desired optical beam, if the eavesdropper does not know information of the phase mask that has been used in the transmitter, it may be impossible to perform decryption. Accordingly, information about the phase mask promised between the transmitter and the receiver may allow the function of a physical layer encryption key to be made available.

3.2. Wavefront Encryption-Based Interference Mitigation System

The system according to the present disclosure may allow the transmitter to perform a wavefront encryption through a phase mask according to a predefined promise between the transmitter and the receiver, may allow the receiver to perform wavefront decryption through the inverse phase mask of the phase mask applied to the transmitter, and may mitigate interference by performing optical focusing through the optical filter designed to use phase characteristics.

The transceiver structure of the interference mitigation system based on the wavefront encryption is as shown in FIG. 26. As described above in Section 1, the transmitter may convert data for optical wireless communication into an optical resource, and the converted optical resource (e.g., the optical beam) may pass through the phase mask, so that a phase pattern of the phase mask can be applied to the wavefront. The desired optical beam having passed through the phase mask formed to have a particular pattern may have the shape of an encrypted wavefront. In addition, as described above in Section 1, the receiver may receive the encrypted optical beam, the encrypted optical beam may pass through the inverse phase mask formed to compensate for the phase pattern used for encryption at the transmitter, so that the encrypted wavefront can be converted into the original plane waves. The original plane wave converted into the original plane wave may perform optical focusing through the optical filter (e.g., Fresnel Zone Plate, Photon Sieve, etc.) designed to use phase characteristics. For example, in the receiver, the phase characteristics of the optical beam can be converted as shown in FIG. 27.

In FIG. 27, it is assumed that the gray color denotes "Phase=0", the black color denotes "Phase=π", and the white color denotes "Phase=−π". However, referring to the Fresnel zone plate shown in FIG. 27, the black color denotes a physically blocked space (i.e., the optical resource cannot pass through the blocked space) regardless of the phase, and the white color denotes a physically opened space (i.e., the optical resource can pass through the opened space) regardless of the phase. The phase of the encrypted wavefront received in the receiver can be depicted in the (x, y) two-dimensional plane as shown in the left-first view of FIG. 27. When the encrypted optical beam passes through the inverse phase mask (i.e., the left-second view of FIG. 27) corresponding to the specific-patterned phase mask used at the transmitter, the encrypted optical beam may have the shape of a decrypted wavefront corresponding to the left-third view of FIG. 27. That is, the wavefront plane is depicted as a plane wave in which the phase of a wavefront having a specific pattern is at the in-phase. When the decrypted wavefront formed in the plane wave passes through the optical focusing filter (such as the Fresnel zone plate) based on the phase characteristics, there may appear irradiance characteristics of the focused beam incident upon the O-to-E device (e.g., the photodiode) as shown in FIG. 28.

In FIG. 28, the left view represents a focused beam represented by the (x, y) two-dimensional plane. In FIG. 28, the white color denotes the area of the optical beam having the strongest irradiance, and the black color denotes the area of the optical beam having the weakest irradiance. When the intensity of irradiance is represented by the Z-axis, the intensity of irradiance can be expressed as a three-dimensional (3D) irradiance as shown in the middle view of FIG. 28. An example of measuring the intensity of irradiance is shown in the right view of FIG. 28. That is, if the plane wave-shaped decrypted wavefront passes through the phase characteristic-based optical focusing filter such as the Fresnel zone plate, irradiance may be strengthened by constructive interference at the focal point. As the plane wave-shaped decrypted wavefront moves away from the focal point, irradiance may be weakened by destructive interference. Therefore, if the phase mask used at the transmitter is accurately compensated through the inverse phase mask used at the receiver, the optical beam can be optimally collected at the focal point through the Fresnel zone plate.

On the other hand, in the case of an interference signal caused by ambient interference (i.e., in the case of interference from other optical resources), the phase characteristics of the optical beam can be converted in the receiver as shown in FIG. 29. In FIG. 29, it is assumed that the gray color denotes "Phase=0", the black color denotes "Phase=π", and the white color denotes "Phase=−π". However, referring to the Fresnel zone plate shown in FIG. 29, the black color denotes a physically blocked space (i.e., the optical resource cannot pass through the blocked space) regardless of the phase, and the white color denotes a physically opened space (i.e., the optical resource can pass through the opened space) regardless of the phase. The phase of the encrypted wavefront received in the receiver can be depicted in the (x, y) two-dimensional plane as shown in the left-first view of FIG. 29. In the case of ambient interference, as the encrypted optical beam affected by ambient interference passes through the inverse phase mask (see the left-second view of FIG. 29) not corresponding to the specific-patterned phase mask used in the transmitter, there may occur mismatch phase pattern information, resulting in formation of the decrypted wavefront corresponding to the left-third view of FIG. 29. In other words, the wavefront plane is depicted as a wavefront having a different pattern in a wavefront composed of the specific pattern, and may have a random phase pattern. Since the signal affected by ambient interference does not use the inverse phase mask matched with the phase pattern used at the transmitter, the phase incident upon the Fresnel zone plate can be expressed as shown in FIG. 30.

In other words, in the plane waves having the same phase, as the wavefront having a random phase is incident upon the Fresnel zone plate by which optical focusing is performed at the focal point, the focusing function is lost, and destructive interference occurs in the focal plane, so that irradiance can be dispersed. When the decrypted wavefront of the random pattern passes through the phase characteristic—based optical focusing filter such as a Fresnel zone plate, irradiance characteristics of the focused beam incident upon the O-to-E device (e.g., a photodiode) may appear as shown in FIG. 31.

In FIG. 31, the left view represents a focused beam represented by the (x, y) two-dimensional plane. In FIG. 31, the white color denotes the area of the optical beam having the strongest irradiance, and the black color denotes the area of the optical beam having the weakest irradiance. When the intensity of irradiance is represented by the Z-axis, the intensity of irradiance can be expressed as a three-dimensional (3D) irradiance as shown in the middle view of FIG. 31. An example of measuring the intensity of irradiance is shown in the right view of FIG. 31. That is, when the decrypted wavefront formed in a random phase pattern shape passes through the phase characteristic-based optical focusing filter such as the Fresnel zone plate, irradiance may be weakened by destructive interference at the total focal plane. Therefore, the phase mask used at the transmitter and the inverse phase mask of the receiver are used differently, thereby minimizing undesired interference from the focal plane through the Fresnel zone plate. In this case, the desired optical beam can maximize the amount of desired information at the focal point, because the phase mask is matched between the transmitter and the receiver. That is, when a signal causing interference and a desired signal are received together, a signal to interference ratio (SIR) for the desired signal and the interference signal can be maximized. Based on the irradiance obtained from the experimental data shown in FIG. 31, a difference in peak magnitude between the desired signal and the interference signal represents a difference of about 500 times.

On the other hand, the influence of sunlight can also be reduced in a similar way to those of FIG. 31. In the case of interference from the sunlight (i.e., the sun), the phase characteristics of the optical beam can be converted at the receiver as shown in FIG. 32.

In the case of sunlight interference, as the wavefront having plane wave characteristics passes through the inverse phase mask (see the left-second view of FIG. 32), the resultant wavefront becomes a wavefront in which the phase pattern information of the inverse phase mask is decrypted as it is, resulting in formation of a decrypted wavefront corresponding to the left-third view of FIG. 32. In other words, in the plane waves having the same phase, as the wavefront having a phase pattern designed as the inverse phase mask is incident upon the Fresnel zone plate by which optical focusing is performed at the focal point, the focusing function is lost, and destructive interference occurs in the focal plane, so that irradiance of the focused beam incident upon the O-to-E device (e.g., the photodiode) appears as shown in FIG. 33.

In more detail, when the decrypted wavefront formed in a phase pattern shape corresponding to the inverse phase mask passes through the phase characteristic-based optical focusing filter such as the Fresnel zone plate, irradiance may be weakened by destructive interference at the total focal plane. Therefore, if the inverse phase mask of the receiver is applied to an arbitrary interference signal (such as sunlight) that is not encrypted, undesired interference can be minimized on the focal plane through the Fresnel zone plate. In this case, the desired optical beam can maximize desired information at the focal point because the phase mask is matched between the transmitter and the receiver. That is, when a signal causing interference and a desired signal are received together, a signal to interference ratio (SIR) for the desired signal and the interference signal can be maximized. Based on the irradiance obtained from the experimental data shown in FIG. 33, a difference in peak magnitude between the desired signal and the interference signal represents a difference of about 500 times.

3.3. Wavefront Encryption-Based Interference Mitigation for use in System using the OAM transceiver According to the disclosure shown in the above-described Sections 3.1 to 3.2, the system can operate equally even when orbital angular momentum (OAM) is applied to the optical beam transmitted from the transmitter.

In the system according to the present disclosure, according to the predefined promise between the transmitter and the receiver, the transmitter generates an OAM beam through the OAM generator and performs wavefront encryption through the phase mask, and the receiver performs wavefront decryption through the inverse phase mask of the phase mask applied to the transmitter and mitigates interference by performing optical focusing through the optical filter designed to use the phase characteristics.

FIG. 34 is a diagram illustrating the structure of a transceiver of an interference mitigation system based on a wavefront encryption for use in the system designed to use the OAM transceiver. As can be seen from the beginning part of Section 2, the transmitter may convert data for optical wireless communication into an optical resource, may convert the optical resource into an OAM beam through the photon OAM beam generator, so that the phase pattern of the phase mask can be applied to a helical wavefront having OAM characteristics. The desired optical beam having passed through the phase mask composed of a specific pattern may have the shape of the encrypted wavefront. For example, in the transmitter, the phase characteristics of the optical beam can be converted as shown in FIG. 35.

In FIG. 35, it is assumed that the gray color denotes "Phase=0", the black color denotes "Phase=π", and the white color denotes "Phase=−π". Assuming that the phase of the wavefront of the optical beam having passed through the E-to-O device and the OAM generator of the transmitter is shown as a helical wave (e.g., Laguerre-Gaussian (LG) beam) that varies depending on the OAM order, the phase of the wavefront can be depicted in the (x, y) two-dimensional (2D) plane as shown in the left view of FIG. 35. When the optical beam passes through the phase mask (i.e., the middle view of FIG. 35) having a specific pattern, the desired optical beam may have the shape of an encrypted wavefront as shown in the right view of FIG. 35. That is, the wavefront plane is depicted as a wavefront coupled to a specific pattern in the helical waves that varies depending on the OAM order.

In addition, as disclosed in Section 2 above, the receiver receives the encrypted optical beam and allows the beam to pass through the inverse phase mask to compensate for the phase pattern used for encryption at the transmitter, so that the encrypted wavefront can be converted into the original helical wave. The original helical wave converted into the original helical wave may perform optical focusing through an optical filter (e.g., a Fresnel zone plate, a photon sieve, etc.) designed to use phase characteristics. For example, in the receiver, the phase characteristics of the optical beam can be converted as shown in FIG. 36.

In FIG. 36, it is assumed that the gray color denotes "Phase=0", the black color denotes "Phase=π", and the white color denotes "Phase=−π". However, referring to the Fresnel zone plate shown in FIG. 36, the black color denotes a physically blocked space (i.e., the optical resource cannot pass through the blocked space) regardless of the phase, and the white color denotes a physically opened space (i.e., the optical resource can pass through the opened space) regardless of the phase. The phase of the encrypted wavefront received in the receiver can be depicted in the (x, y) two-dimensional plane as shown in the left-first view of FIG. 36. When the encrypted optical beam passes through the inverse phase mask (i.e., the left-second view of FIG. 36) corresponding to the specific-patterned phase mask used at the transmitter, the encrypted optical beam may have the shape of a decrypted wavefront corresponding to the left-third view of FIG. 36. That is, the wavefront plane is depicted as a helical wave in which the phase of a wavefront having a specific pattern varies depending on the OAM order. When the decrypted wavefront formed in the helical wave passes through the phase characteristic—based optical focusing filter such as the Fresnel zone plate, there may appear irradiance characteristics of the focused beam incident upon the O-to-E device (e.g., the photodiode) as shown in FIG. 37.

In FIG. 37, the left view represents a focused beam represented by the (x, y) two-dimensional plane. In FIG. 37, the white color denotes the area of the optical beam having the strongest irradiance, and the black color denotes the area of the optical beam having the weakest irradiance. When the intensity of irradiance is represented by the Z-axis, the intensity of irradiance can be expressed as a three-dimensional (3D) irradiance as shown in the middle view of FIG. 37. An example of measuring the intensity of irradiance is shown in the right view of FIG. 37. That is, if the helical wave-shaped decrypted wavefront passes through the phase characteristic-based optical focusing filter such as the Fresnel zone plate, irradiance may be strengthened by constructive interference at the focal point. As the helical wave-shaped decrypted wavefront moves away from the focal point, irradiance may be weakened by destructive interference. Therefore, if the phase mask used at the transmitter is accurately compensated through the inverse phase mask used at the receiver, the optical beam can be optimally collected at the focal point through the Fresnel zone plate.

On the other hand, in the same manner as described in Section 2, in the case of ambient interference (i.e., interference from other optical resources), since the encrypted optical beam from the ambient interference passes through the inverse phase mask (the left-second view of FIG. 38) not corresponding to the phase mask of the particular pattern used at the transmitter, phase pattern information is not matched, so that the decrypted optical beam has the shape of a wavefront having a random phase.

In other words, in the helical wave varying depending on the OAM order, as the wavefront having a random phase is incident upon the Fresnel zone plate by which optical focusing is performed at the focal point, the focusing function is lost, and destructive interference occurs in the focal plane, so that irradiance can be dispersed. When the decrypted wavefront formed in a random phase shape passes through the phase characteristic—based optical focusing filter such as a Fresnel zone plate, irradiance characteristics of the focused beam incident upon the O-to-E device (e.g., a photodiode) may appear as shown in FIG. 39.

Therefore, the phase mask used at the transmitter and the inverse phase mask of the receiver are used differently, thereby minimizing undesired interference from the focal plane through the Fresnel zone plate. In this case, the desired optical beam can maximize the amount of desired information at the focal point, because the phase mask is matched between the transmitter and the receiver. That is, when a signal causing interference and a desired signal are received together, a signal to interference ratio (SIR) for the desired signal and the interference signal can be maximized. Based on the irradiance obtained from the experimental data shown in FIG. 39, a difference in peak magnitude between the desired signal and the interference signal represents a difference of about 20 times.

3.4. Phase Mask Information Promise Between Transmitter and Receiver-Based on Control of Transmitter 3.4.1. Tx-Rx Initial Access Based on Legacy Link The transmitter and the receiver may share initial information for optical wireless communication through a legacy link (e.g., LTE, LTE-A, NR, Wi-Fi, Bluetooth, etc.). The initial information for optical wireless communication may include phase mask information for encryption and encryption period information.

3.4.2. Broadcast Message-based Tx-Rx Initial Access

The transmitter and the receiver broadcast a previously promised broadcast message over optical resources, such as a broadcast message (e.g., a PBCH of LTE/LTE A or a Common Control Channel), so that the transmitter and the receiver may share initial information for optical wireless communication. The initial information for optical wireless communication may include phase mask information for encryption and encryption period information.

3.4.3. Phase Mask Information for Encryption 3.4.3.1. Referring to FIG. 40, when the phase pattern information of the phase mask is previously shared as a look-up table, the transmitter may transmit only the index information for the phase pattern to the receiver.

3.4.3.2. Referring to FIG. 41, when the phase pattern information of the phase mask is not previously shared as the look-up table, the transmitter may transmit look-up table information and index information for the phase pattern to the receiver.

3.4.3.3. Referring to FIG. 42, when the phase pattern information of the phase mask is not previously shared as the look-up table, the transmitter may transmit the entire information for the phase pattern to the receiver.

3.4.3.4. Information on the phase mask may be a vector or a matrix consisting of previously promised phase values. An example of the phase mask can be as follows.

3.4.3.4.1. P1=[0π0ππ0π; π00ππ00π; . . . ; 0ππ0π0π0], P2= . . . .

3.4.3.4.2. P1=[0 π/2 0 3π/2 −π/2 0 0 −π; −π/2 0 0 3π/2-3π/2 0 0 π; . . . ; 0 π/2 π0 3π/2 0 −π0], P2= . . . .

3.4.3.4.3. On the other hand, distribution of the respective coefficients of a vector or a matrix consisting of previously promised phase values may be denoted by uniform distribution (e.g., Gaussian or Poisson Distribution).

3.4.3.5. The phase mask look-up table may be comprised of phase masks of the following types.

3.4.3.5.1. Phase Masks having Various Physical Sizes 3.4.3.5.1.1. In order to perform encryption on the entire area of the passed beam or encryption on a partial area, the phase mask may have different physical sizes.

3.4.3.5.1.2. Considering that the size of the phase mask applied at the transmitter is expanded by beam divergence in the receiver, the transmitter may apply the phase mask to perform encryption on only a partial area.

3.4.3.5.1.3. In the above-described method, a phase change is applied only to a partial area and at the same time a phase change is not applied to another partial area, thereby obtaining the same effects in both partial areas. For example, in one case in which P1=[0 0 0 0; 0 π−π0; 0 −ππ0; 0 0 0 0] is applied to the entire area, and in the other case in which P2=[π–π; –ππ] is applied only to a partial area of the center of the beam, the same effects can be obtained.

3.4.4. Encryption Period Information 3.4.4.1. The time (that is, the encryption period) at which the phase mask for encryption is maintained (that is, the encryption period) can be promised between the transmitter and the receiver in advance according to the units (e.g., symbol, slot, subframe, frame, etc.) determined in the communication system.

3.4.4.2. The time (i.e., an encryption period) at which the phase mask for encryption is maintained according to a predetermined time unit (e.g., several milliseconds, several seconds, several minutes, and the like) can be promised between the transmitter and the receiver.

3.4.4.3. The above-described encryption period information may be dynamically controlled.

On the other hand, the above information may be used in an initial access step, and may be updated during communication including a connection step or an intermittent connection step or the like. In addition, the disclosure in Section 4 above may be suitable for the environment in which the distance between the transmitter and the receiver is relatively short, may be suitable for the environment in which the beam size can be maintained, or may be suitable for the environment in which the receiver can receive all of the surfaces of the entire beam.

3.5. Phase Mask Information Promise Between Transmitter and Receiver—Based on Measurement and Feedback of Receiver Radio light has a beam divergence according to the characteristics of optical sources (optical/photon sources). Thus, depending on the distance between the transmitter and the receiver, the size of the beam received at the receiver may be different. In order to address this issue, there is a need for a method for performing wavefront encryption in consideration of different sizes of beams received in the receiver.

3.5.1. Method for applying Encryption based on Feedback of Receiver after measurement of Beam Divergence 3.5.1.1. The transmitter may transmit data with the desired optical beam (TEM$_{00}$ or TEM$_{p1}$) in a promised manner, as described above in Section 1.

In this case, during transmission of the desired beam, the transmitter may transmit a periodic reference signal in a promised manner between the transmitter and the receiver.

3.5.1.1.2. During transmission of the reference signal, the transmitter may transmit the reference signal in a situation where the phase mask is in the in-phase state over the entire wavefront, so that the transmitter can transmit only the complete reference signal.

3.5.1.2. As described in Section 1 above, the receiver may allow the desired optical beam (TEM$_{00}$ or TEM$_{p1}$) to penetrate the optical filter in a promised manner, so that the transmitter can receive data.

3.5.1.2.1. At this time, when the reference signal is received, the receiver may receive the reference signal in a situation where the inverse phase mask is in the in-phase state over the entire wavefront, so that the receiver can receive the complete reference signal affected only by the channel.

3.5.1.2.2. The receiver may measure a photodiode array area for a desired beam based on the reference signal to measure a beam radius.

3.5.1.2.2.1. The receiver may determine, among photodiodes corresponding to a desired beam, some photodiodes within a threshold based on average intensity as desired photodiodes.

3.5.1.2.2.1.1. For example, a desired photodiode can be determined according to the following conditions:

$$\frac{(\Sigma_p^{|D|} \text{intensity}_p)}{|D|} - \text{threshold}_1 < \text{Desired Photodiode} < \frac{(\Sigma_p^{|D|} \text{intensity}_p)}{|D|} + \text{threshold}_1,$$

where $p \in D$.

3.5.1.2.2.1.2. D=Set of photodiodes corresponding to the desired beam zone 3.5.1.2.2.1.3. |D|=The number of photodiodes corresponding to the desired beam zone 3.5.1.2.2.1.4. threshold$_I$=Intensity threshold that is predefined or adaptively established 3.5.1.2.3. The receiver may measure the beam radius (Rd) from the determined desired photodiodes.

3.5.1.2.3.1. Referring to FIG. 43, the desired photodiodes may not be distributed at the center (x0, y0) of the photodiode array, and the receiver may infer the beam radius (Rd) based on the measured pattern.

3.5.1.3. The receiver feeds back the measured beam radius information to the transmitter.

3.5.1.3.1. The receiver feeds back the beam radius information received through a feedback channel (e.g., PUCCH or PUSCH of LTE/LTE-A/NR) to the transmitter.

3.5.1.3.2. The feedback information may be the radius information (Rd) of the desired beam and the reference coordinate ($x_n$, $y_n$), and/or may be the radius information (Ri) of the interference beam and the reference coordinate ($x_m$, $y_m$)

3.5.1.3.3. The feedback information may be transmitted in the form of data or may be transmitted as quantized information, or index information may be transmitted by a predefined look-up table.

3.5.1.4. The transmitter may perform OAM mode selection and phase mask selection based on the feedback beam radius information.

3.5.1.4.1. OAM mode selection may be omitted from the system to which OAM is not applied.

3.5.1.5. The transmitter generates an optical beam (TEM$_{00}$ or TEM$_{p1}$) based on the selected OAM mode index, and allows the generated optical beam to pass through the phase mask, so that the transmitter can transmit the resultant beam to the receiver.

3.5.1.5.1. In a system to which OAM is not applied, the beam (TEM$_{00}$) (or a general optical beam) is generated.

3.5.1.6. The receiver may allow the encrypted desired optical beam (TEM$_{00}$ or TEM$_{p1}$) to pass through the inverse phase mask and the optical filter using the method promised in Sections 1 to 2, so that the O-to-E device can receive the resultant beam.

3.5.1.7. The above-described operation may be defined in advance in the system or may be periodically performed according to a specific period established by the transmitter.

3.5.1.8. The above-described operation can be performed aperiodically or dynamically in consideration of decryption performance (e.g., packet drop rate or block error rate) at the transmitter or the receiver.

3.5.1.8.1. The reference value of decryption performance may be predefined or adaptively selected.

3.5.2. Method in which, in a situation where encryption is applied, the receiver measures beam divergence and feeds back the measured result.

3.5.2.1. The transmitter encrypts the desired optical beam (TEM$_{00}$ or TEM$_{p1}$) using the phase mask in a method promised in Section 2, and transmits encrypted data.

3.5.2.1.1. At this time, when the transmitter transmits the desired beam, the transmitter may transmit a periodic reference signal in a promised manner between the transmitter and the receiver.

3.5.2.1.2. During transmission of the reference signal, the transmitter transmits the encrypted reference signal corresponding to a signal that has passed through the phase mask.

3.5.2.2. The receiver may decrypt the encrypted desired optical beam (TEM$_{00}$ or TEM$_{p1}$) using the inverse phase mask in a promised method described in Section 3, and may allow the decrypted result to pass through the optical filter to receive data.

3.5.2.2.1. In this case, upon receiving the reference signal, the receiver may receive the reference signal that has penetrated the inverse phase mask, so that the receiver can receive the decrypted reference signal in which the influence of the channel remains.

3.5.2.2.1.1. The influence of the channel may be compensated based on the adaptive optics or based on channel information stored in previous data reception.

3.5.2.2.2. The receiver may measure the photodiode array area for the desired beam based on the reference signal, so that the beam radius can be measured.

3.5.2.2.2.1. Since there is no accurate information on beam divergence, the receiver may repeatedly acquire the most suitable scaling factor by scaling the phase mask. For example, as shown in FIG. 44, the receiver is designed to use the inverse phase mask for the entire area or a partial area of the promised phase mask while sequentially changing the unit in the order from the smallest scaling unit to the largest scaling unit.

3.5.2.2.2.1.1. In this case, the above-described repetitive operation can be performed by simultaneously splitting energy for one signal through a beam splitter.

3.5.2.2.2.2. When the beam having penetrated the inverse phase mask applied in a situation where the scaling unit is repeatedly changed, the receiver may have the largest peak energy at the focal point or may select the scaling factor having the largest energy throughout the focal plane.

3.5.2.2.2.3. Based on the selected scaling factor, the receiver may measure the beam radius and the distance between the transmitter and the receiver.

3.5.2.2.3. On the other hand, when the scaling factor of the inverse phase mask is obtained by the method described above in Section 5.2.2.2, the receiver may establish the inverse phase mask by applying the obtained scaling factor to the inverse phase mask without performing the procedure of Section 5.2.3, which will be described later (that is, without feedback), thereby receiving data.

3.5.2.3. The receiver feeds back the measured beam radius information or distance information to the transmitter.

3.5.2.3.1. The receiver feeds back the beam radius information received at the transmitter through a feedback channel (e.g., a PUCCH or PUSCH of LTE/LTE-A/NR) of a feedback channel.

3.5.2.3.2. The feedback information may be the radius information (Rd) of the desired beam and the reference coordinates ($x_n$, $y_n$), and/or may be the radius information (Ri) of the interference beam and the reference coordinates ($x_m$, $y_m$).

3.5.2.3.3. The feedback information may be transmitted in the form of data or may be transmitted as quantized information, or index information may be transmitted by a predefined look-up table.

3.5.2.4. The transmitter may perform OAM mode selection and phase mask selection based on the feedback beam radius information.

3.5.2.4.1. OAM mode selection may be omitted from the system to which OAM is not applied.

3.5.2.5. The transmitter may generate an optical beam (TEM$_{00}$ or TEM$_{p1}$) based on the selected OAM mode index, and may allow the generated beam to pass through the phase mask, so that the resultant beam can be transmitted to the receiver.

3.5.2.5.1. In a system to which OAM is not applied, the beam (TEM$_{00}$) (or a general optical beam) is generated.

3.5.2.6. The receiver may allow the encrypted desired optical beam (TEM$_{00}$ or TEM$_{p1}$) to pass through the inverse phase mask and the optical filter using the method promised in Sections 1 to 2, so that the O-to-E device can receive the resultant beam.

3.5.2.7. The above-described operation may be defined in advance in the system or may be periodically performed according to a specific period established by the transmitter.

3.5.2.8. The above-described operation can be performed aperiodically or dynamically in consideration of decryption performance (e.g., packet drop rate or block error rate) at the transmitter or the receiver.

3.5.2.9. The reference value of decryption performance may be predefined or adaptively selected.

On the other hand, the transmitter and the receiver performing the procedures of Sections 5.1 and 5.2 and the operation thereof are as shown in FIG. 45.

3.5.3. Phase mask Selection through Distance Measurement based on Sensing 3.5.3.1. The transmitter may encrypt the desired optical beam (TEM$_{00}$ or TEM$_{p1}$) using a phase mask in a method promised in Section 3, and may transmit encrypted data.

3.5.3.1.1. At this time, when the transmitter transmits the desired beam, the transmitter may transmit a periodic reference signal in a promised manner between the transmitter and the receiver.

3.5.3.2. The transmitter may measure the distance to a target receiver (target Rx) target using a distance measurement sensor (for example, a RADAR (radar detection and ranging) algorithm, and a LiDAR (light detection and ranging) algorithm.

3.5.3.3. The transmitter may perform OAM mode selection and phase mask selection based on the measured distance information.

3.5.3.3.1. The OAM mode selection may be omitted from the system to which OAM is not applied.

3.5.3.4. The transmitter may generate an optical beam (TEM$_{00}$ or TEM$_{p1}$) based on the selected OAM mode index, and may allow the generated beam to pass through the phase mask, so that the resultant beam can be transmitted to the receiver.

3.5.3.4.1. In a system to which OAM is not applied, the beam (TEM$_{00}$) (or a general optical beam) can be generated.

3.5.3.5. The receiver may allow the encrypted desired optical beam (TEM$_{00}$ or TEM$_{p1}$) to pass through the inverse phase mask and the optical filter using the method promised in Sections 1 to 2, so that the O-to-E device can receive the resultant beam.

3.5.3.6. The above-described operation may be defined in advance in the system or may be periodically performed according to a specific period established by the transmitter.

3.5.3.7. The above-described operation can be performed aperiodically or dynamically in consideration of decryption performance (e.g., packet drop rate or block error rate) at the transmitter or the receiver.

3.5.3.8. The reference value of decryption performance may be predefined or adaptively selected.

On the other hand, the transmitter and the receiver performing the procedures of Section 5.3, and the operation thereof are as shown in FIG. 46.

3.5.4. Phase Mask Selection through Distance Measurement based on Feedback and Sensing 3.5.4.1. Based on the beginning part of Sections 3.5.1 to 3.5.3 described above, the transmitter and the receiver may combine the feedback information and the sensing information as shown in FIG. 47 to adaptively select the optimal OAM mode index and the optimal phase mask index, so that the selected information can be utilized for information transmission. On the other hand, in a system to which OAM is not applied, OAM mode selection can be omitted. The transmitter and the receiver performing the procedures of Section 5.4, and the operation thereof are as shown in FIG. 47. The method according to the present disclosure shown in FIG. 47 may be suitable for the environment in which the distance between the transmitter and the receiver is relatively long so that the beam is spread out, or may be suitable for the environment in which the receiver cannot receive all of the surfaces of the entire beam.

When the wavefront encryption system of Sections 3.1 to 3.5 is implemented, the configuration of a phase mask may vary depending on the size of a single phase shifter constituting the phase mask. If the size of the phase shifter is large, it may be difficult to finely control the phase mask used to encrypt the wavefront of a target signal.

Due to a change in the distance between the transmitter and the receiver, it may be difficult to match a phase mask used to encrypt a desired signal from the transmitter with an inverse phase mask used by the receiver to decrypt the desired signal. For example, it may be necessary to accurately match the inverse phase mask to decode the received signal without loss. However, the distance and location may change due to the mobility of the transmitter or receiver, the wavefront encrypted by the phase mask may be misaligned with the inverse phase mask. If the wavefront and the inverse phase mask are misaligned, the decoding performance of the receiver may be reduced. As the size of a phase shifter constituting the phase mask decreases, the matching accuracy may be sensitive. As the size of the phase shifter increases, the matching accuracy may become insensitive.

In other words, the phase mask needs to be designed considering the characteristics of the phase mask and inverse phase mask. That is, a specific phase mask design needs to be agreed between the transmitter and receiver.

Hereinafter, a method of designing a quantized phase mask to perform encryption on a wavefront based on a phase mask in optical wireless communication will be described.

4.1. Quantization Order

For a technique of performing encryption on a wavefront based on a phase mask, the phase mask may need to be implemented with a phase shifter having the following characteristics: diffraction, refraction, and reflection based on optical elements. To control a phase mask (or inverse phase mask) used by the receiver that matches with a phase mask used by the transmitter, a quantization configuration method for the phase mask and a phase mask determination method between the transmitter and receiver are proposed. The phase mask used by the transmitter may include phase shifters.

4.1.1 Quantization Order Q

The quantization order refers to a unit for dividing the wavefront area of a desired transmission beam or reception beam. The entire beam may be divided by the square of the quantization order, resulting in a single quantization beam. As shown in FIG. 48, when the area of the entire beam is divided by the square of the quantization order, the area of a single quantization beam may be obtained. The same phase is applied to the single quantization beam.

FIG. 48 shows the phases of a phase mask plotted on a two-dimensional plane of (x, y). In FIG. 48, the phase of a portion marked in black (or a portion having relatively low brightness) is $-\pi$, and the phase of a portion marked in white (or a portion with relatively high brightness) is 0. In the example of FIG. 48, the quantization order Q is 25, and the total beam area is composed of $25^2$ single quantized beams. If the size of a transmitted desired beam is the same as the size of the phase mask of FIG. 28, the wavefront of the desired beam may be encrypted based on the phase mask of FIG. 28.

FIG. 49 shows exemplary phase masks depending on the quantization order Q.

In FIG. 49, the phase of a portion marked in black (or a portion having relatively low brightness) is $-\pi$, and the phase of a portion marked in white (or a portion with relatively high brightness) is 0.

Referring to FIG. 49, as the size of Q increases, the area of the same wavefront may be further divided. That is, the area of the single quantization beam becomes smaller as the size of Q increases.

Assuming that the z-axis shown in FIG. 50 is the time axis, an optical beam in the form of a plane wave may pass through a phase mask that changes the phase based on the delay. The optical beam may travel in the positive direction of the z-axis. As shown in FIG. 50, an encrypted wavefront may be composed of wavefronts whose phases are changed according to the delay characteristic of the phase mask.

In FIG. 50, a part of the beam passing through a medium having a delay of b may have a non-zero phase, and a part of the beam passing through a medium having a length shorter than that of the medium having a delay of b may have a phase shifted by $-\pi$. The medium having the shorter length may have a length corresponding to a delay of a. A part of the beam passing through a medium having a length longer than that of the medium having a delay of b may have a phase shifted by $\pi$. The medium having the longer length may have a length corresponding to a delay of c. Although not shown in FIG. 50, since the phase shift is applied to both the x-axis and the y-axis, the optical beam is encrypted according to the phase pattern in terms of the (x, y) two-dimensional plane of the wavefront.

The phase mask may be formed as a set of multiple phase shifters. The set of multiple phase shifters may be, for example, a phase shifter array. In addition, the phase mask may be formed so that the shape of a phase shifter partially performs another phase shifter. In order to partially perform the other phase shifter, a structure in which the phase of a reflected optical beam is deformed when the optical beam is irradiated to a hologram may be used as an optical element based on a hologram pattern.

4.1.2 Selection of Quantization Order Q 4.1.4.1. The larger the size of Q, the stronger the encryption performance. In other words, the finer the quantization of the phase mask, the stronger the encryption performance. The reason for this is that as the size of Q increases, the focusing ability related to the use of an inaccurate inverse phase mask decreases.

4.1.2.2. The larger the size of Q, the stronger the interference attenuation performance of an encryption-based interference cancellation technology for the wavefront. In other words, the finer the quantization of the phase mask, the stronger the interference attenuation performance of the encryption-based interference cancellation technology for the wavefront. The reason for this is that as the size of Q increases, the phase matching inaccuracy between the inverse phase mask and interfering beam increases, and thus, the SIR increases due to a decrease in the focusing ability, compared to the desired beam.

4.1.2.3. As the size of Q increases, the size of a required single phase shifter decreases, and thus the implementation complexity increases. In other words, as the quantization of the phase mask becomes finer, the size of the required single phase shifter decreases, and thus, the implementation complexity increases. This is because the number of quantized beams to be implemented within the same area increases as the size of Q increases.

4.1.2.4. As the size of Q increases, the beam alignment performance required for the transmitter and receiver increases. In other words, as the quantization of the phase mask becomes finer, the beam alignment performance required for the transmitter and receiver becomes higher. This is because the beam alignment mismatch between the transmitter and receiver affects the alignment performance of the phase mask of the transmitter and the alignment performance of the inverse phase mask of the receiver.

4.2 Phase Pattern 4.2.1 Phase Order P 4.2.1.1 For the phase order P, if the pattern of the phase mask is $\theta_1$, the phase is $$\theta_i = -\pi + \frac{(i-1)}{P}.$$

$2\pi$, where i is an integer greater than or equal to 1 and smaller than or equal to P.

For example, if P=2, $\theta_1=-\pi$, and $\theta_2=0$.

For example, if P=3, $\theta_1=-\pi$, $\theta_2=-(1/2)\pi$, and $\theta_3=(1/2)\pi$.

For example, if P=4, $\theta_1=-\pi$, $\theta_2=-(1/2)\pi$, $\theta_3=0$, and $\theta_4=(1/2)\pi$.

For example, if P=16, $\theta_1=-\pi$, $\theta_2=-(7/8)\pi$, $\theta_3=-(6/8)\pi$, $\theta_4=-(5/8)\pi$, $\theta_5=-(4/8)\pi$, $06=-(3/8)\pi$, $\theta_7=-(2/8)\pi$, $Os=-(1/8)\pi$, $\theta_9=0$, $\theta_{10}=(1/8)\pi$, $\theta_{11}=(2/8)\pi$, $\theta_{12}=(3/8)\pi$, $\theta_{13}=(4/8)\pi$, $\theta_{14}=(5/8)\pi$, $\theta_{15}=(6/8)\pi$, and $\theta_{16}=(7/8)\pi$.

As shown in the examples, phase values may be evenly distributed for various values of P. Alternatively, the phase values may be unevenly distributed for various values of P.

FIG. 51 shows wavefronts depending on the phase order P.

Referring to FIG. 51, the phase of a portion marked in black (or a portion with relatively low brightness) is $-\pi=01$, which is the smallest phase value, and the phase of a portion marked in white (or a portion with relatively high brightness) is $0=\theta_p$, which is the largest phase value. The phase of a portion with brightness between black and white is $0_i$, which increases as the brightness increases.

4.2.1.2. Selection of Phase Order P 4.2.1.2.1. The larger the size of P, the stronger the encryption performance. This is because as the size of P increases, the phase Oi of the phase mask is variously configured.

4.2.1.2.2. The larger the size of P, the stronger the interference attenuation performance of an encryption-based interference cancellation technology for the wavefront. The reason for this is that as the size of P increases, the phase matching inaccuracy between the inverse phase mask and interfering beam increases, and thus, the SIR increases due to a decrease in the focusing ability, compared to the desired beam.

4.2.1.2.3. As the size of P increases, various phase shifters are required, and thus, the implementation complexity increases. This is because as the size of P increases, the phase mask is designed based on various phase shifters.

4.2.2. Phase Distribution 4.2.2.1. Uniform Distribution: The phase Oi of the phase mask may follow the uniform distribution. The uniform distribution may be used to maximize the wavefront encryption or interference mitigation performance on average.

4.2.2.2. Other Distributions including Gaussian Distribution and Poisson Distribution: The phase Oi of the phase mask may follow a predefined distribution such as a Gaussian distribution and/or a Poisson distribution.

4.3. Phase Mask Generation 4.3.1. UE-specific Phase Mask Generation 4.3.1.1. In a cellular communication system such as LTE/LTE-A and NR, a unique UE ID may be assigned to each user in a cell. When the unique UE ID is assigned to each user, a pseudo-random sequence based on the UE ID may be generated with a length of $Q^2 * \log 2$ (P) according to a rule predefined between the transmitter and receiver. For example, in the LTE system, the scrambling sequence of a PDSCH is generated based on a cell ID and a UE ID. A rule f (x) for generating a pseudo-random sequence may be predefined between the transmitter and receiver. For the rule of f (UE ID)=pseudo-random sequence (UE ID), a pseudo-random sequence may have a sequence length of $Q^2 * \log 2$ (P). For the rule f (x), a conventional sequence generation method of LTE/LTE-A and NR systems may be used, or a new rule may be defined.

4.3.1.2. By converting a generated sequence into a decimal number corresponding to the phase order P, a phase order vector having a size of $(Q^2) \times 1$ may be generated.

4.3.1.3. By setting a coefficient of the generated phase order vector to the i-1 value of the phase $\theta_i$ of the phase mask, a phase vector having a size of $(Q^2) \times 1$ may be generated with the phase $\theta_i$ corresponding to each coefficient.

4.3.1.4. The phase vector having a size of $(Q^2) \times 1$ may be generated by matching phase values according to a predetermined rule to the two-dimensional plane of a quantized phase mask having a size of Q×Q.

4.3.1.5. FIGS. 52 to 54 show exemplary processes until the phase mask is generated based on the rule f (x) described in Section 4.3.1. FIG. 52 shows a phase mask generation process in the case of P=2 and Q=4. FIG. 53 shows a phase mask generation process in the case of P=4 and Q=2. FIG. 54 shows a phase mask generation process in the case of P=4 and Q=4. FIGS. 52 to 54 show that each phase vector is located in the phase mask. The position of the phase mask at which each value of 0; of the phase vector is mapped may vary according to transform rules.

4.3.2. Cell-specific Phase Mask Generation 4.3.2.1. In a cellular communication system such as LTE/LTE-A and NR, a cell ID may be assigned to each cell. When the cell ID is assigned to each cell, a pseudo-random sequence based on the cell ID may be generated with a length of $Q^2 * \log 2$ (P) by a rule predefined between the transmitter and receiver. For example, a rule f (x) for generating a pseudo-random sequence may be predefined between the transmitter and receiver. For the rule of f (cell ID)=pseudo-random sequence (cell ID), the pseudo-random sequence may have a sequence length of $Q^2 * \log 2$ (P).

4.3.2.2. By converting a generated sequence into a decimal number corresponding to the phase order P, a phase order vector having a size of $(Q^2)\times 1$ may be generated.

4.3.2.3. By setting a coefficient of the generated phase order vector to the i-1 value of the phase $\theta_i$ of the phase mask, a phase vector having a size of $(Q^2)\times 1$ may be generated with the phase $\theta_i$ corresponding to each coefficient.

4.3.2.4. The phase vector having a size of $(Q^2)\times 1$ may be generated by matching phase values according to a predetermined rule to the two-dimensional plane of a quantized phase mask having a size of $Q\times Q$.

4.3.3. Predefined Phase Mask Look-up Table 4.3.3.1. A plurality of phase masks may be defined based on the predefined look-up table.

4.3.3.2. The transmitter and receiver may select a phase mask from the look-up table according to a predefined rule.

4.3.3.3. UE-specific Selection: In a cellular communication system such as LTE/LTE-A and NR, a unique UE ID may be assigned to each user in a cell. When the unique UE ID is assigned to each user, phase mask index selection based on the UE ID may be performed according to a rule predefined between the transmitter and receiver. For example, a phase mask index may be determined by the following operation: Phase Mask Index=Mod (UE ID, Look up Table Size). To perform the phase mask selection in the entirety of the look-up table, the phase mask index may be selected by performing the modulo operation on the UE ID and the look-up table size.

4.3.3.4. Cell-specific Selection: In a cellular communication system such as LTE/LTE-A and NR, a cell ID may be assigned to each cell. When the cell ID is assigned to each cell, phase mask index selection based on the cell ID may be performed according a rule predefined between the transmitter and receiver. For example, a phase mask index may be determined by the following operation: Phase Mask Index=Mod (cell ID, Look-up Table Size). To perform the phase mask selection in the entirety of the look-up table, the phase mask index may be selected by performing the modulo operation on the cell ID and the look-up table size.

4.3.3.5. The transmitter uses a phase mask based on the selected phase mask index to perform wavefront encryption. The receiver uses a phase mask (and/or inverse phase mask) based on the selected phase mask index to perform wavefront decoding.

4.4. Indication Rule 4.4.1. Phase mask information may be exchanged between the transmitter and the receiver in a UE-specific and/or cell-specific manner according to the method in Section 3.4. The phase mask information may further include the quantization order Q and the phase order P.

4.4.1.1. Selection of Parameters Q and P 4.4.1.1.1. Selection Depending on Interference Level: Considering that the interference dispersion effect needs to be improved as the interference level increases, larger Q and/or P values need to be selected. As the interference level increases, the beam alignment needs to be performed more accurately.

4.4.1.1.2. Selection Depending on Distance: As the distance between the transmitter and receiver decreases, the beam alignment may need to be performed more accurately. If larger Q and/or P values are selected, the interference dispersion effect may be improved.

4.4.1.1.3. Selection Depending on environment: In an environment where the channel variation increases, the beam alignment may need to be performed more accurately. Smaller Q and/or P values may be selected in consideration of the channel variation.

4.4.1.2. Indication of Parameters P and Q 4.4.1.2.1. The transmitter may select the parameters P and/or Q and provide information about the parameters P and/or Q to the receiver as described in Section 4.4.1.1. The transmitter and receiver may generate a sequence or select a phase mask index based on the provided parameters P and/or Q according to the methods described in Sections 4.3.1 to 4.3.3. FIG. 55(a) shows an example in which the transmitter provides the receiver with the information about the parameters P and/or Q and generates the sequence according to the methods described in Sections 4.3.1 and/or 4.3.2. FIG. 55(b) shows an example of selecting the phase mask index from the look-up table as described in Section 4.3.3.

4.4.1.2.2. The receiver may select the parameters P and/or Q and provide information about the parameters P and/or Q to the transmitter as described in Section 4.4.1.1. The transmitter and receiver may generate a sequence or select a phase mask index based on the provided parameters P and/or Q according to the methods described in Sections 4.3.1 to 4.3.3. FIG. 56(a) shows an example in which the receiver provides the transmitter with the information about the parameters P and/or Q and generates the sequence according to the methods described in Sections 4.3.1 and/or 4.3.2. FIG. 56(b) shows an example of selecting the phase mask index from the look-up table as described in Section 4.3.3.

4.4.1.2.3. The transmitter and/or receiver may select the parameters P and/or Q as described in Section 4.4.1.1. The transmitter and receiver may perform phase mask selection based on the provided parameters P and/or Q. Among the transmitter and/or the receiver, a communication device that performs the phase mask selection indicates and/or feeds back the index of the selected phase mask to the other communication device. FIG. 57(a) shows an example in which the transmitter selects P and/or Q, selects a phase mask, and informs the receiver of the selected phase mask. FIG. 57(b) shows an example in which the receiver selects P and/or Q, selects a phase mask, and informs the transmitter of the selected phase mask.

4.4.2. The phase mask information may be exchanged between the transmitter and receiver UE-specifically and/or cell-specifically as described in Section 3.4. The parameters Q and/or P may be reflected in the phase mask look-up table preconfigured for the transmitter and/or receiver.

4.4.3. The phase mask information may be exchanged between the transmitter and receiver UE-specifically and/or cell-specifically as described in Section 3.4. As the phase mask look-up table preconfigured for the transmitter and/or receiver, a phase mask look-up table for Q and a phase mask look-up table for P may exist, respectively. The transmitter and/or receiver may select a look-up table according to the indicated quantization order Q and/or phase order P.

5. Interference Dispersion Performance Depending on

FIG. 58 shows an exemplary structure of the receiver.

For example, sunlight may act as an interference signal. When the inverse phase mask of the receiver is applied to sunlight, the interference dispersion effect may appear as shown in FIG. 59 depending on the value of Q. The application of the inverse phase mask shown in FIG. 59 corresponds to a case where the phase mask of the transmitter is not applied. Referring to FIG. 59, as the size of Q increases, the encryption-based interference of the wavefront is mitigated. In other words, as the quantization of the phase mask becomes finer, the encryption-based interference of the wavefront is mitigated.

For example, a Gaussian beam may act as an interference signal. When the inverse phase mask of the receiver is applied to the Gaussian beam, the interference dispersion effect may appear as shown in FIG. 60 depending on the value of Q. The application of the inverse phase mask shown in FIG. 60 corresponds to a case where the phase mask of the transmitter is not applied. Referring to FIG. 60, as the size of Q increases, the encryption-based interference of the wavefront is mitigated. In other words, as the quantization of the phase mask becomes finer, the encryption-based interference of the wavefront is mitigated.

For example, an LG beam may act as an interference signal. When the inverse phase mask of the receiver is applied to the LG beam, the interference dispersion effect may appear as shown in FIG. 61 depending on the value of Q. The application of the inverse phase mask shown in FIG. 61 corresponds to a case where the phase mask of the transmitter is not applied. Referring to FIG. 60, as the size of Q increases, the encryption-based interference of the wavefront is mitigated. In other words, as the quantization of the phase mask becomes finer, the encryption-based interference of the wavefront is mitigated.

In this specification, quantization is shown in a square shape for convenience of description, but the area of a part or the entirety of a beam may be quantized in other shapes or units.

In this specification, the method for performing optical focusing based on the phase-front characteristics of an optical beam (or signal) to distinguish interference from a desired signal has been described based on LG and OAM beams, but the method may be applied to other optical beams having the phase-front characteristics. For example, for Hermite-Gaussian (HG) modes and/or TEM$_{mn}$ having rectangular transverse mode patterns, interference may be distinguished from a desired signal according to the method described in the present disclosure. The phase-front characteristics of an HG beam have a rectangular phase change as in the LG beam, instead of having a circular phase change. For example, the intensity and phase of the LG or HG beam may be formed according to the values of modes 'pl' and 'mn' as shown in FIG. 62.

Therefore, for the HG beam, a desired signal may be focused in the form shown in FIG. 63 after passing through an optical filter for performing optical focusing, based on the phase characteristics described herein. A plane on which the desired signal is focused after the optical filter may be a focal plane.

Accordingly, the embodiments described herein may be applied to all other types of optical beams as long as the beams have a phase difference in the phase front.

The application of the embodiments described herein may be dynamically determined depending on whether the communication device recognizes interference. For example, operations according to at least one of the embodiments described herein may be initiated for interference cancellation and/or interference isolation only when the transmitter and/or receiver recognizes interference. If the transmitter and/or receiver fails to recognize interference or if the amount of recognized interference is less than or equal to a threshold, the operations according to at least one of the embodiments described herein may not be performed. For example, FIG. 64 shows a case in which the transmitter and/or receiver determines whether to activate a specific operation by recognizing interference and/or comparing the interference with a threshold.

6.1 Phase Mask Selection Based on Interference Recognition 6.1.1 Phase Mask Selection Based on Interference Recognition by Transmitter 6.1.1.1. FIG. 64(a) shows an example in which the transmitter recognizes interference and selects a phase mask. The transmitter detects and/or measures the interference according to a predetermined method. The predetermined method may be, for example, a method of recognizing an optical resource around a transmitter/receiver link in terms of energy detection to perceive interference.

6.1.1.2. The transmitter determines whether to use a phase mask based on the recognized interference information. When the interference is less than a predefined threshold or when there is no interference, the effect of the interference on a desired signal is small even if the phase mask is not used, so that decoding of the desired signal may be allowed. Therefore, when the interference is less than the predefined threshold or when there is no interference, the transmitter may determine not to use the phase mask.

6.1.1.3. Control information for optical wireless communication may be shared through a legacy link. The legacy link may include, for example, at least one of legacy wireless communication schemes such as LTE, LTE-A, NR, Wi-Fi, and Bluetooth. Alternatively, the control information for wireless optical communication may be shared by broadcasting a broadcast message on an optical resource. The broadcast message may be, for example, a predefined broadcast message such as a PBCH or common control channel of LTE/LTE-A. The control information for wireless optical communication may include information on enabling and/or disabling of the phase mask.

6.1.1.4. The receiver determines whether to use the phase mask based on the received control information.

6.1.1.5. The desired signal is transmitted and received between the transmitter and receiver based on information on the use of the phase mask determined by the phase mask selection of the transmitter and/or receiver.

6.1.2. Phase Mask Selection Based on Interference Recognition by Receiver 6.1.2.1. FIG. 64(b) shows an example in which the receiver recognizes interference and selects a phase mask. The receiver detects and/or measures the interference according to a predetermined method. The predetermined method may be, for example, a method of recognizing an optical resource around a transmitter/receiver link in terms of energy detection to perceive interference.

6.1.2.2. The receiver may transmit and/or feed back the perceived interference information to the transmitter. The interference information may be, for example, information on the presence or absence of the interference and/or information on the magnitude of interference quantized based on a predefined threshold.

6.1.2.3. The transmitter determines whether to use the phase mask based on the received interference information. When the interference is less than the predefined threshold or when there is no interference, the effect of the interference on a desired signal is small even without the use of the phase mask, so that decoding of the desired signal may be allowed. Therefore, when the interference is less than the predefined threshold or when there is no interference, the transmitter may determine not to use the phase mask.

6.1.2.3. Control information for optical wireless communication may be shared through a legacy link. The legacy link may include, for example, at least one of legacy wireless communication schemes such as LTE, LTE-A, NR, Wi-Fi, and Bluetooth. Alternatively, the control information for wireless optical communication may be shared by broadcasting a broadcast message on an optical resource. The broadcast message may be, for example, a predefined broadcast message such as a PBCH or common control channel of LTE/LTE-A. The control information for wireless optical communication may include information on enabling and/or disabling of the phase mask.

6.1.1.4. The receiver determines whether to use the phase mask based on the received control information.

6.1.1.5. The desired signal is transmitted and received between the transmitter and receiver based on information on the use of the phase mask determined by the phase mask selection of the transmitter and/or receiver.

The receiver may determine by itself whether to use the phase mask or not. The receiver may determine whether to use the phase mask and then transmit and/or feed back information on enabling and/or disabling of the phase mask to the transmitter. The transmitter may transmit the desired signal to the receiver based on the received information in a state that the phase mask is enabled and/or disabled.

Implementation Examples

The embodiments of the present disclosure may be implemented by organically combining at least one of the above-described operations.

In FIG. 65, one of the embodiments implemented by a combination of the above-described operations is illustrated. The operations of FIG. 65 may be performed by the transmitter mentioned in this document, and the transmitter may include the BS and/or UE shown in FIG. 1. In FIG. 65, the transmitter may be referred to as a first communication device, and the receiver may be referred to as a second communication device.

The first communication device may apply a phase pattern to the wavefront of an optical signal (S6501) and transmit the optical signal to which the phase pattern is applied to the second communication device (S6503). From the perspective of the second communication device, although not shown, the operations of FIG. 65 may be interpreted as follows. The second communication device may receive from the first communication device the optical signal where the phase pattern is applied to the wavefront and then decode the received optical signal.

The phase pattern applied to the wavefront of the optical signal may be determined based on optical phase shift characteristics of a phase mask. In this case, the phase mask may be determined based on a quantization order and a phase order. The quantization order Q refers to a unit for dividing the wavefront area of a desired transmission or reception beam as described in Section 4.1. The phase order P refers to the phase of the phase mask as described in Section 4.2.

The phase mask may be generated as described in Section 4.3 in consideration of the advantages/disadvantages of each value of P and/or Q described in Sections 4.1 and 4.2. For example, the phase mask may be generated based on the ID of the first communication device or generated based on the ID of the second communication device. Since the first communication device may be the UE or BS, and the second communication device may also be the UE or BS. The phase mask may be generated based on a UE ID as described in Section 4.3.1 or generated based on a cell ID as described in Section 4.3.2. In addition, the phase mask may be generated based on a look-up table as in Section 4.4.3.

The quantization order and phase order, which are the basis for generating the phase mask, may (i) be selected by the first communication device or (ii) selected by the second communication device and received by the first communication device as described in Section 4.4. The quantization order and phase order may be selected UE-specifically and/or cell-specifically. In addition, one or more look-up tables for the quantization order and/or phase order may be preconfigured for the first and second communication devices.

Although the phase mask may always be used by the communication devices, it may be desirable to use the phase mask only when interference to a desired optical signal is greater than or equal to a threshold. The interference measurement method and subject may follow the description in Section 6.1.1. For example, the interference may be measured by recognizing an optical resource around a transmitter/receiver link in terms of energy detection. The interference may (i) be measured by the first communication device or (ii) be measured by the second communication device and received by the first communication device. In addition, instead of transmitting the measured interference to the first communication device, the second communication device may determine by itself whether to use the phase mask and then transmit to the first communication device information on the determination whether the phase mask is used. The information on whether the phase mask is used may (i) be transmitted according to a communication method other than optical wireless communication or (ii) be broadcast through the wireless optical communication.

The operations described with reference to FIG. 65 may be additionally performed in combination with at least one of the operations described with reference to FIGS. 1 to 64.

The wireless optical communication described in this document may be applied to various fields such as artificial intelligence, robots, and autonomous vehicles.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure is industrially applicable to various wireless communication systems such as 3GPP LTE/LTE-A and 5G systems.

The invention claimed is:

1. A method of transmitting and receiving a signal by a first communication device in optical wireless communication, the method comprising:
applying a phase pattern to a wavefront of a signal, wherein the signal is transmitted in a frequency range of visible light, ultraviolet, or infrared; and
transmitting the optical signal to a second communication device,
wherein the signal is a physical downlink control channel (PDCCH), a physical uplink control channel (PUCCH), a physical downlink shared channel (PDSCH) or physical uplink shared channel (PUSCH),
wherein the PDCCH includes downlink control information (DCI), wherein the DCI includes information about cell configuration, downlink scheduling, or uplink grant,
wherein the PUCCH includes uplink control information (UCI), and the UCI includes acknowledgement, negative acknowledgement, channel state information (CSI), or scheduling request (SR),
wherein the phase pattern is determined based on optical phase shift characteristics of a phase mask, and
wherein the phase mask is determined based on a quantization order and a phase order.

2. The method of claim 1, wherein the quantization order and the phase order are (i) selected by the first communication device or (ii) selected by the second communication device and received by the first communication device.

3. The method of claim 1, wherein the phase mask is determined based on (i) an identifier (ID) of the first communication device or (ii) an ID of the second communication device.

4. The method of claim 1, wherein the phase mask is used based on interference to the signal being greater than or equal to a threshold, and
wherein the interference is (i) measured by the first communication device or (ii) measured by the second communication device and received from the second communication device.

5. The method of claim 4, wherein information on whether the phase mask is used is (i) transmitted according to a communication method other than the optical wireless communication or (ii) broadcast through the optical wireless communication.

6. A first communication device configured to transmit and receive a signal in a wireless communication system, the first communication device comprising:
at least one transceiver;
at least one processor; and
at least one memory operably connected to the at least one processor and configured to store instructions that, when executed, cause the at least one processor to perform operations comprising:
applying a phase pattern to a wavefront of a signal, wherein the signal is transmitted in a frequency range of visible light, ultraviolet, or infrared; and
transmitting the signal to a second communication device,
wherein the signal is a physical downlink control channel (PDCCH), a physical uplink control channel (PUCCH), a physical downlink shared channel (PDSCH) or physical uplink shared channel (PUSCH),
wherein the PDCCH includes downlink control information (DCI), wherein the DCI includes information about cell configuration, downlink scheduling, or uplink grant,
wherein the PUCCH includes uplink control information (UCI), and the UCI includes acknowledgement, negative acknowledgement, channel state information, or scheduling request,
wherein the phase pattern is determined based on optical phase shift characteristics of a phase mask, and
wherein the phase mask is determined based on a quantization order and a phase order.

7. The first communication device of claim 6, wherein the quantization order and the phase order are (i) selected by the first communication device or (ii) selected by the second communication device and received by the first communication device.

8. The first communication device of claim 6, wherein the phase mask is determined based on (i) an identifier (ID) of the first communication device or (ii) an ID of the second communication device.

9. The first communication device of claim 6, wherein the phase mask is used based on interference to the signal being greater than or equal to a threshold, and
wherein the interference is (i) measured by the first communication device or (ii) measured by the second communication device and received from the second communication device.

10. The first communication device of claim 9, wherein information on whether the phase mask is used is (i) transmitted according to a communication method other than optical wireless communication or (ii) broadcast through the optical wireless communication.

11. An apparatus for a first communication device, the apparatus comprising:
at least one processor; and
at least one computer memory operably connected to the at least one processor and configured to, when executed, cause the at least one processor to perform operations comprising:
applying a phase pattern to a wavefront of a signal, wherein the signal is transmitted in a frequency range of visible light, ultraviolet, or infrared; and
transmitting the signal to a second communication device,
wherein the signal is a physical downlink control channel (PDCCH), a physical uplink control channel (PUCCH), a physical downlink shared channel (PDSCH) or physical uplink shared channel (PUSCH),
wherein the PDCCH includes downlink control information (DCI), wherein the DCI includes information about cell configuration, downlink scheduling, or uplink grant,
wherein the PUCCH includes uplink control information (UCI), and the UCI includes acknowledgement, negative acknowledgement, channel state information, or scheduling request,
wherein the phase pattern is determined based on optical phase shift characteristics of a phase mask, and
wherein the phase mask is determined based on a quantization order and a phase order.

12. The apparatus of claim 11, wherein the quantization order and the phase order are (i) selected by the apparatus or (ii) selected by the other apparatus and received by the apparatus.

13. The apparatus of claim 11, wherein the phase mask is determined based on (i) an identifier (ID) of the first communication device or (ii) an ID of the second communication device.

14. The apparatus of claim 11, wherein the phase mask is used based on interference to the signal being greater than or equal to a threshold, and wherein the interference is (i) measured by the apparatus or (ii) measured by the other apparatus and received from the other apparatus.

15. The apparatus of claim 14, wherein information on whether the phase mask is used is (i) transmitted according to a communication method other than optical wireless communication or (ii) broadcast through the optical wireless communication.

\* \* \* \* \*